(12) United States Patent
Yamagishi

(10) Patent No.: US 11,374,670 B2
(45) Date of Patent: *Jun. 28, 2022

(54) RECEIVING DEVICE, TRANSMITTING DEVICE, AND DATA PROCESSING METHOD

(71) Applicant: SATURN LICENSING LLC, New York, NY (US)

(72) Inventor: Yasuaki Yamagishi, Kanagawa (JP)

(73) Assignee: SATURN LICENSING LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/021,757

(22) Filed: Sep. 15, 2020

(65) Prior Publication Data

US 2021/0044367 A1 Feb. 11, 2021

Related U.S. Application Data

(63) Continuation of application No. 16/327,956, filed as application No. PCT/JP2017/033798 on Sep. 20, 2017, now Pat. No. 10,805,028.

(30) Foreign Application Priority Data

Oct. 4, 2016 (JP) .................................. 2016-196107

(51) Int. Cl.
*H04H 20/86* (2008.01)
*H04H 20/42* (2008.01)
(Continued)

(52) U.S. Cl.
CPC ............ *H04H 20/86* (2013.01); *H04H 20/02* (2013.01); *H04H 20/423* (2013.01);
(Continued)

(58) Field of Classification Search
CPC ...... H04H 20/02; H04H 20/423; H04H 20/86; H04H 60/73; H04N 21/434; H04N 21/4344; H04N 21/4345
(Continued)

(56) References Cited

U.S. PATENT DOCUMENTS 8,635,440 B2   1/2014  Statia et al.
10,454,985 B2  10/2019 Stockhammer et al.
(Continued)

FOREIGN PATENT DOCUMENTS

JP   2004-312413 A   11/2004
JP   2013-524620 A   6/2013
(Continued)

OTHER PUBLICATIONS

International Search Report dated Dec. 26, 2017 in PCT/JP2017/033798 filed on Sep. 20, 2017.
(Continued)

*Primary Examiner* — Tan H Trinh
(74) *Attorney, Agent, or Firm* — Chris Kolefas

(57) ABSTRACT

The present technology relates to a receiving device, a transmitting device, and a data processing method which are capable of providing a broadcast service using a wide bandwidth more flexibly. A receiving device processes a stream in which delivery configuration information indicating that the stream of the broadcast service is delivered across a predetermined frequency band is included in transmission information which is transmitted through an upper layer higher than a physical layer, the stream having a delivery configuration corresponding to the delivery configuration information, so that a broadcast service using a wider bandwidth can be provided. The present technology can be applied to a FW proxy device connected to a network (Continued)

such as, a home LAN, a head end of a cable operator, a base station of a mobile network, or the like.

16 Claims, 48 Drawing Sheets

(51) Int. Cl.
    *H04H 60/73* (2008.01)
    *H04N 21/434* (2011.01)
    *H04H 20/02* (2008.01)

(52) U.S. Cl.
    CPC .......... *H04H 60/73* (2013.01); *H04N 21/434* (2013.01); *H04N 21/4344* (2013.01); *H04N 21/4345* (2013.01)

(58) Field of Classification Search
    USPC .............................................. 455/3.04, 67.11
    See application file for complete search history.

(56) References Cited

U.S. PATENT DOCUMENTS

| | | | |
|---|---|---|---|
| 10,505,028 B2* | 12/2019 | Naito | H01L 21/2253 |
| 2004/0230905 A1 | 11/2004 | Asakawa et al. | |
| 2006/0212531 A1 | 9/2006 | Kikkawa et al. | |
| 2013/0018979 A1 | 1/2013 | Cohen et al. | |
| 2013/0081087 A1 | 3/2013 | Lee et al. | |
| 2016/0127756 A1* | 5/2016 | Oh | H04N 21/4622 725/110 |
| 2016/0205158 A1 | 7/2016 | Lo et al. | |
| 2017/0030994 A1 | 2/2017 | Meredith et al. | |
| 2017/0034588 A1 | 2/2017 | Oh et al. | |
| 2017/0171575 A1 | 6/2017 | Moon et al. | |
| 2017/0373918 A1 | 12/2017 | Kwak et al. | |
| 2017/0374421 A1* | 12/2017 | Yim | H04N 21/2668 |
| 2018/0026733 A1 | 1/2018 | Yang et al. | |
| 2018/0041782 A1 | 2/2018 | Kwon et al. | |
| 2018/0048854 A1 | 2/2018 | Kwak et al. | |
| 2018/0063574 A1 | 3/2018 | Stockhammer et al. | |
| 2018/0306542 A1 | 10/2018 | Herrera et al. | |
| 2019/0158895 A1 | 5/2019 | Kwak et al. | |
| 2019/0238950 A1 | 8/2019 | Stockhammer et al. | |
| 2020/0029120 A1 | 1/2020 | Kitazato et al. | |
| 2020/0359106 A1* | 11/2020 | Oh | H04L 61/2592 |
| 2021/0044367 A1* | 2/2021 | Yamagishi | H04N 21/4344 |

FOREIGN PATENT DOCUMENTS

| | | |
|---|---|---|
| JP | 2016-76957 A | 5/2016 |
| KR | 10-2006-0063612 A | 6/2006 |
| WO | WO 2011/153080 A2 | 12/2011 |
| WO | WO 2016/112157 A1 | 7/2016 |

OTHER PUBLICATIONS

Extended European Search Report dated Jun. 14, 2019 in corresponding European Patent Application No. 17858194.8, 8 pages.

* cited by examiner

FIG. 8

S-TSID OF SLS-svc-1

```
<S-TSID serviceId='svc-1'>
 <RS dIpAddr='dIpAddr-svc-1' ...>
  <LS tsi='tsi-av-1-1'>...</LS>
 </RS>
</S-TSID>
```

FIG. 9

S-TSID OF SLS-svc-2

```
<S-TSID serviceId='svc-2'>
 <RS dIpAddr='dIpAddr-svc-2'  bsid='bsid-1' ...>
  <LS tsi='tsi-av-2-1'>...</LS>
 </RS>
 <RS dIpAddr='dIpAddr-svc-2'  bsid='bsid-2' ...>
  <LS tsi='tsi-av-2-2'>...</LS>
 </RS>
</S-TSID>
```

FIG. 10

| Element and Attribute Names | Use | Data Type | Description |
|---|---|---|---|
| S-TSID | | | Service Transport Session Instance Description |
| @serviceId | 0..1 | unsignedShort | Reference to corresponding service element in the USBD fragment. |
| RS | 1..N | | ROUTE session |
| @sIpAddr | 0..1 | string | Source IP address of this ROUTE session other than session carrying SLS(session signaled in SLT);defaults to session carrying SLS. |
| @dIpAddr | 0..1 | string | Destination IP address of this ROUTE session;mandatory for ROUTE session other than session carrying SLS(session signaled in SLT);defaults to session carrying SLS. |
| @dport | 0..1 | unsignedShort | Destination port of this ROUTE session;mandatory for ROUTE session other than session carrying SLS(session signaled in SLT);defaults to session carrying SLS. |
| @bsid | 0..1 | unsignedShort | Identifier of the Broadcast Stream within which the content component(s) of the broadcast service are carried. |
| LS | 1..N | | LCT channel |
| @tsi | 1 | unsignedInt | TSI value |
| @bw | 0..1 | unsignedInt | Maximum bandwidth |
| @startTime | 0..1 | dateTime | Start time |
| @endTime | 0..1 | dateTime | End time |
| SrcFlow | 0..1 | srcFlowType | Information about the Source Flow |
| RepairFlow | 0..1 | rprFlowType | Information about the Repair Flow |

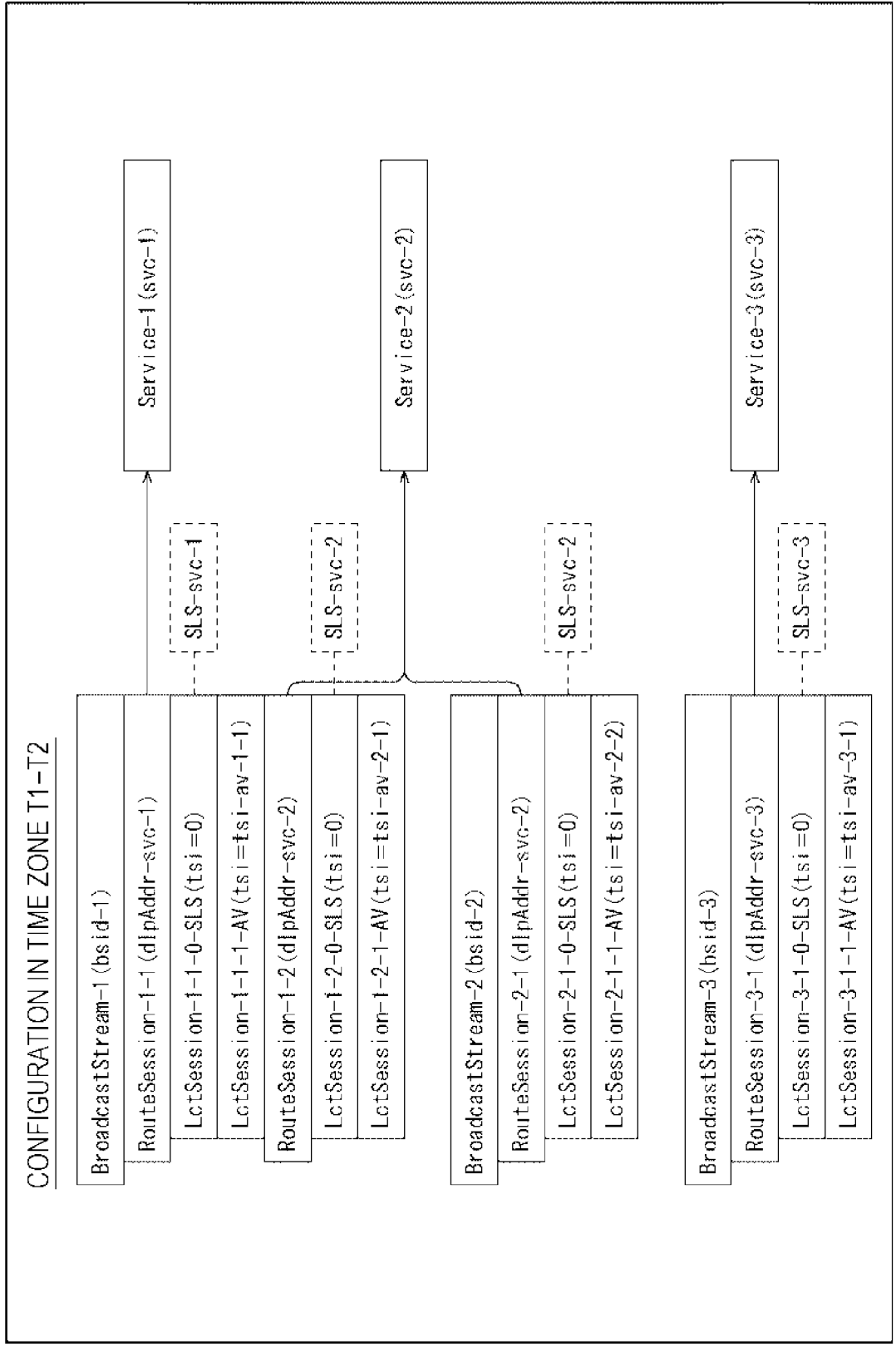

FIG. 12

S-TSID OF SLS-svc-1

```
<S-TSID serviceId='svc-1'>
 <RS dIpAddr='dIpAddr-svc-1' ...>
  <LS tsi='tsi-av-1-1'>...</LS>
 </RS>
</S-TSID>
```

FIG. 13

S-TSID OF SLS-svc-2

```
<S-TSID serviceId='svc-2'>
 <RS dIpAddr='dIpAddr-svc-2'  bsid='bsid-1' ...>
  <LS tsi='tsi-av-2-1'>...</LS>
 </RS>
 <RS dIpAddr='dIpAddr-svc-2'  bsid='bsid-2' ...>
  <LS tsi='tsi-av-2-2'>...</LS>
 </RS>
</S-TSID>
```

FIG. 14

S-TSID OF SLS-svc-3

```
<S-TSID serviceId='svc-3'>
 <RS dIpAddr='dIpAddr-svc-3' ...>
  <LS tsi='tsi-av-3-1'>...</LS>
 </RS>
</S-TSID>
```

*FIG. 16*

S-TSID OF SLS-svc-1 (COMMON TO THREE BroadcastStreams)

```
<S-TSID serviceId='svc-1'>
 <RS dIpAddr='dIpAddr-svc-1' bsid='bsid-1'...>
  <LS tsi='tsi-av-1-1'>...</LS>
 </RS>
 <RS dIpAddr='dIpAddr-svc-1' bsid='bsid-2'...>
  <LS tsi='tsi-av-1-2'>...</LS>
 </RS>
 <RS dIpAddr='dIpAddr-svc-1' bsid='bsid-3'...>
  <LS tsi='tsi-av-1-3'>...</LS>
 </RS>
</S-TSID>
```

FIG. 18

S-TSID OF SLS-svc-2

```
<S-TSID serviceId='svc-2'>
 <RS dIpAddr='dIpAddr-svc-2' bsid='bsid-1' priority='low' ...>
  <LS tsi='tsi-av-2-1'>...</LS>
 </RS>
 <RS dIpAddr='dIpAddr-svc-2' bsid='bsid-2' priority='high' ...>
  <LS tsi='tsi-av-2-2'>...</LS>
 </RS>
</S-TSID>
```

FIG. 19

| Element and Attribute Names | Use | Data Type | Description |
|---|---|---|---|
| S-TSID | | | Service Transport Session Instance Description |
| @serviceId | 0..1 | unsignedShort | Reference to corresponding service element in the USBD fragment. |
| RS | 1..N | | ROUTE session |
| @sIpAddr | 0..1 | string | Source IP address of this ROUTE session;mandatory for ROUTE session other than session carrying SLS(session signaled in SLT);defaults to session carrying SLS. |
| @dIpAddr | 0..1 | string | Destination IP address of this ROUTE session;mandatory for ROUTE session other than session carrying SLS(session signaled in SLT);defaults to session carrying SLS. |
| @dport | 0..1 | unsignedShort | Destination port of this ROUTE session;mandatory for ROUTE session other than session carrying SLS(session signaled in SLT);defaults to session carrying SLS. |
| @bsid | 0..1 | unsignedShort | Identifier of the Broadcast Stream within which the content component(s) of the broadcast service are carried. |
| @priority | 0..1 | string | Priority applied on RS for configuring meaningful presentation of the service. |
| LS | 1..N | | LCT channel |
| @tsi | 1 | unsignedInt | TSI value |
| @bw | 0..1 | unsignedInt | Maximum bandwidth |
| @startTime | 0..1 | dateTime | Start time |
| @endTime | 0..1 | dateTime | End time |
| SrcFlow | 0..1 | srcFlowType | Information about the Source Flow |
| RepairFlow | 0..1 | rprFlowType | Information about the Repair Flow |

FIG. 21

SLT AND S-TSID FLOWING IN BroadcastStream-1 IN TIME ZONE T1-T2

SLT OF BroadcastStream-1

```
<SLT ... bsid='bsid-1'>
  <Service serviceId='svc-1' ... > ....
    <BroadcastSvcSignaling slsDestinationIpAddress='dIpAddr-svc-1' ...>
  </Service>
  <Service serviceId='svc-2' ... > ....
    <BroadcastSvcSignaling slsDestinationIpAddress='dIpAddr-svc-2' ...>
  </Service>
</SLT>
```

S-TSID OF SLS-svc-1

```
<S-TSID serviceId='svc-1'>
  <RS dIpAddr='dIpAddr-svc-1' ...>
    <LS tsi='tsi-av-1-1'>...</LS>
  </RS>
</S-TSID>
```

S-TSID OF SLS-svc-2 (SAME AS SLS-svc-2 OF BroadcastStream-2)

```
<S-TSID serviceId='svc-2'>
  <RS dIpAddr='dIpAddr-svc-2' bsid='bsid-1' ...>
    <LS tsi='tsi-av-2-1'>...</LS>
  </RS>
  <RS dIpAddr='dIpAddr-svc-2' bsid='bsid-2' ...>
    <LS tsi='tsi-av-2-2'>...</LS>
  </RS>
</S-TSID>
```

FIG. 22

SLT AND S-TSID FLOWING IN BroadcastStream-2 IN TIME ZONE T1-T2

SLT OF BroadcastStream-2

```
<SLT ... bsid='bsid-2'>
  <Service serviceId='svc-2' ... > ....
    <BroadcastSvcSignaling slsDestinationIpAddress='dIpAddr-svc-2' ...>
  </Service>
</SLT>
```

S-TSID OF SLS-svc-2 (SAME AS SLS-svc-2 OF BroadcastStream-1)

```
<S-TSID serviceId='svc-2'>
  <RS dIpAddr='dIpAddr-svc-2' bsid='bsid-1' ...>
    <LS tsi='tsi-av-2-1'>...</LS>
  </RS>
  <RS dIpAddr='dIpAddr-svc-2' bsid='bsid-2' ...>
    <LS tsi='tsi-av-2-2'>...</LS>
  </RS>
</S-TSID>
```

FIG. 23

SLT AND S-TSID FLOWING IN BroadcastStream-3 IN TIME ZONE T1-T2

SLT OF BroadcastStream-3

```
<SLT ... bsid='bsid-3'>
  <Service serviceId='svc-3' ... >  ....
    <BroadcastSvcSignaling slsDestinationIpAddress='dIpAddr-svc-3' ... >
  </Service>
</SLT>
```

S-TSID OF SLS-svc-3

```
<S-TSID serviceId='svc-3' >
  <RS dIpAddr='dIpAddr-svc-3' ... >
    <LS tsi='tsi-av-3-1'> ... </LS>
  </RS>
</S-TSID>
```

FIG. 24

SLT AND S-TSID FLOWING IN BroadcastStream-1 IN TIME ZONE T2-T3

SLT OF BroadcastStream-1

```
<SLT ... bsid='bsid-1'>
 <Service serviceId='svc-1' ... > ....
  <BroadcastSvcSignaling slsDestinationIpAddress='dIpAddr-svc-1' ...>
 </Service>
</SLT>
```

S-TSID OF SLS-svc-1 (COMMON TO THREE BroadcastStreams)

```
<S-TSID serviceId='svc-1'>
 <RS dIpAddr='dIpAddr-svc-1' bsid='bsid-1' ...>
  <LS tsi='tsi-av-1-1'>...</LS>
 </RS>
 <RS dIpAddr='dIpAddr-svc-1' bsid='bsid-2' ...>
  <LS tsi='tsi-av-1-2'>...</LS>
 </RS>
 <RS dIpAddr='dIpAddr-svc-1' bsid='bsid-3' ...>
  <LS tsi='tsi-av-1-3'>...</LS>
 </RS>
</S-TSID>
```

FIG. 25

SLT AND S-TSID FLOWING IN BroadcastStream-2 IN TIME ZONE T2-T3

SLT OF BroadcastStream-2

```
<SLT ... bsid='bsid-2'>
  <Service serviceId='svc-1' ... >
    <BroadcastSvcSignaling slsDestinationIpAddress='dIpAddr-svc-1' ...>
  </Service>
</SLT>
```

S-TSID OF SLS-svc-1 (COMMON TO THREE BroadcastStreams)

```
<S-TSID serviceId='svc-1'>
  <RS dIpAddr='dIpAddr-svc-1' bsid='bsid-1' ...>
    <LS tsi='tsi-av-1-1'>...</LS>
  </RS>
  <RS dIpAddr='dIpAddr-svc-1' bsid='bsid-2' ...>
    <LS tsi='tsi-av-1-2'>...</LS>
  </RS>
  <RS dIpAddr='dIpAddr-svc-1' bsid='bsid-3' ...>
    <LS tsi='tsi-av-1-3'>...</LS>
  </RS>
</S-TSID>
```

FIG. 26

SLT AND S-TSID FLOWING IN BroadcastStream-3 IN TIME ZONE T2-T3

SLT OF BroadcastStream-3

```
<SLT ... bsid='bsid-3'>
  <Service serviceId='svc-1' ... > ....
    <BroadcastSvcSignaling slsDestinationIpAddress'dIpAddr-svc-1' ...>
  </Service>
</SLT>
```

S-TSID OF SLS-svc-1 (COMMON TO THREE BroadcastStreams)

```
<S-TSID serviceId='svc-1'>
  <RS dIpAddr='dIpAddr-svc-1'bsid='bsid-1' ...>
    <LS tsi='tsi-av-1-1'>...</LS>
  </RS>
  <RS dIpAddr='dIpAddr-svc-1'bsid='bsid-2' ...>
    <LS tsi='tsi-av-1-2'>...</LS>
  </RS>
  <RS dIpAddr='dIpAddr-svc-1'bsid='bsid-3' ...>
    <LS tsi='tsi-av-1-3'>...</LS>
  </RS>
</S-TSID>
```

FIG. 45

```
Schedule Fragment

Schedule
        id
        version
        validFrom
        validTo
        ServiceReference
            idRef
        ContentReference
            idRef
            ContentLocation
            PresentationWindow
                startTime
                endTime
                Duration
                id
        TermsOfUse
        PrivateExt
```

FIG. 47

```
<Schedule ...>
 ...
 <PrivateExt>
  <bsidReference>xxxx</bsidReference>
  <bsidReference>yyyy</bsidReference>
 </PrivateExt>
</Schedule>
```

RECEIVING DEVICE, TRANSMITTING DEVICE, AND DATA PROCESSING METHOD

CROSS-REFERENCE TO RELATED APPLICATIONS

This application is a continuation of U.S. Ser. No. 16/327,956, filed on Feb. 25, 2019, which is incorporated by reference. U.S. Ser. No. 16/327,956 is a National Stage of PCT/JP2017/033798, filed on Sep. 20, 2017, and claims the benefit of priority under 35 U.S.C. § 119 of Japanese Application No. 2016-196107, filed Oct. 4, 2016.

TECHNICAL FIELD

The present technology relates to a receiving device, a transmitting device, and a data processing method, and more particularly to, a receiving device, a transmitting device, and a data processing which are capable of providing a broadcast service using a wide bandwidth more flexibly.

BACKGROUND ART

In terrestrial digital broadcasting, for example, a bandwidth of 6 MHz or the like is allocated as a bandwidth of an RF channel (for example, see Non-Patent Document 1).

Further, scalable video coding (hierarchical encoding) is known as one of video coding schemes, (for example, see Patent Document 1). Here, the scalable video coding (SVC) refers to a technique of hierarchically encoding a base layer that transmits a stream used for a basic quality and a high quality and an enhancement layer that transmits a stream used only for a high quality.

CITATION LIST

Patent Document

Non-Patent Document 1: ATSC Candidate Standard: Physical Layer Protocol (A/322)
Patent Document 1: Japanese Patent Application Laid-Open No. 2016-076957

SUMMARY OF THE INVENTION

Problems to be Solved by the Invention

By the way, for example, when a broadband service such as a broadcast service using the scalable video coding is implemented in the terrestrial digital broadcasting, a stream of a broadcast service is assumed not to fall within a band of a bandwidth of one RF channel.

However, a technical scheme for providing a broadcast service of a stream requiring such a wide bandwidth has not been established, and proposals for making it possible to provide a broadcast service using a wide bandwidth more flexibly have been requested.

The present technology was made in light of the foregoing, and it is an object of the present technology to make it possible to provide a broadcast service using a wider bandwidth more flexibly.

Solutions to Problems

A receiving device according to a first aspect of the present technology is a receiving device including a receiving unit that receives a stream of a broadcast service and a processing unit that processes the stream, and in the stream, delivery configuration information indicating that the stream of the broadcast service is delivered across a predetermined frequency band is included in transmission information which is transmitted through an upper layer higher than a physical layer, and the processing unit processes the stream having a delivery configuration corresponding to the delivery configuration information.

The receiving device of the first aspect of the present technology may be an independent device or an internal block constituting one device.

Further, a data processing method of the first aspect of the present technology is a data processing method corresponding to the receiving device of the first aspect of the present technology described above.

In the receiving device and the data processing method of the first aspect of the present technology, the stream of the broadcast service is received, and the stream is processed.

Further, the stream includes transmission information which is transmitted through an upper layer higher than a physical layer and includes delivery configuration information indicating that a stream of a broadcast service is delivered across a predetermined frequency band, the stream having a delivery configuration corresponding to the delivery configuration information is processed.

A transmitting device of a second aspect of the present technology is a transmitting device including a generating unit that generates transmission information which is transmitted through an upper layer higher than a physical layer and includes delivery configuration information indicating that a stream of a broadcast service is delivered across a predetermined frequency band and a transmitting unit that transmits a stream including the transmission information.

The transmitting device of the second aspect of the present technology may be an independent device or an internal block constituting one device.

Further, a data processing method of the second aspect of the present technology is a data processing method corresponding to the transmitting device of the second aspect of the present technology described above.

In the transmitting device and the data processing method of the second aspect of the present technology, transmission information which is transmitted through an upper layer higher than a physical layer and includes delivery configuration information indicating that a stream of a broadcast service is delivered across a predetermined frequency band is generated, and a stream including the transmission information is transmitted.

Effects of the Invention

According to the first and second aspects of the present technology, it is possible to provide a broadcast service using a wider bandwidth more flexibly.

Further, the effects described herein are not necessarily limited, and any of effects described in the present disclosure may be included.

BRIEF DESCRIPTION OF DRAWINGS

FIG. 8 is a diagram illustrating an example of S-TSID metadata of a service 1.

FIG. 9 is a diagram illustrating an example of S-TSID metadata of a service 2.

FIG. 10 is a diagram illustrating an example of a format of S-TSID metadata.

FIG. 11 is a diagram illustrating a configuration of delivery in a time zone T1-T2.

FIG. 12 is a diagram illustrating an example of S-TSID metadata of a service 1.

FIG. 13 is a diagram illustrating an example of S-TSID metadata of a service 2.

FIG. 14 is a diagram illustrating an example of S-TSID metadata of a service 3.

FIG. 16 is a diagram illustrating an example of S-TSID metadata common to respective broadcast services.

FIG. 18 is a diagram illustrating an example of S-TSID metadata of a service 2.

FIG. 19 is a diagram illustrating an example of a format of S-TSID metadata.

FIG. 21 is a diagram illustrating an example of SLT metadata and S-TSID metadata in a delivery configuration of FIG. 11.

FIG. 22 is a diagram illustrating an example of SLT metadata and S-TSID metadata in a delivery configuration of FIG. 11.

FIG. 23 is a diagram illustrating an example of SLT metadata and S-TSID metadata in a delivery configuration of FIG. 11.

FIG. 24 is a diagram illustrating an example of SLT metadata and S-TSID metadata in a delivery configuration of FIG. 15.

FIG. 25 is a diagram illustrating an example of SLT metadata and S-TSID metadata in a delivery configuration of FIG. 15.

FIG. 26 is a diagram illustrating an example of SLT metadata and S-TSID metadata in a delivery configuration of FIG. 15.

FIG. 45 is a diagram illustrating a configuration example of a schedule fragment of an ESG.

FIG. 47 is a diagram illustrating an example of an XML instance of a schedule fragment of an ESG.

MODE FOR CARRYING OUT THE INVENTION

Figure 1:
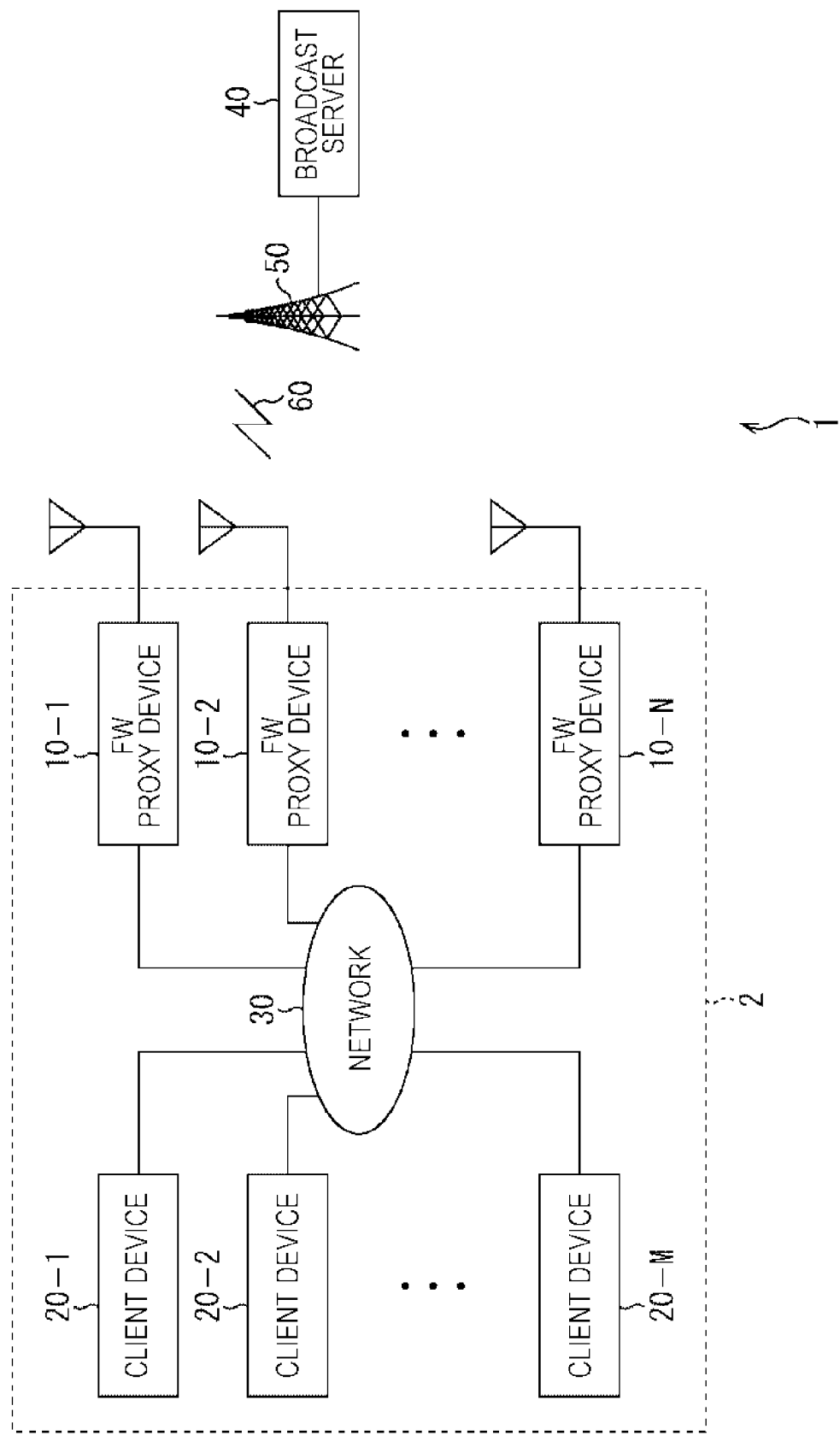
FIG. 1 is a diagram illustrating a configuration of an embodiment of a transmission system to which the present technology is applied.

Hereinafter, an embodiment of the present technology will be described with reference to the appended drawings. Further, the description will proceed in the following order.

1. Configuration of system
2. Overview of the present technology
3. Use case
4. Priority between ROUTE sessions
5. Mapping management between tuner and broadcast service
6. Notification to end user by ESG
7. Modified example
8. Configuration of computer

1. Configuration of System (Configuration Example of Transmission System)

FIG. 1 is a diagram illustrating a configuration of an embodiment of a transmission system to which the present technology is applied. Further, a term "system" refers to a logical aggregation of a plurality of devices.

In FIG. 1, a transmission system 1 includes FW proxy devices 10-1 to 10-N(N is an integer of 1 or more), client devices 20-1 to 20-M (M is an integer of 1 or more), and a broadcast server 40.

In the transmission system 1, the FW proxy devices 10-1 to 10-N and the client devices 20-1 to 20-M are connected to each other via a network 30 such as a home Local Area Network (LAN) constructed in an end user home 2 and are capable of performing communication with each other.

The FW proxy device 10-1 is installed between a device connected to the network 30 and a broadcast transmission path 60 including the broadcast server 40, a transmitting station 50, and the like, and has a function of a forward proxy (gateway function). The FW proxy device 10-1 includes a dedicated server for providing a forward proxy function, a television receiver, a set top box (STB), a network storage, a game machine, or the like.

The FW proxy device 10-1 receives a broadcast wave transmitted from the broadcast server 40 via the transmitting station 50 and transmits a stream of content obtained from the broadcast wave to one of the client devices 20-1 to 20-M connected to the network 30.

Similarly to the FW proxy device 10-1, each of the FW proxy devices 10-2 to 10-N includes a dedicated server, a television receiver, and the like and has a function of a forward proxy. Each of the FW proxy devices 10-2 to 10-N transmits (transfers) a stream of content obtained from the broadcast wave from the broadcast server 40 to one of the client devices 20-1 to 20-M connected to the network 30.

Here, as will be described in detail later, the FW proxy devices 10-1 to 10-N connected to the network 30 have a master/slave relation in which any one of FW proxy devices 10 functions as a master proxy, and the other FW proxy devices 10 serve as a slave proxy. Further, since the FW proxy devices 10-1 to 10-N have the master/slave relation, the FW proxy device 10 operated by the master proxy allocates a broadcast service responsible range to each of the FW proxy devices 10.

Further, the FW proxy devices 10-1 to 10-N are referred to simply as a FW proxy device 10 in a case where it is not particularly necessary to distinguish them from one another.

Further, in the following description, the FW proxy device 10 having the function of the master proxy is referred to as a master proxy device 10M, whereas the FW proxy device 10 having the function of the slave proxy is referred to as a slave proxy device 10S for distinguishing them.

Further, a detailed configuration of the master proxy device 10M will be described later with reference to FIG. 2. Further, a detailed configuration of the slave proxy device 10S will be described later with reference to FIG. 3. Further, in the following description, the master proxy device 10M and the slave proxy device 10S are referred to as a FW proxy device 10 in a case where it is not particularly necessary to distinguish them. In other words, the FW proxy device 10 is either the master proxy device 10M or the slave proxy device 10S.

The client device 20-1 is a receiver that receives a stream of content transmitted (transferred) from any one of the FW proxy devices 10-1 to 10-N via the network 30 and reproduces the stream. In other words, the client device 20-1 reproduces (or records) content to be delivered via broadcasting via one of the FW proxy devices 10-1 to 10-N in accordance with a manipulation of the end user or the like.

The client device 20-1 is configured as a fixed receiver such as a television receiver, a set top box, a personal computer, a game machine, or the like or a mobile receiver such as a smartphone, a mobile phone, a tablet computer, or the like. Further, the client device 20-1 may be a wearable computer such as a head mounted display (HMD).

Similarly to the client device 20-1, each of the client devices 20-2 to 20-M is constituted by a fixed receiver used at home, a mobile receiver, or the like, and receives a stream of content to be delivered via broadcasting via one of the FW proxy devices 10-1 to 10-N and reproduces (or records) the stream.

Further, in the following description, the client devices 20-1 to 20-M are referred to simply as a client device 20 in a case where it is not particularly necessary to distinguish them. Further, a detailed configuration of the client device 20 will be described later with reference to FIG. 4.

The broadcast server 40 is, for example, a server provided by a broadcasting company such as a broadcasting station and is connected to a transmission facility installed in the transmitting station 50 via a predetermined line such as a dedicated line. Further, a detailed configuration of the broadcast server 40 will be described later with reference to FIG. 5.

The broadcast server 40 processes a file (data) of content such as a program or a CM or control information (signaling), and transmits transmission data obtained as a result to the transmitting facility in the transmitting station 50 via a dedicated line. Then, the transmitting facility in the transmitting station 50 performs a necessary process (a modulation process or the like) on the transmission data from the broadcast server 40, and a broadcast wave obtained as a result is received by the FW proxy device 10 in the end user home 2 via the broadcast transmission path 60.

Further, in the transmission system illustrated in FIG. 1, the example in which the FW proxy device 10 and the client device 20 are arranged in the end user home 2 has been described, but the FW proxy device 10 is not limited to being installed in the end user home 2 and may be installed in a head end of a cable operator, a base station of a mobile network, or the like, for example, so that a wider range of area can be covered.

In other words, for example, in a case where the FW proxy device 10 is installed in the head end of the cable operator, the client device 20 is installed at home of each end user who subscribes to a cable television service other than the same end user home. Further, for example, in a case where the FW proxy device 10 is installed in the base station of the mobile network, the client device 20 serves as a device (a mobile receiver) which the end user subscribing to a mobile service carries indoors or outdoors.

Further, each of the FW proxy device 10 and the client device 20 may be an in-vehicle device mounted in a vehicle such as an automobile. Further, in the transmission system 1 of FIG. 1, the communication performed between the device and the server connected to the network 30 is not limited to wireless communication and wired communication, and communication in which wireless communication and wired communication are mixed may be performed, that is, wireless communication may be performed in a certain section, and wired communication may be performed in other sections.

(Configuration of Master Proxy Device)

Figure 2:
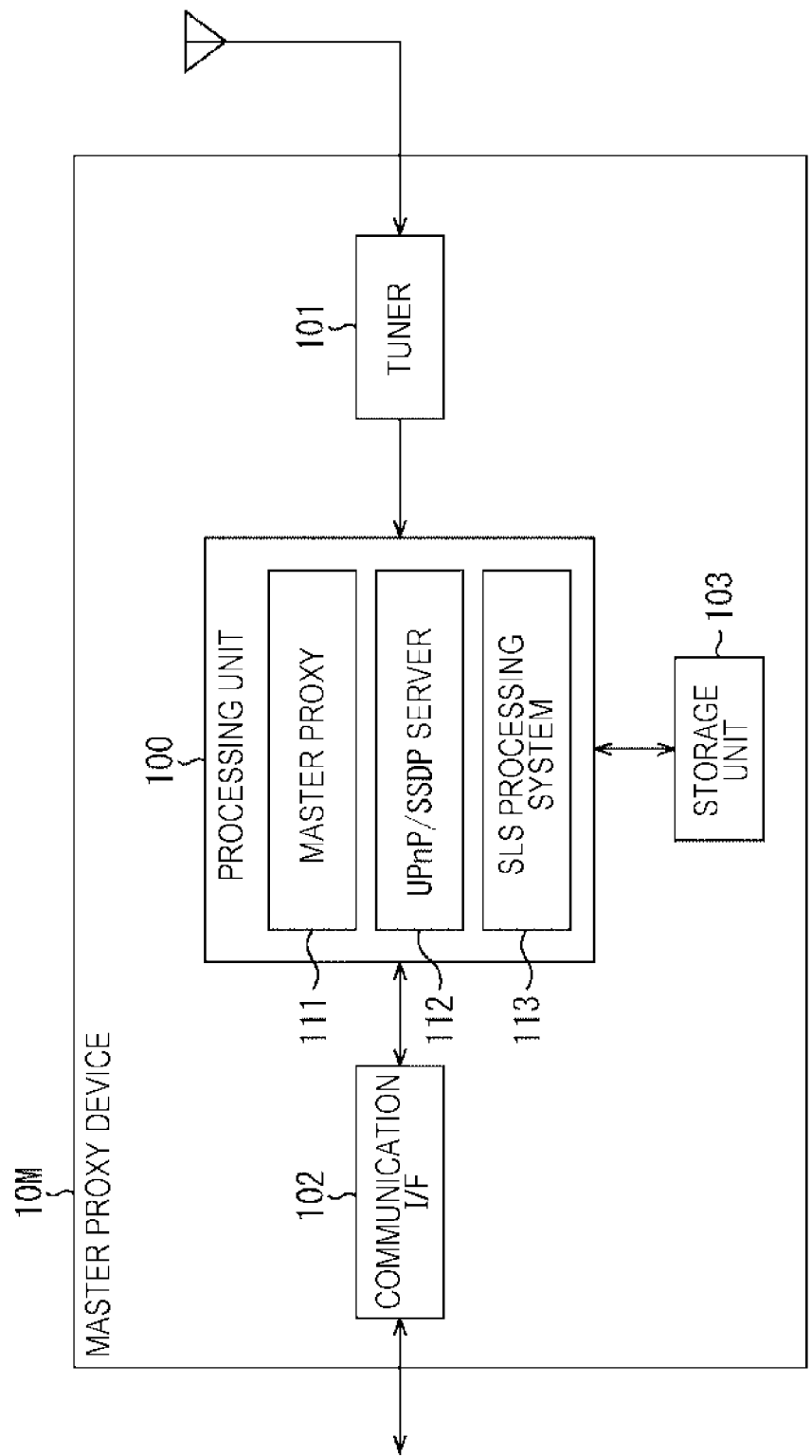
FIG. 2 is a diagram illustrating a configuration example of a master proxy device.

FIG. 2 is a diagram illustrating a configuration example of the master proxy device 10M among the FW proxy devices 10 of FIG. 1.

In FIG. 2, the master proxy device 10M includes a processing unit 100, a tuner 101, a communication I/F 102, and a storage unit 103.

The processing unit 100 includes, for example, a central processing unit (CPU), a microprocessor, or the like. The processing unit 100 performs processes such as various types arithmetic processes or operation control of each unit.

The tuner 101 performs a necessary process (a demodulation processing or the like) on the broadcast waves received via the antenna, and supplies a multiplexed stream obtained as a result to the processing unit 100. The processing unit 100 processes the multiplexed stream supplied from the tuner 101 and supplies a stream of content obtained as a result to the communication I/F 102. Further, in FIG. 2, only one tuner 101 is installed, but a plurality of tuners may be installed.

The communication I/F 102 includes, for example, a communication interface circuit or the like. The communication I/F 102 receives data transmitted from the client device 20 connected to the network 30, and supplies the data to the processing unit 100. Further, the communication I/F 102 transmits a stream of content supplied from the processing unit 100 to the client device 20 via the network 30.

The storage unit 103 includes, for example, a semiconductor memory, a hard disk drive (HDD), or the like. The storage unit 103 stores various types of data in accordance with control from the processing unit 100.

The processing unit 100 includes a master proxy 111, a UPnP/SSDP server 112, and an SLS processing system 113.

The master proxy 111 is a service operating on the master proxy device 10M and functions as a master proxy for the slave proxy operating on the slave proxy device 10S.

The master proxy 111 performs a process of allocating a broadcast service responsible range to itself (master proxy) or the slave proxy. The master proxy 111 performs a process on the broadcast service of the responsible range in accordance with the broadcast service responsible range allocated by itself.

Further, the master proxy 111 notifies the slave proxy which is responsible a target broadcast service of a request from the client device 20. Further, the process performed by the master proxy 111 will be described later in detail with reference to FIGS. 27 and 32 and the like.

The UPnP/SSDP server 112 is a service operating on the master proxy device 10M.

The UPnP/SSDP server 112 performs a process for establishing the master/slave relation between the master proxy 111 and the slave proxy operating on the slave proxy device 10S connected to the network 30. Further, the UPnP/SSDP server 112 performs a process for establishing a connection between the master proxy 111 and the client device 20 connected to the network 30.

The SLS processing system 113 performs a process related to service layer signaling (SLS) which is control information acquired via broadcasting. As the SLS is processed by the SLS processing system 113, a stream of desired content (a stream of content delivered by the broadcast service of the responsible range) is obtained from the multiplexed stream. Further, the SLS will be described later in detail with reference to FIG. 6.

The master proxy device 10M is configured as described above.

(Configuration of Slave Proxy Device)

Figure 3:
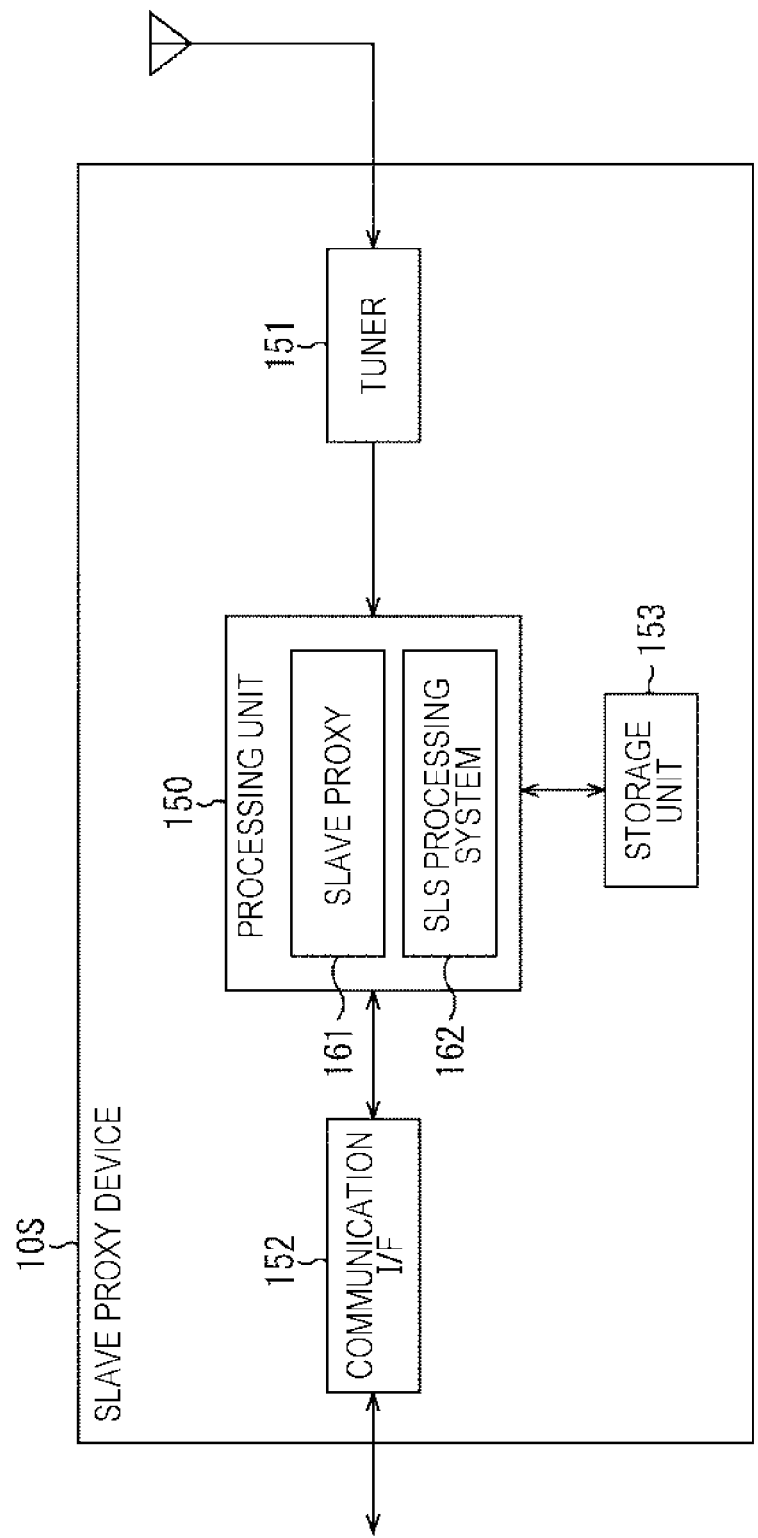
FIG. 3 is a diagram illustrating a configuration example of a slave proxy device.

FIG. 3 is a diagram illustrating a configuration example of the slave proxy device 10S among the FW proxy devices 10 of FIG. 1.

In FIG. 3, the slave proxy device 10S includes a processing unit 150, a tuner 151, a communication I/F 152, and a storage unit 153. Further, since the tuners 151 to the storage unit 153 are configured similarly to the tuners 101 to the storage unit 103 of FIG. 2, description thereof is omitted here. However, a plurality of tuners may be installed.

The processing unit 150 includes, for example, a CPU, a microprocessor, or the like. The processing unit 150 performs a process such as various types of arithmetic processes or operation control of each unit.

The processing unit 150 includes a slave proxy 161 and an SLS processing system 162.

The slave proxy 161 is a service operating on the slave proxy device 10S, and functions as a slave proxy for the master proxy 111 operating on the master proxy device 10M.

The slave proxy 161 performs a process on the broadcast service of the responsible range in accordance with the broadcast service responsible range allocated by the master proxy 111. Further, the process performed by the slave proxy 161 will be described later in detail with reference to FIGS. 27 and 32 and the like.

The SLS processing system 162 performs a process related to the SLS which is control information acquired via broadcasting. By processing the SLS by the SLS processing system 162, a stream of desired content (a stream of content delivered by the broadcast service of the responsible range) is obtained from the multiplexed stream. Further, the SLS will be described later in detail with reference to FIG. 6.

The slave proxy device 10S is configured as described above.

(Configuration of Client Device)

Figure 4:
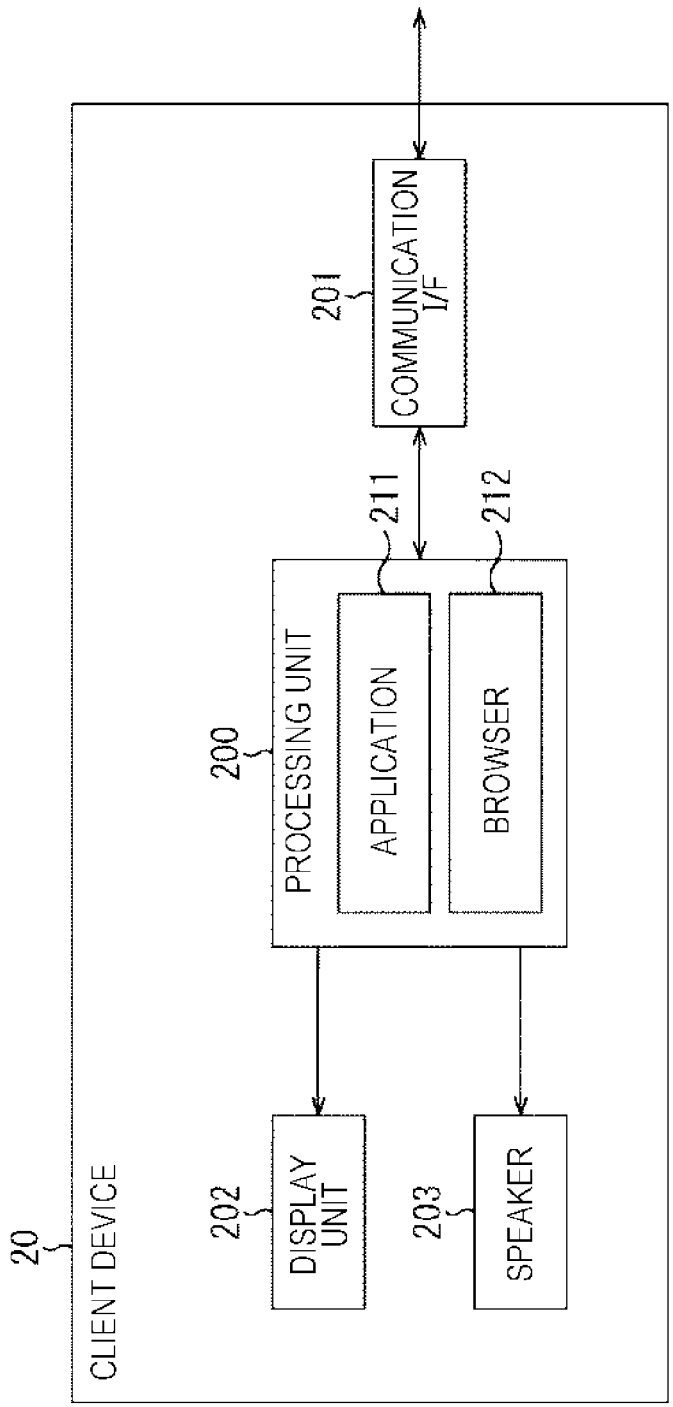
FIG. 4 is a diagram illustrating a configuration example of a client device.

FIG. 4 is a diagram illustrating a configuration example of the client device 20 of FIG. 1.

In FIG. 4, the client device 20 includes a processing unit 200, a communication I/F 201, a display unit 202, and a speaker 203.

The processing unit 200 includes, for example, a CPU, a microprocessor, or the like. The processing unit 200 performs processes such as various types of arithmetic processes or operation control of each unit.

The communication I/F 201 includes, for example, a communication interface circuit or the like.

The communication I/F 201 requests the master proxy device 10M connected to the network 30 to transmit content to be delivered via a desired broadcast service in accordance with the control from the processing unit 200. Further, the communication I/F 201 receives a stream of content transmitted (transferred) from the master proxy device 10M or the slave proxy device 10S via the network 30 and supplies the stream to the processing unit 200.

The processing unit 200 processes the stream of content supplied from the communication I/F 201, supplies video data among the data obtained as a result to the display unit 202, and supplies audio data to the speaker 203.

The display unit 202 includes, for example, a display such as a liquid crystal display (LCD) or an organic electroluminescence display (OELD). The display unit 202 displays a video corresponding to the video data supplied from the processing unit 200. The speaker 203 outputs a sound corresponding to the audio data supplied from the processing unit 200.

Further, in a case where the display unit 202 has a function of a touch panel, a manipulation signal corresponding to a manipulation of the end user on the touch panel is supplied to the processing unit 200, and the processing unit 200 performs a process corresponding to the manipulation signal. Further, although not illustrated in FIG. 4, even in a case where an input unit such as a physical button may be installed, and a manipulation signal corresponding to a manipulation of the end user on the input unit may be supplied to the processing unit 200.

The processing unit 200 includes an application 211 and a browser 212. A renderer function is provided by the application 211 and the browser 212.

The application 211 performs a process that enables the client device 20 connected to the network 30 to establish a connection with the master proxy 111 operating on the master proxy device 10M. Further, the process performed by the application 211 will be described later in detail with reference to FIG. 32.

The browser 212 processes data which is a stream of content supplied from the communication I/F 201 and is received via broadcasting by the master proxy device 10M or the slave proxy device 10S, and reproduces content.

Further, the browser 212 has a function of a DASH player which will be described later in detail with reference to FIG. 6. Further, the process performed in the browser 212 will be described later in detail with reference to FIG. 32.

The client device 20 is configured as described above.
(Configuration Example of Broadcast Server)

Figure 5:
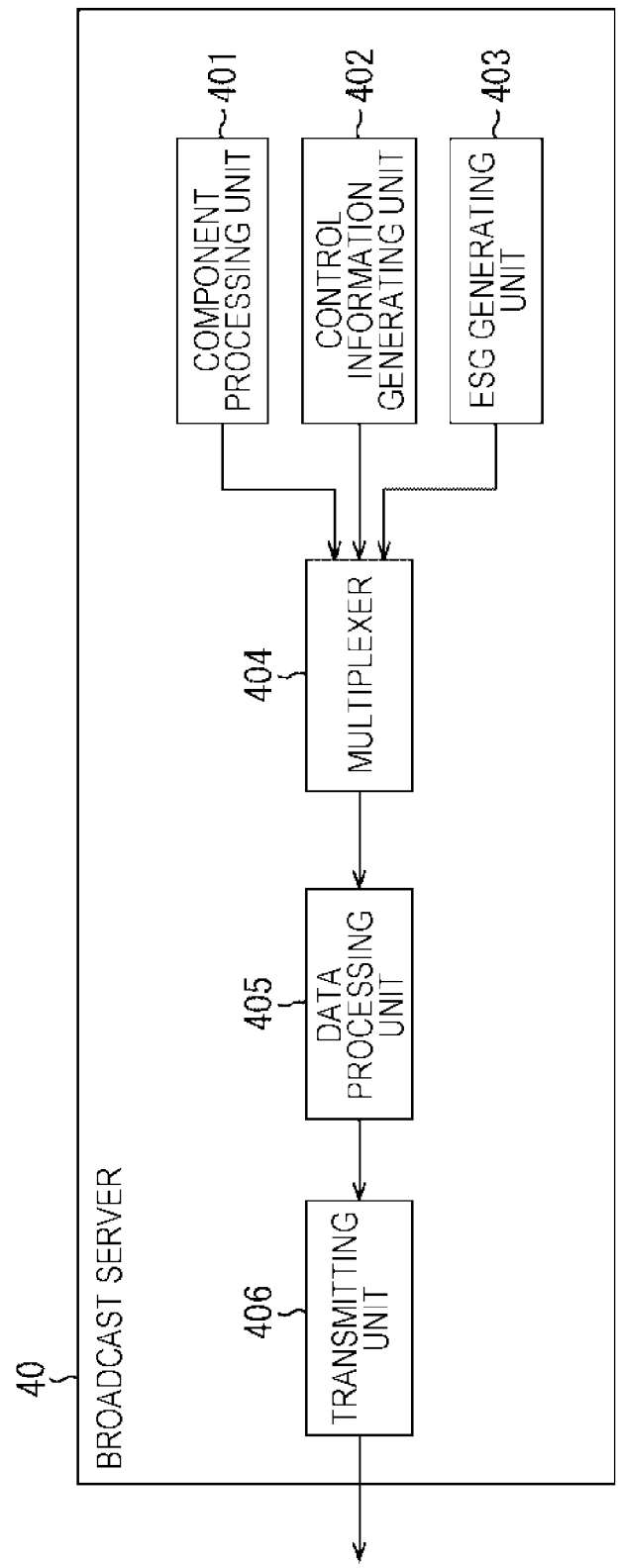
FIG. 5 is a diagram illustrating a configuration example of a broadcast server.

FIG. 5 is a diagram illustrating a configuration example of the broadcast server 40 of FIG. 1.

In FIG. 5, the broadcast server 40 includes a component processing unit 401, a control information generating unit 402, an ESG generating unit 403, a multiplexer 404, a data processing unit 405, and a transmitting unit 406.

The component processing unit 401 processes data of a components constituting content such as a program and supplies a stream of the component obtained as a result to the multiplexer 404.

Here, the data of the component is data such as a video, an audio, a subtitle, or the like, and a process such as an encoding process according to a predetermined coding scheme (for example, the scalable video coding (hierarchical encoding), and the like) is performed on the data.

The control information generating unit 402 generates control information (control information of an upper layer) used in a process of the upper layer such as channel selection or reproduction of content, and supplies the control information to the multiplexer 404. Further, the control information of the upper layer includes signaling such as low level signaling (LLS) and service layer signaling (SLS) which will be described later in detail with reference to FIG. 6. Further, in this specification, the upper layer indicates a layer higher than the physical layer.

The ESG generating unit 403 generates electronic service guide (ESG) information and supplies the ESG information to the multiplexer 404. Further, the ESG service is an electronic service guide defined by Open Mobile Alliance (OMA) which is an organization that establishes standards of mobile phones, and the details thereof will be described later with reference to FIGS. 6 and 45 and the like.

The multiplexer 404 multiplexes the stream of the component supplied from the component processing unit 401, the stream of the control information of the upper layer supplied from the control information generating unit 402, and the stream of the ESG information supplied from the ESG generating unit 403 and supplies a multiplexed stream obtained as a result to the data processing unit 405. Further, in this case, other streams such as an application and time information may be multiplexed.

The data processing unit 405 processes the multiplexed stream supplied from the multiplexer 404, generates a packet (frame) of a predetermined format, and supplies the packet to the transmitting unit 406 as the transmission data.

The transmitting unit 406 transmits the transmission data supplied from the data processing unit 405 to the transmitting facility in the transmitting station 50 via a dedicated line.

The broadcast server 40 is configured as described above.
(Protocol Stack of the Present Technology)

Figure 6:
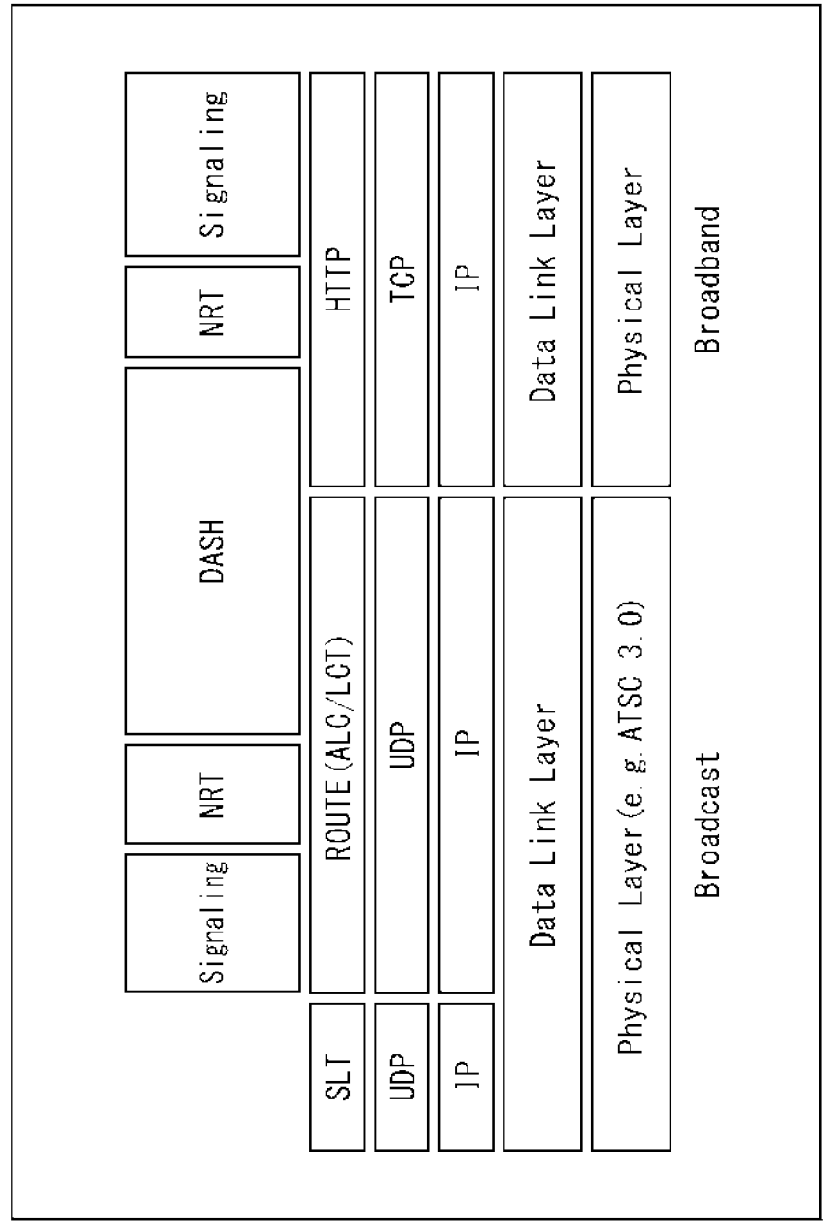
FIG. 6 is a diagram illustrating an example of a protocol stack of an IP transmission scheme of the present technology.

FIG. 6 is a diagram illustrating an example of a protocol stack of an IP transmission scheme of the present technology.

Currently, an MPEG2-Transport Stream (TS) scheme is widely used as a transmission scheme of digital broadcasting, but an Internet Protocol (IP) transmission scheme in which IP packets used in the communication field are used for digital broadcasting is expected to become popular in the future.

For example, Advanced Television Systems Committee (ATSC) 3.0 which is one of next generation terrestrial broadcast standards is also expected to be able to provide more advanced services by employing the IP transmission scheme. The present technology can also employ the IP transmission scheme, similarly to ATSC 3.0 or the like.

In FIG. 6, the lowest layer is defined as a physical layer. In the digital broadcasting of the IP transmission scheme such as ATSC 3.0, it is not limited to transmission using one-way broadcasting, and there are cases in which some pieces of data are transmitted using two-way communication, but in a case where broadcasting is used, the physical layer corresponds to a frequency band or the like of the broadcast wave allocated for services (channels).

A layer higher than the physical layer is a data link layer. Further, the layer higher than the data link layer is an Internet Protocol (IP) layer and a user datagram protocol (UDP) layer. The IP layer and the UDP layer are layers corresponding to a network layer and a transport layer in a hierarchical model of communication, and an IP packet and a UDP packet are specified by an IP address and a port number.

Here, in ATSC 3.0, low level signaling (LLS) or service layer signaling (SLS) are assumed to be used as control information (signaling). The LLS is control information transmitted in a layer lower than the SLS. The SLS is control information of a service unit. In other words, in ATSC 3.0, the control information of the transport layer is transmitted through two layers, that is, the LLS and the SLS.

The LLS includes metadata such as a service list table (SLT). The SLT metadata includes basic information indicating a configuration of a stream or a broadcast service in a broadcast network such as information necessary for channel selection of the broadcast service (channel). The SLT metadata is included in the UDP/IP packet which is an IP packet including a UDP packet and transmitted. Here, the UDP/IP packet storing the SLT metadata is transmitted with a special IP address and a port number.

An upper layer adjacent to the IP layer and the UDP layer is a Real-Time Object Delivery Over Unidirectional Transport (ROUTE). The ROUTE is a streaming file transfer protocol which is an extension of a File Delivery Over Unidirectional Transport (FLUTE).

A file (Signaling) of the SLS, a file (NRT) of non real time (NRT) content, a DASH segment file (DASH), or the like is transmitted through the ROUTE session for each broadcast service.

Here, the SLS is service level control information, and provides information, an attribute, or the like necessary for search and selection of a component belonging to a target broadcast service. The SLS includes metadata such as user service bundle description (USBD), service-based transport session instance description (S-TSID), or media presentation description (MPD).

The USBD metadata contains information such as an acquisition destination of other metadata.

The S-TSID metadata is an extension of LCT session instance description (LSID) for ATSC 3.0 and is control information of the ROUTE protocol. Further, the S-TSID metadata can specify an extended FDT (EFDT) transmitted through the ROUTE session. The EFDT is an extension of a File Delivery Table (FDT) introduced in the FLUTE, and is transfer control information.

The MPD metadata is control information of video and audio files used for streaming delivery according to MPEG-Dynamic Adaptive Streaming over HTTP (DASH).

Here, the MPEG-DASH is a streaming delivery standard according to Over The Top Video (OTT-V), and is a standard related to adaptive streaming delivery using a streaming protocol based on a Hypertext Transfer Protocol (HTTP).

In the MPEG-DASH standard, a manifest file for describing metadata which is control information of video and audio files and a file format for transmitting content of a moving image are specified. Here, the former manifest file is referred to as media presentation description (MPD), and the latter file format is also referred to as a segment format.

Further, in a case where the ROUTE is used as the transport protocol, an MP4 file format can be used as a streaming file format. The MP4 file format is a derivative format of ISO Base Media File Format (ISO BMFF) specified in ISO/IEC 14496-12.

A segment transmitted through the ROUTE session includes an initialization segment (IS) and a media segment (MS). The initialization segment includes initialization information such as a data compression scheme. Further, the media segment stores data of a stream of a video, an audio, or a subtitle. In other words, the media segment corresponds to a DASH segment (DASH segment file).

As described above, stream data of a service component (a video, an audio, a subtitle, or the like) constituting content such as a program is transmitted through the ROUTE session in units of DASH segments according to the ISO BMFF standard.

Further, the NRT content is content which is reproduced after it is stored in a storage of a receiver. Further, for example, a file other than the NRT content such as file of an application or an electronic service guide (ESG) can be transmitted through the ROUTE session.

Further, the SLT metadata serving as the LLS or the metadata such as the USBD, the S-TSID, or the MPD serving as the SLS can be data of a text format described in a markup language such as an Extensible Markup Language (XML) or the like.

On the other hand, in a case where two-way communication (Broadband) is used, a layer higher than the physical layer is a data link layer. Further, a layer higher than the data link layer is an IP layer corresponding to a network layer. An upper layer adjacent to the IP layer is a Transmission Control Protocol (TCP) layer corresponding to a transport layer, and an upper layer adjacent to the TCP layer is an HTTP layer corresponding to an application layer.

In other words, a protocol such as a TCP/IP operating on a communication line such as the Internet is implemented by these layers.

Among the upper layers adjacent to the HTTP layer, some layers serve as control information (Signaling) and NRT content (NRT). The control information includes all pieces of control information such as control information transmitted through the ROUTE session. Further, the NRT content is content acquired via communication, and includes, for example, an application.

Among the upper layers adjacent to the HTTP layer, layers other than the above-mentioned layers serve as the DASH segment (DASH). In other words, in streaming delivery of a two-way communication system, stream data of a service component (a video, an audio, a subtitle, or the like) constituting content such as a video on demand (VOD) program or the like is transmitted in units of DASH segments according to the ISO BMFF standard.

As described above, in the protocol stack of the IP transmission scheme of the present technology, a layer of a one-way broadcasting system and some layers of a two-way communication system become a common protocol, and stream data of a service component constituting content can be transmitted in units of DASH segments according to the ISO BMFF standard via one-way broadcasting and two-way communication.

Therefore, in a case where both streaming delivery of a one-way broadcasting system and streaming delivery of a two-way communication system are performed, since the protocol of the upper layer is common, an implementation burden or a processing load in each device can be reduced.

Further, in the transmission system 1 of FIG. 1, the broadcast server 40 of the broadcasting system is installed on the transmission side, and a configuration corresponding to only streaming delivery of the one-way broadcasting system is illustrated, but as illustrated in the protocol stack of FIG. 6, the present technology can support the streaming delivery of the two-way communication system as well. A configuration corresponding to the streaming delivery of the two-way communication system will be described later with reference to FIG. 50.

2. Overview of the Present Technology

By the way, in the broadcast scheme such as ATSC 3.0, the bandwidth of 6 MHz or the like is allocated as the bandwidth of the RF channel (Broadcast Stream), but an operation of dynamically scheduling and providing the broadband service that does not fall within this band such as a streaming service or a file delivery service of a broad bandwidth (for example, a broadcast service using the scalable video coding) is expected.

Therefore, proposals for providing the broadband service have been requested, but a technical scheme for responding to such a request has not been established at present.

Therefore, in the present technology, information (hereinafter referred to as "delivery configuration information") indicating that a single broadcast service (broadband service) is delivered across a plurality of broadcast streams is included in information (hereinafter referred to as "transmission information") transmitted through the upper layer such as the S-TSID metadata which is one of the SLSs or the ESG information, and thus it is possible to provide the broadband service more flexibly.

For example, in the transmission system 1 of FIG. 1, when the broadcast service responsible range (hereinafter referred to as a "service responsible range") for each FW proxy device 10 is allocated by the master proxy device 10M in an environment in which a plurality of FW proxy devices 10 are installed, the delivery configuration information included in the transmission information such as the S-TSID metadata or the like is referred to.

Accordingly, since it is possible to appropriately allocate the service responsible ranges for the broadcast services delivered across a plurality of broadcast streams to the FW proxy device 10, it is possible to provide the broadband service such as the broadcast service using the scalable video coding more flexibly accordingly.

In other words, in the transmission system 1 of FIG. 1, it is possible to implement a role sharing protocol between the FW proxy devices 10 which is necessary in a case where the broadband service being dynamically scheduled terminates at a plurality of FW proxy devices 10 and is provided to the client device 20 on the network 30.

Further, in the transmission system 1 of FIG. 1, in a case where the master proxy device 10M receives a request for the DASH segment from the client device 20, redirection is performed to the FW proxy device 10 which is in charge of the broadcast service of the request. Further, upon receiving the redirection, the FW proxy device 10 receives a stream of content delivered via broadcasting within the range of the allocated broadcast service and transmits the stream to the client device 20 via the network 30.

(Example of Delivery Configuration)

Figure 7:
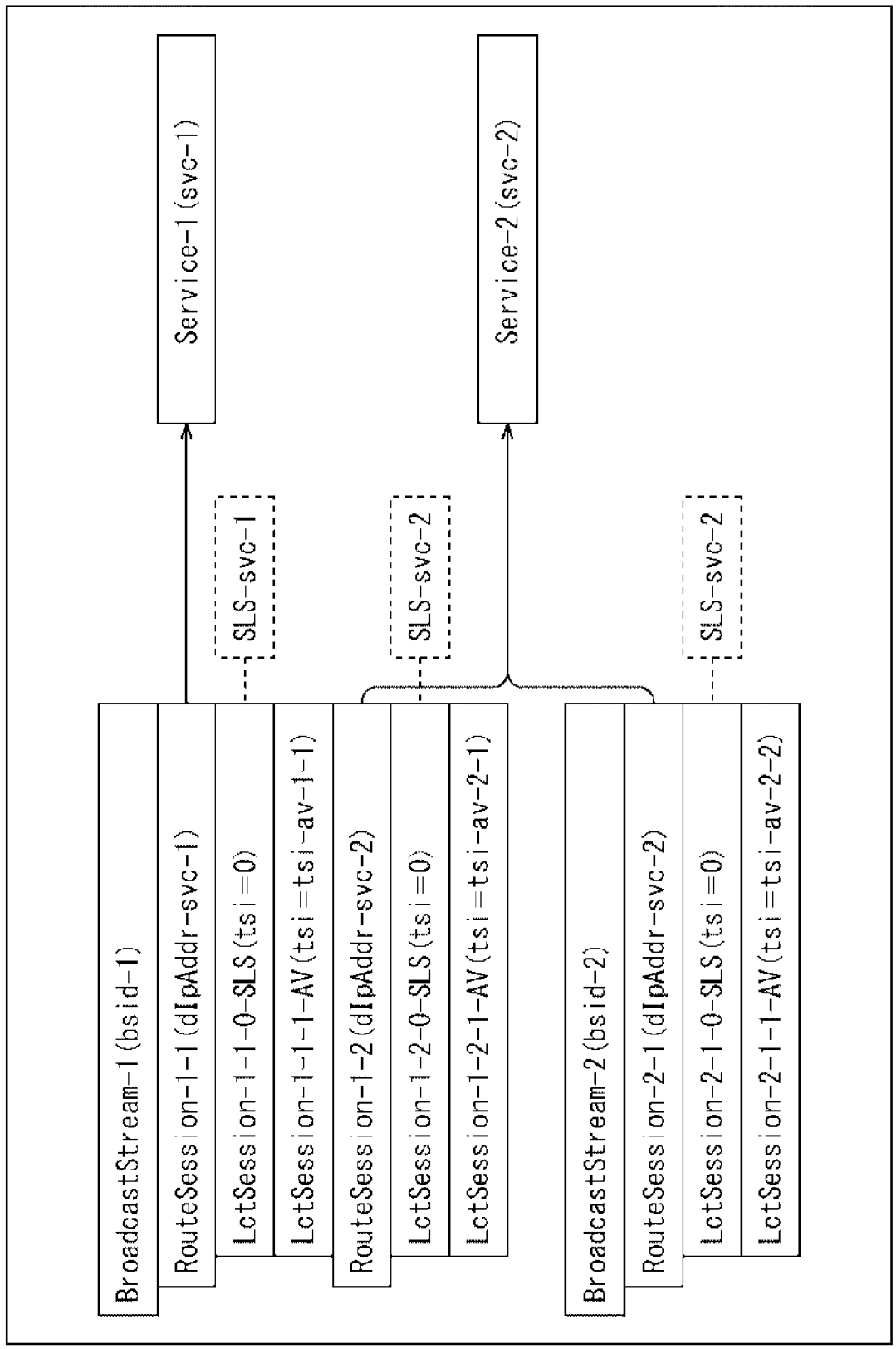
FIG. 7 is a diagram illustrating a configuration example in a case where a single broadcast service is delivered across a plurality of broadcast streams.

FIG. 7 is a diagram illustrating a configuration example in a case where a single broadcast service is delivered across a plurality of broadcast streams.

A broadcast stream 1 (BroadcastStream-1) having bsid=bsid-1 as a broadcast stream ID (bsid:BroadcastStreamID) identifying a broadcast stream is constituted by two ROUTE sessions (RouteSession-1-1 and RouteSession-1-2). Further, a broadcast stream 2 (BroadcastStream-2) having bsid=bsid-2 is constituted by one ROUTE session (Route-Session-2-1).

Here, the ROUTE session 1-1 (RouteSession-1-1) transfers a service 1 (Service-1) which is one independent broadcast service, whereas the ROUTE session 1-2 (RouteSession-1-2) and the ROUTE session 2-1 (RouteSession-2-1) transfer a service 2 (Service-2) which is one independent broadcast service through the two ROUTE sessions.

Here, as a service ID (ServiceId) identifying a broadcast service, the service 1 has ServiceId=svc-1, and the service 2 has ServiceId=svc-2.

The ROUTE session 1-1 is constituted by an LCT session (LctSession-1-1-0-SLS(tsi=0)) carrying the SLS and an LCT session (LctSession-1-1-1-AV(tsi=tsi-av-1-1)) carrying a stream of an audio or a video.

The ROUTE session 1-2 is constituted by an LCT session (LctSession-1-2-0-SLS(tsi=0)) carrying the SLS and an LCT session (LctSession-1-2-1-AV(tsi=tsi-av-2-1)) carrying a stream of an audio or a video.

The ROUTE session 2-1 is constituted by an LCT session (LctSession-2-1-0-SLS(tsi=0)) carrying the SLS and an LCT session (LctSession-2-1-1-AV(tsi=tsi-av-2-2)) carrying a stream of an audio or a video.

Further, in the ROUTE session 1-2 of the broadcast stream 1 and the ROUTE session 2-1 of the broadcast stream 2, the same SLS-svc-2 is carried as the SLS of the service 2 transmitted through the LCT session. On the other hand, in the ROUTE session 1-1 of the broadcast stream 1, SLS-svc-1 different from SLS-svc-2 is carried as the SLS of service 1 transmitted through the LCT session.

Here, in the delivery configuration illustrated in FIG. 7, the S-TSID metadata serving as the SLS is illustrated in FIGS. 8 and 9.

FIG. 8 is a diagram illustrating an example of the S-TSID metadata of the SLS (SLS-svc-1) for the service 1.

In FIG. 8, serviceId=svc-1 is described in the S-TSID metadata of an XML format as a serviceId attribute of an S-TSID element serving as a root element. Further, dIpAddr=dIpAddr-svc-1 is described as a dIpAddr attribute of an RS element subordinate to the S-TSID element, and further tsi=tsi-av-1-1 is described as a tsi attribute of a LS element subordinate to an RS element.

FIG. 9 is a diagram illustrating an example of the S-TSID metadata of the SLS (SLS-svc-2) for the service 2.

In FIG. 9, the S-TSID element and the RS element and the LS element subordinate thereto are described in the S-TSID metadata of the XML format, similarly to FIG. 8, but a bsid attribute is added to the RS element. In other words, bsid=bsid-1 is described in an upper RS element as the bsid attribute, and bsid=bsid-2 is described in a lower RS element as the bsid attribute.

A single broadcast service (service 2) is constituted by two ROUTE sessions in accordance with the value of the bsid attribute of the RS element, one ROUTE session is transferred through the broadcast stream 1 having bsid=bsid-1, and the other ROUTE session is transferred through the broadcast stream 2 having bsid=bsid-2.

Further, as described above, in the example of the delivery configuration illustrated in FIG. 7, SLS-svc-2 (FIG. 9) which is the same signaling fragment is carried through both the broadcast stream 1 and the broadcast stream 2. Further, there are cases in which both the service 1 and the service 2 are provided from the broadcast server 40 of one broadcasting company, and there are cases in which the service 1 and the service 2 are provided from the broadcast servers 40 of different broadcasting companies for each broadcast service.

(Structure of S-TSID)

FIG. 10 is a diagram illustrating an example of a format of the S-TSID metadata of the XML format.

In FIG. 10, the serviceId attribute can be placed in the S-TSID element of the root element. A service ID is designated in the serviceId attribute.

Further, an RS element indicating information related to one or more of ROUTE sessions is arranged in the S-TSID element. As the RS element, an sIpAddr attribute, a dIpAddr attribute, a dport attribute, a bsid attribute, and a LS element can be arranged.

A transmission source IP address (source IP address) of the ROUTE session is designated in the sIpAddr attribute. A transmission destination IP address (destination IP address) of the ROUTE session is designated in the dIpAddr attribute. A port number of ROUTE session is designated in the dport attribute.

A broadcast stream ID (bsid) can be designated in the bsid attribute. As the broadcast stream ID, a broadcast stream ID of a broadcast stream for transferring a ROUTE session which corresponds to an RS element serving as a parent element and constitutes a broadband service (a broadcast service delivered across a plurality of broadcast streams) is designated.

Information related to an LCT channel is described in the LS element. Further, one or more of LS elements can be arranged for each LCT channel. As the LS element, a tsi attribute, a bw attribute, a startTime attribute, an endTime attribute, a SrcFlow element, and a RepairFlow element can be arranged.

A value of TSI is designated in the tsi attribute. A maximum bandwidth is designated in the bw attribute. A start time and an end time are designated in the startTime attribute and the endTime attribute, respectively.

Information related to a Source Flow is designated in the SrcFlow element. Information related to a Repair Flow is designated in the RepairFlow element.

Further, in FIG. 10, in a case where "0 . . . 1" is designated in an item "Use", it is arbitrary whether or not a corresponding element or attribute is designated. Further, in a case where "1 . . . N" is designated in the item of "Use", one or more elements or attributes are designated, and in a case where "1" is designated, only one element or attribute is necessarily is designated.

Further, in an item of "Data Type", in a case where "unsignedShort" or "unsignedInt" is designated, it indicates that a value of a corresponding element or attribute is an integer type, and in a case where "string" is designated, it indicates that a value of a corresponding element or attribute is a character string type. Further, in a case where "dateTime" is designated in the item of "Data Type", it indicates that a corresponding element or attribute indicates a specific date and time.

Further, the format of the S-TSID metadata illustrated in FIG. 10 is an example, and, for example, any other text format other than the XML format may be employed. Further, the S-TSID metadata is not limited to the text format and may be a binary format.

As described above, in the present technology, the broadcast stream ID (bsid) of the broadcast stream for transferring the ROUTE session which constitutes the broadband service (the broadcast service delivered across a plurality of broadcast streams) can be designated in the bsid attribute of the RS element as the delivery configuration information in the S-TSID metadata which is the transmission information, and thus it is possible to provide the broadband service more flexibly.

3. Use Case

Next, a use case in a case where a relation between the broadcast service and the ROUTE session constituting the broadcast service changes for each time zone will be described. In this use case, delivery configurations in a time zone T1-T2 and a time zone T2-T3 in a case where times T1, T2, and T3 sequentially elapse on a certain time axis will be described.

(Delivery Configuration in Time Zone T1-T2)

FIG. 11 is a diagram illustrating the delivery configuration in the time zone T1-T2.

In FIG. 11, the service 1 (svc-1) is transferred through ROUTE session 1-1 (dIpAddr-svc-1) of the broadcast stream 1 (bsid-1). In the LCT session of the ROUTE session 1-1, the SLS (SLS-svc-1) of the service 1 and the stream of an audio or a video (AV) of the service 1 are transmitted.

Further, in FIG. 11, the service 2 (svc-2) is transferred through the ROUTE session 1-2 (dIpAddr-svc-2) of the broadcast stream 1 (bsid-1) and the ROUTE session 2-1 (dIpAddr-svc-2) of the broadcast stream 2 (bsid-2). In other words, in the delivery configuration in the time zone T1-T2, the service 2 is delivered across the two broadcast streams (bsid-1 and bsid-2).

In the LCT session of the ROUTE session 1-2, the SLS (SLS-svc-2) of the service 2 and the stream of an audio or a video (AV) of the service 2 are transmitted. On the other hand, in the LCT session of the ROUTE session 2-1, an SLS (SLS-svc-2) of the service 2 and the stream of an audio or a video (AV) of the service 2 are transmitted.

Further, in FIG. 11, a service 3 (svc-3) is transferred through a ROUTE session 3-1 (dIpAddr-svc-3) of a broadcast stream 3 (bsid-3). In the LCT session of the ROUTE session 3-1, SLS (SLS-svc-3) of the service 3 and a stream of an audio or a video (AV) of the service 3 are transmitted.

Here, FIGS. 12 to 14 illustrate examples of the S-TSID metadata included in the SLS of each broadcast service in the delivery configuration illustrated in FIG. 11.

FIG. 12 is a diagram illustrating an example of the S-TSID metadata of the SLS (SLS-svc-1) of the service 1. In the S-TSID metadata of FIG. 12, it is indicated that the service 1 (svc-1) is constituted by one ROUTE session (dIpAddr-svc-1).

FIG. 13 is a diagram illustrating an example of the S-TSID metadata of the SLS (SLS-svc-2) of the service 2. In the S-TSID metadata of FIG. 13, it is indicated that the service 2 (svc-2) is constituted by two ROUTE sessions (dIpAddr-svc-2), one ROUTE session is transferred through the broadcast stream 1 having bsid=bsid-1, and the other ROUTE session is transferred through the broadcast stream 2 having bsid=bsid-2.

FIG. 14 is a diagram illustrating an example of the S-TSID metadata of the SLS (SLS-svc-3) of the service 3. In the S-TSID metadata of FIG. 14, it is indicated that the service 3 (svc-3) is constituted by one ROUTE session.

As described above, in the delivery configuration in the time zone T1-T2, the service 2 (svc-2) is transferred through the ROUTE session (dIpAddr-svc-2) of the broadcast stream 1 (bsid-1) and the broadcast stream 2 (bsid-2) among the three broadcast streams (bsid-1, bsid-2, and bsid-3), and the service 2 (svc-2) is delivered across the two broadcast streams (bsid-1 and bsid-2). Further, a notification indicating that the service 2 (svc-2) is configured to be delivered across the two broadcast streams (bsid-1 and bsid-2) can be performed through the S-TSID metadata of the SLS (SLS-svc-2) of the service 2.

(Delivery Configuration in Time Zone T2-T3)

Figure 15:
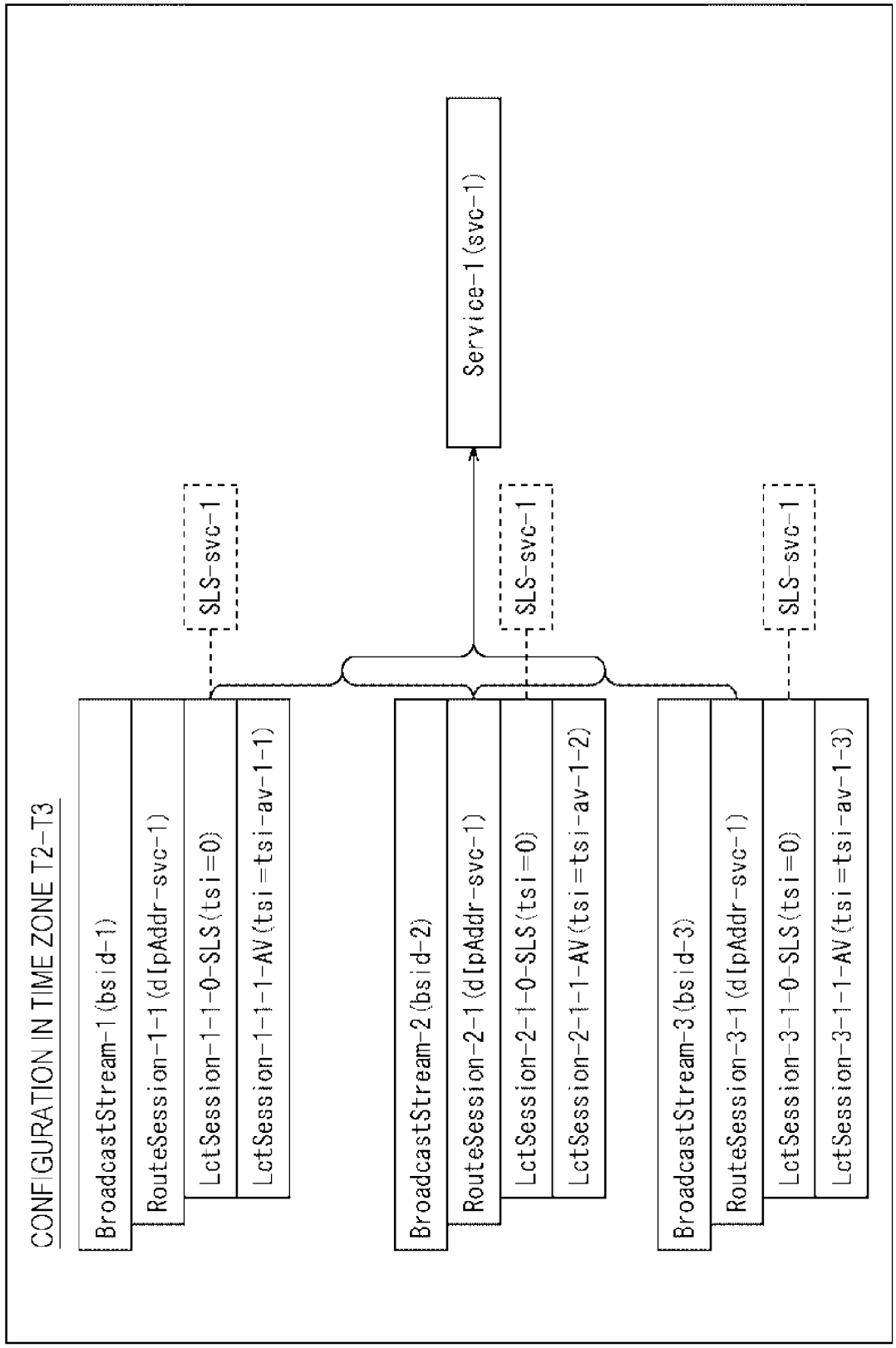
FIG. 15 is a diagram illustrating the configuration of delivery in a time zone T2-T3.

FIG. 15 is a diagram illustrating the delivery configuration in the time zone T2-T3.

In FIG. 15, the service 1 (svc-1) is transferred through the ROUTE session 1-1 (dIpAddr-svc-1) of the broadcast stream 1 (bsid-1), the ROUTE session 2-1 (dIpAddr-svc-1) of the broadcast stream 2 (bsid-2), and the ROUTE session 3-1 (dIpAddr-svc-1) of the broadcast stream 3 (bsid-3). In other words, in the delivery configuration in the time zone T2-T3, the service 1 is delivered across the three broadcast streams (bsid-1, bsid-2, and bsid-3).

The SLS (SLS-svc-1) of the service 1 and the streams of the audio and the video (AV) of the service 1 are transmitted through the LCT session of the ROUTE session 1-1. Similarly, the SLS (SLS-svc-1) of the service 1 and the streams of the audio and the video (AV) of the service 1 are transmitted through the LCT sessions of the ROUTE session 2-1 and the ROUTE session 3-1.

Here, FIG. 16 illustrates an example of the S-TSID metadata included in the SLS of the service 1 in the delivery configuration illustrated in FIG. 15. In other words, in the delivery configuration of FIG. 15, since the service 1 (svc-1) is delivered across the three broadcast streams (bsid-1, bsid-2, and bsid-3), the S-TSID metadata of the SLS (SLS-svc-1) is common to the three broadcast streams.

In the S-TSID metadata of FIG. 16, it is indicated that the service 1 (svc-1) is constituted by three ROUTE sessions (dIpAddr-svc-1), and a first ROUTE session 1-1 (dIpAddr-svc-1) is transferred through the broadcast stream 1 having bsid=bsid-1.

Similarly, a second ROUTE session 2-1 (dIpAddr-svc-1) is transferred through the broadcast stream 2 having bsid=bsid-2, and a third ROUTE session 3-1 (dIpAddr-svc-1) is transferred through the broadcast stream 3 having bsid=bsid-3.

As described above, in the delivery configuration in the time zone T2-T3, the service 1 (svc-1) is transferred through each of the ROUTE sessions (dIpAddr-svc-1) of the three broadcast streams (bsid-1, bsid-2, and bsid-3), and the service 1 (svc-1) is delivered across the three broadcast streams. Further, a notification indicating that the service 1 (svc-1) is configured to be delivered across the three broadcast streams can be performed by the S-TSID metadata of the SLS (SLS-svc-1) of the service 1.

As described above, in the delivery configurations in the time zone T1-T2 and the time zone T2-T3, the delivery configuration changes for each time zone, for example, in the time zone T1-T2, the service 2 (svc-2) is transferred through the ROUTE sessions of the two broadcast streams (bsid-1 and bsid-2), but thereafter, if it becomes the time zone T2-T3, the service 1 (svc-1) is transferred through the ROUTE sessions of the three broadcast streams (bsid-1, bsid-2, and bsid-3). The delivery configuration which changes for each time zone can be given in notification by updating the content of the S-TSID metadata of the SLS.

4. Priority Between ROUTE Sessions

Next, an extension method of the S-TSID metadata in a case where a priority (importance) is defined between ROUTE sessions of broadcast streams will be described.

Here, as a case where an operation of defining a priority is performed between ROUTE sessions, for example, a broadband service to which the scalable video coding (hierarchical encoding) is applied or the like is assumed. Here, as will be described in detail later, the scalable video coding (SVC) is a technique of hierarchically encoding the base layer that transmits a stream (a minimum necessary stream) used for a basic quality and a high quality and an enhancement layer that transmits a stream (an additional stream) used only for a high quality.

(Delivery Configuration in a Case where Priority is Defined)

Figure 17:
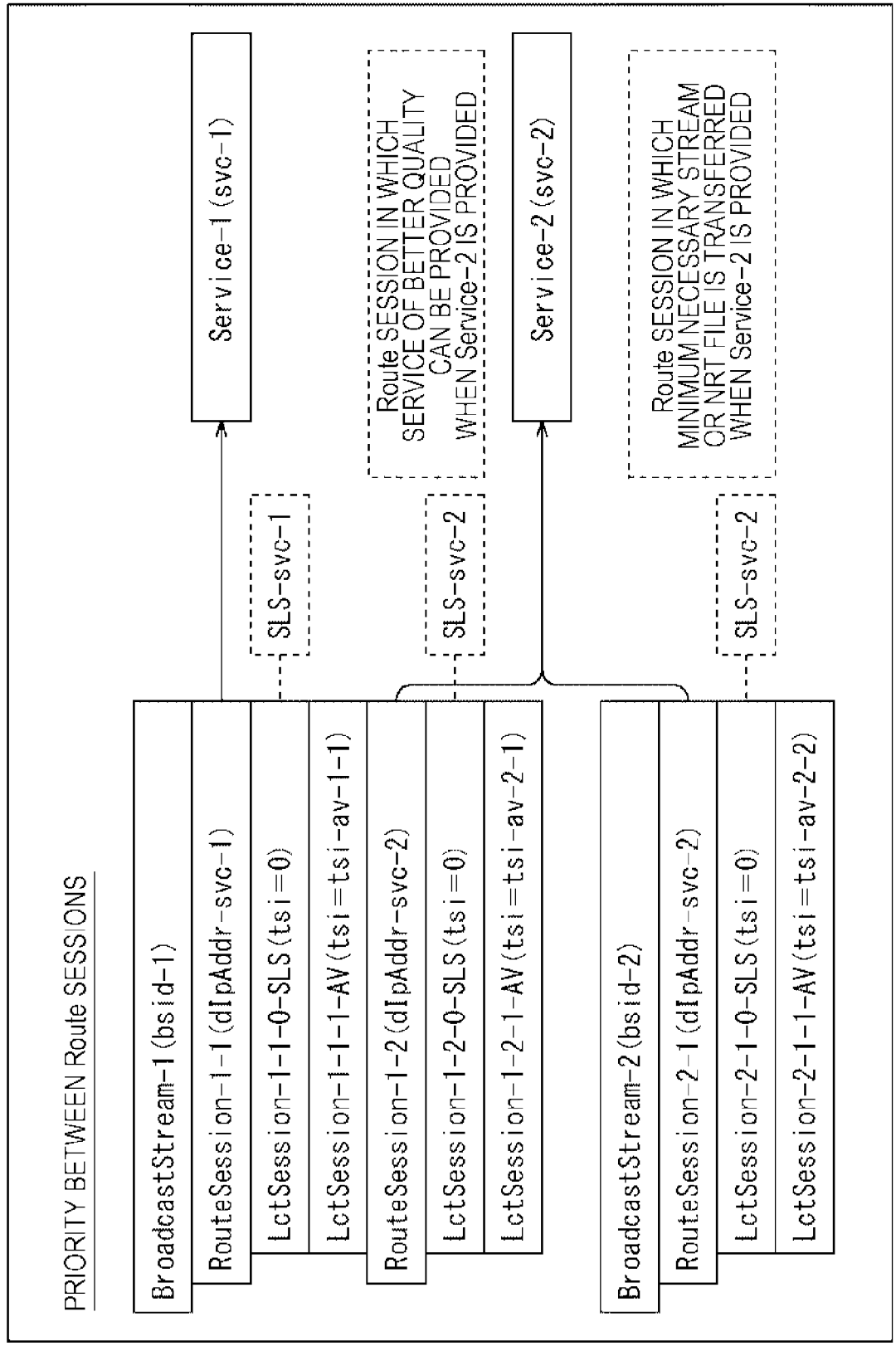
FIG. 17 is a diagram illustrating a configuration of delivery in a case where a priority is defined between ROUTE sessions.

FIG. 17 is a diagram illustrating a delivery configuration in a case where a priority between ROUTE sessions is defined.

In FIG. 17, the service 1 (svc-1) is transferred through the ROUTE session 1-1 (dIpAddr-svc-1) of the broadcast stream 1 (bsid-1). The SLS (SLS-svc-1) of the service 1 and the streams of the audio and the video (AV) of the service 1 are transmitted through the LCT session of the ROUTE session 1-1.

Further, in FIG. 17, the service 2 (svc-2) is transferred through the ROUTE session 1-2 (dIpAddr-svc-2) of the broadcast stream 1 (bsid-1) and the ROUTE session 2-1 (dIpAddr-svc-2) of the broadcast stream 2 (bsid-2). In other words, in the delivery configuration of FIG. 17, the service 2 is delivered across the two broadcast streams (bsid-1 and bsid-2).

The SLS (SLS-svc-2) of the service 2 and the streams of the audio and the video (AV) of the service 2 are transmitted through the LCT session of the ROUTE session 1-2. On the other hand, the SLS (SLS-svc-2) of the service 2 and the streams of the audio and the video (AV) of the service 2 are transmitted through the LCT session of the ROUTE session 2-1.

Here, a case of a delivery configuration in which, for example, a stream of the base layer is transferred through the ROUTE session 2-1 (dIpAddr-svc-2) of the broadcast stream 2 (bsid-2), and a stream of the enhancement layer is transferred through the ROUTE session 1-2 (dIpAddr-svc-2) of the broadcast stream 1 (bsid-1) by applying the scalable video coding to the delivery configuration of FIG. 17 is considered.

The stream of the base layer can be, for example, a stream of a high definition (HD) image quality with a normal frame rate of 60 fps. On the other hand, the stream of the enhancement layer can be, for example, a stream which can be displayed as a stream of 4K (ultra high definition (UHD)) image quality with a frame rate of 120 fps which is double on the basis of the stream of the base layer.

Then, in the case of an environment in which only the broadcast stream 2 (bsid-2) can be received, for example, in an environment in which only one broadcast stream can be processed at a time with one tuner, or the like, the FW proxy device 10 of the reception side processes the stream of the base layer and causes the client device 20 connected to the network 30 to display the video of the HD image quality (basic quality).

On the other hand, in the case of an environment in which the broadcast stream 1 (bsid-1) can also be received at the same time of the broadcast stream 2 (bsid-2), the FW proxy device 10 of the receiving side also processes the stream of the enhancement layer together with the stream of the base layer and causes the client device 20 connected to the network 30 to display the video of the 4K image quality (high quality). Accordingly, the client device 20 can display a higher quality video in environment in which the enhancement layer can be supported than in an environment of only the basic layer.

Here, FIG. 18 illustrates an example of the S-TSID metadata included in the SLS of the service 2 in the delivery configuration illustrated in FIG. 17. In other words, in the delivery configuration illustrated in FIG. 17, since the service 2 (svc-2) is delivered across the two broadcast streams (bsid-1 and bsid-2), the S-TSID metadata of the SLS (SLS-svc-2) is common to the ROUTE session 1-2 and the ROUTE session 2-1.

In the S-TSID metadata of FIG. 18, the service 2 (svc-2) is constituted by two ROUTE sessions (dIpAddr-svc-2), a first ROUTE session 1-2 (dIpAddr-svc-2) is transferred through the broadcast stream 1 having bsid=bsid-1, and a second ROUTE session 2-1 (dIpAddr-svc-2) is transferred through the broadcast stream 2 having bsid=bsid-2.

Further, in the S-TSID metadata of FIG. 18, a priority attribute is added to each RS element subordinate to the S-TSID element. With the priority attribute, it is possible to designate a priority (importance) between the ROUTE sessions caused by the difference between the base layer and enhancement layer.

For example, in the S-TSID metadata of FIG. 18, priority=low (priority:low) is designated as the priority attribute of the RS element for the ROUTE session 1-2, while priority=high (priority:high) is designated as the priority attribute of the RS element for the ROUTE session 2-1.

Accordingly, in the delivery configuration of FIG. 17, it is possible to set the ROUTE session 2-1 of the broadcast stream 2 (bsid-2) as a ROUTE session with a higher priority (importance) than the ROUTE session 1-2 of the broadcast stream 1 (bsid-1)).

In other words, in the delivery configuration illustrated in FIG. 17, when the service 2 which is a broadband service to which the scalable video coding is applied is provided, the ROUTE session 2-1 of the broadcast stream 2 (bsid-2) can be regarded as a ROUTE session in which a minimum necessary stream or an NRT file is transferred. On the other hand, the ROUTE session 1-2 of the broadcast stream 1 (bsid-1) can be regarded as a ROUTE session to which an (additional) stream to which a better quality service, if any, can be provided is transferred.

Further, in a case where the priority attribute is not arranged in the RS element subordinate to the S-TSID element of the S-TSID metadata, in order to present the broadcast service delivered across a plurality of broadcast streams, it is interpreted that all ROUTE sessions across a plurality of broadcast streams are essential.

(Structure of S-TSID Corresponding to Priority)

FIG. 19 is a diagram illustrating an example of a format of the S-TSID metadata of the XML format corresponding to the priority between the ROUTE sessions.

The format of the S-TSID metadata in FIG. 19 differs from the format of the S-TSID metadata illustrated in FIG. 10 in that in addition to the sIpAddr attribute, the dIpAddr attribute, the dport attribute, bsid attribute, and the LS element, the priority attribute can be arranged in the RS element subordinate to the S-TSID element.

The priority (importance) between the ROUTE sessions is designated in the priority attribute. For example, high or low, an integer value indicating the importance of 1 to 5, or the like can be used as the value of the priority attribute.

Further, the format of the S-TSID metadata illustrated in FIG. 19 is an example, and, for example, any other text format other than the XML format may be employed. Further, the S-TSID metadata is not limited to the text format and may be a binary format.

As described above, for example, in a case where the broadband service to which the scalable video coding is applied is provided, it is possible to designate the priority (importance) between the ROUTE sessions caused by the difference between the base layer and the enhancement layer by defining the priority (importance) between the ROUTE sessions of the broadcast streams.

Further, in the above description, the example in which the priority is designated by arranging the priority attribute in the RS element subordinate to the S-TSID element of the S-TSID metadata as the priority information indicating the priority between the sessions has been described, but even in a case where the priority is not designated explicitly with the value of the priority attribute, the priority may be designated, for example, by setting a rule of arranging the ROUTE sessions in the S-TSID metadata in the priority order as an operation rule.

In other words, in a case where such an operation rule is employed, for example, in the S-TSID metadata of FIG. 18 described above, the RS element of the ROUTE session 2-1 having a higher priority is arranged ahead of the RS element of the ROUTE session 1-2 having a low priority. Further, in this case, the priority attribute need not be necessarily arranged in the RS element subordinate to the S-TSID element of the S-TSID metadata.

5. Mapping Management Between Tuner and Broadcast Service

Meanwhile, in a case where there is a broadcast service delivered across a plurality of broadcast streams at the same time as described above, there are cases in which a plurality of broadcast streams are received at the same time by a plurality of tuners mounted on one device, and there are cases in which a plurality of broadcast streams are received at the same time by a plurality of devices in which only one tuner is mounted.

In a case where a plurality of devices are associated, it is necessary for tuner control systems thereof to appropriately select and control the broadcast service which requires a simultaneous reception process on the basis of the latest SLS (S-TSID metadata).

For example, in the use case described above, in the delivery configuration in the time zone T1-T2 illustrated in FIG. 11, since the service 2 is delivered across the two broadcast streams (bsid-1 and bsid-2), it is necessary to receive the broadcast stream 1 (bsid-1) and the broadcast stream 2 (bsid-1) at the same time.

On the other hand, in the delivery configuration in the time zone T2-T3 illustrated in FIG. 15, the service 1 is delivered across the three broadcast streams (bsid-1, bsid-2, and bsid-3), it is necessary to receive the broadcast streams (bsid-1, bsid-2, and bsid-3) at the same time.

In the present technology, the tuners and the mapping management serving as the allocation control of the broadcast services to be received by the respective tuners are implemented using a message between the FW proxy devices 10 using universal plug and play (UPnP), a simple service discovery protocol (SSDP), or the like.

Further, the UPnP is a protocol that enables a device to join a target network simply by connecting the device. Further, the SSDP is one of protocols used in the UPnP and searches for a device on a network or performs a response.

In other words, by causing a plurality of FW proxy devices 10 connected to the network 30 to have the master/slave relation, the master proxy device 10M can appropriately redirect a segment request from the client device 20 to each FW proxy device 10.

The master/slave relation between the FW proxy devices 10 may be set manually each time the FW proxy device 10 is added to the network 30 or may be decided by the FW proxy devices 10 performing a negotiation according to their own capability attribute (a processing capability, a storage capacity, or the like) or the like, for example.

The FW proxy device 10 serving as the master (the master proxy device 10M) releases, for example, an application programming interface (API) for adjusting the service responsible range through the SSDP of the UPnP or the like, and allocates the service responsible range to the FW proxy device 10 serving as the slave (the slave proxy device 10S) through the API. Further, here, a database (hereinafter referred to as a "proxy-service responsible range database") for allocating the service responsible range to each FW proxy device 10 is generated, and the service responsible range is allocated to each FW proxy device 10.

In a case where a segment request or an application acquisition request is received from the client device 20, the master proxy device 10M appropriately performs redirection to the target FW proxy device 10 with reference to the proxy-service responsible range database. Further, each FW proxy device 10 which has received the redirection acquires the broadcast stream within the allocated service responsible range.

However, in the master proxy device 10M, when the proxy-service responsible range database is constructed, the latest SLT metadata or S-TSID metadata is parsed, and in a case where a certain broadcast service includes a plurality of ROUTE sessions, and the ROUTE sessions are detected to be provided from different broadcast streams, the proxy-service responsible range database is constructed as follows.

In other words, in the master proxy device 10M, in a case where the broadcast service such as the broadband service is delivered at the same time across a plurality of broadcast streams, the proxy-service responsible range database is constructed so that a plurality of broadcast streams which have to be simultaneously received are distributed to different FW proxy devices 10 (the tuners). In other words, under the assumption that the tuner capable of receiving only one broadcast stream is installed in each FW proxy device 10, the proxy-service responsible range database is constructed so that the tuners can perform a simultaneous parallel reception process for the broadcast streams.

Figure 20:
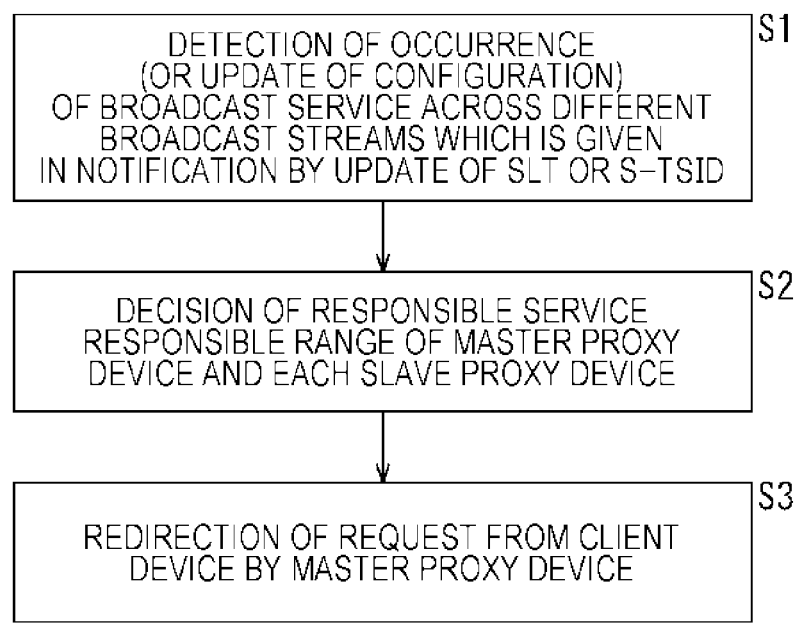
FIG. 20 is a flowchart for describing a flow of mapping management between a tuner and a broadcast service.

The process flow described above can be summarized as in a flowchart of FIG. 20.

In other words, first, the master proxy device 10M or the slave proxy device 10S detects the occurrence (or update of the configuration) of the broadcast service across different broadcast streams which is given in notification by update of the SLT metadata or S-TSID metadata (S1).

Next, the master proxy device 10M decides a responsible service responsible range of the master proxy device 10M and the slave proxy device 10S (S2). In this case, the proxy-service responsible range database is generated so that a plurality of broadcast streams which have to be received at the same time are distributed to the different FW proxy devices 10.

Then, in a case where a request from the client device 20 is received, the master proxy device 10M performs redirection to the target FW proxy device 10 with reference to the proxy-service responsible range database (S3). Accordingly, each FW proxy device 10 which has received the redirection acquires the broadcast stream within the allocated service responsible range and transmits the broadcast stream to the client device 20 via the network 30.

Further, in the master proxy device 10M, each time a broadcast service across different broadcast streams appears, the service responsible range responsible by each of the slave proxy devices 10S that share the same master proxy device 10M operating in the same network 30 is reset, and the proxy-service responsible range database is updated. Accordingly, the responsible range of each FW proxy device 10 is allocated so that a plurality of broadcast streams in which the same broadcast service is delivered can be processed at the same time.

Here, a process of changing the service responsible range of the FW proxy device 10 in the case where the SLT metadata or the S-TSID metadata is updated, and the broadcast service across a plurality of broadcast streams appears will be described. Further, since the SLT metadata or the S-TSID metadata in which the delivery configuration is updated is limited to the broadcast stream in which the shared broadcast service is delivered, the FW proxy device 10 which detects the change in the delivery configuration triggers the update of the proxy-service responsible range database.

In the following example, it is assumed that, in the two slave proxy devices 10S (10S-1 and 10S-2), the service responsible range is already allocated, and in the slave proxy device 10S-2, the updated of the SLT metadata or the S-TSID metadata obtained from the broadcast stream being received is detected. Further, in general, the detection of the update of the delivery configuration occurs at the same time in a plurality of slave proxy devices 10S, but here, for the sake of convenience of description, the update of the delivery configuration is assumed to be detected only in the slave proxy device 10S-2.

Further, in the following example, similarly to the use case described above, the delivery configurations in the time zone T1-T2 and the time zone T2-T3 in a case where times T1, T2, and T3 sequentially elapse on a certain time axis will be described as an example. In other words, in the time zone T1-T2, the delivery configuration illustrated in FIG. 11 is applied, and in the time zone T2-T3, the delivery configuration illustrated in FIG. 15 is applied.

(Configuration of BS-1 in Time Zone T1-T2)

FIG. 21 is a diagram illustrating examples of the SLT metadata and the S-TSID metadata flowing in the broadcast stream 1 (bsid-1) in the delivery configuration illustrated in FIG. 11 in the time zone T1-T2.

In FIG. 21, in the SLT metadata of the broadcast stream 1 (bsid-1), bsid=bsid-1 is designated as the bsid attribute, and two broadcast services are arranged in a service loop.

In the SLT metadata, one broadcast service out of the two broadcast services is a service 1 in which serviceId=svc-1 is designated as the service ID, and a transmission destination IP address of SLS (SLS-svc-1) of the service 1 which is dIpAddr-svc-1 is designated as an slsDestinationIpAddress attribute of a BroadcastSvcSignaling element.

The S-TSID metadata transmitted as the SLS (SLS-svc-1) of the service 1 indicates that the service 1 (svc-1) is constituted by one ROUTE session (dIpAddr-svc-1).

Further, in the SLT metadata, the other broadcast service out of the two broadcast services is a service 2 in which serviceId=svc-2 is designated as the service ID, and a transmission destination IP address of SLS (SLS-svc-2) of the service 2 which is dIpAddr-svc-2 is designated as the slsDestinationIpAddress attribute of the BroadcastSvcSignaling element.

The S-TSID metadata transmitted as the SLS (SLS-svc-2) of the service 2 indicates that the service 2 (svc-2) is constituted by two ROUTE sessions (dIpAddr-svc-2), one ROUTE session is transferred through the broadcast stream 1 having bsid=bsid-1, and the other ROUTE session is transferred through the broadcast stream 2 having bsid=bsid-2.

(Configuration of BS-2 in Time Zone T1-T2)

FIG. 22 is a diagram illustrating examples of the SLT metadata and the S-TSID metadata flowing in the broadcast stream 2 (bsid-2) in the delivery configuration illustrated in FIG. 11 in the time zone T1-T2.

In FIG. 22, in the SLT metadata of the broadcast stream 2 (bsid-2), bsid=bsid-2 is designated as the bsid attribute, and a single broadcast service is arranged in the service loop. The broadcast service is a service 2 in which serviceId=svc-2 is designated as the service ID, and a transmission destination IP address of SLS (SLS-svc-2) of the service 2 which is dIpAddr-svc-2 is designated.

The S-TSID metadata transmitted as the SLS (SLS-svc-2) of the service 2 indicates that the service 2 (svc-2) is constituted by two ROUTE sessions (dIpAddr-svc-2), one ROUTE session is transferred through the broadcast stream 1 having bsid=bsid-1, and the other ROUTE session is transferred through the broadcast stream 2 having bsid=bsid-2.

Further, content of the SLS (SLS-svc-2) of the service 2 in FIG. 21 and FIG. 22 is common content.

(Configuration of BS-3 in Time Zone T1-T2)

FIG. 23 is a diagram illustrating an example of the SLT metadata and the S-TSID metadata flowing in the broadcast stream 3 (bsid-3) in the delivery configuration illustrated in FIG. 11 in the time zone T1-T2.

In FIG. 23, in the SLT metadata of the broadcast stream 3 (bsid-3), bsid=bsid-3 is designated as the bsid attribute, and a single broadcast service is arranged in the service loop. The broadcast service is a service 3 in which serviceId=svc-3 is designated as the service ID, and a transmission destination IP address of SLS (SLS-svc-3) of the service 3 which is dIpAddr-svc-3 is designated.

The S-TSID metadata transmitted as the SLS (SLS-svc-3) of the service 3 indicates that the service 3 (svc-3) is constituted by one ROUTE session.

The content of the SLT metadata and the S-TSID metadata flowing in the respective broadcast streams (bsid-1, bsid-2, and bsid-3) in the delivery configuration in the time zone T1-T2 illustrated in FIG. 11 has been described above with reference to FIGS. 21 to 23. Next, content of the SLT metadata and the S-TSID metadata flowing in the respective broadcast streams (bsid-1, bsid-2, and bsid-3) in the delivery configuration in the time zone T2-T3 illustrated in FIG. 15 will be described with reference to FIGS. 24 to 26.

(Configuration of BS-1 in Time Zone T2-T3)

FIG. 24 is a diagram illustrating an example of the SLT metadata and the S-TSID metadata flowing in the broadcast stream 1 (bsid-1) in the delivery configuration illustrated in FIG. 15 in the time zone T2-T3.

In FIG. 24, in the SLT metadata of the broadcast stream 1 (bsid-1), bsid=bsid-1 is designated as the bsid attribute, and a single broadcast service is arranged in the service loop. This broadcast service is a service 1 in which serviceId=svc-1 is designated as the service ID, and a transmission destination IP address of SLS (SLS-svc-1) of the service 1 which is dIpAddr-svc-1 is designated as the slsDestinationIpAddress attribute of the BroadcastSvcSignaling element.

The S-TSID metadata transmitted as the SLS (SLS-svc-1) of the service 1 indicates that the service 1 (svc-1) is constituted by three ROUTE sessions (dIpAddr-svc-1).

In other words, in the S-TSID metadata of FIG. 24, the first ROUTE session 1-1 (dIpAddr-svc-1) is transferred through the broadcast stream 1 having bsid=bsid-1. Similarly, the second ROUTE session 2-1 (dIpAddr-svc-1) is transferred through the broadcast stream 2 having bsid=bsid-2, and the third ROUTE session 3-1 (dIpAddr-svc-1) is transferred through the broadcast stream 3 having bsid=bsid-3.

(Configuration of BS-2 in Time Zone T2-T3)

FIG. 25 is a diagram illustrating an example of the SLT metadata and the S-TSID metadata flowing in the broadcast stream 2 (bsid-2) in the delivery configuration illustrated in FIG. 15 in the time zone T2-T3.

In FIG. 25, in the SLT metadata of the broadcast stream 2 (bsid-2), bsid=bsid-2 is designated as the bsid attribute, and a single broadcast service is arranged in the service loop. This broadcast service is a service 1 in which serviceId=svc-1 is designated as the service ID, and a transmission destination IP address of SLS (SLS-svc-1) of the service 1 which is dIpAddr-svc-1 is designated.

The S-TSID metadata transmitted as the SLS (SLS-svc-1) of the service 1 indicates that the service 1 (svc-1) is constituted by three ROUTE sessions (dIpAddr-svc-1). It is indicated that content of the SLS (SLS-svc-1) of the service 1 of FIG. 25 is common to the content of the SLS (SLS-svc-1) of the service 1 of FIG. 24, and the three ROUTE sessions constituting the service 1 are constituted by a plurality of broadcast streams (bsid-1, bsid-2, and bsid-3).

(Configuration of BS-3 in Time Zone T2-T3)

FIG. 26 is a diagram illustrating an example of the SLT metadata and the S-TSID metadata flowing in broadcast stream 3 (bsid-3) in the delivery configuration illustrated in FIG. 15 in the time zone T2-T3.

In FIG. 26, in the SLT metadata, bsid=bsid-3 is designated as the bsid attribute, and a single broadcast service is arranged in the service loop. The broadcast service is a service 1 in which serviceId=svc-1 is designated as the service ID, and a transmission destination IP address of SLS (SLS-svc-1) of the service 1 which is dIpAddr-svc-1 is designated.

The S-TSID metadata transmitted as the SLS (SLS-svc-1) of the service 1 indicates that the service 1 (svc-1) is constituted by three ROUTE sessions. It is indicated that content of the SLS (SLS-svc-1) of the service 1 of FIG. 26 is common to the content of the SLS (SLS-svc-1) of the service 1 of FIGS. 24 and 25, and the three ROUTE sessions constituting the service 1 is constituted by a plurality of broadcast streams (bsid-1, bsid-2, and bsid-3).

As described above, in the delivery configuration in the time zone T1-T2 illustrated in FIG. 11 and the delivery configuration in the time zone T2-T3 illustrated in FIG. 15, the delivery configuration changes for each time zone, but along with the change, the SLT metadata and the S-TSID metadata are updated, and content thereof is changed. Specifically, in a case where the delivery configuration changes between the time zone T1-T2 and the time zone T2-T3, the content of the SLT metadata and the S-TSID metadata is updated from the content illustrated in FIGS. 21 to 23 to the content illustrated in FIGS. 24 to 26.

Further, for example, as a notification indicating that the slave proxy device 10S-2 among the FW proxy devices 10 connected to the network 30 detects the update of the SLT metadata or the S-TSID metadata is given to the master proxy device 10M, the master proxy device 10M updates the proxy-service responsible range database using the notification as a trigger.

(Allocation Process of Service Responsible Range when SLT or S-TSID is Updated)

Next, a flow of an allocation process of the service responsible range when the updated of the SLT metadata or the S-TSID metadata is detected will be described with reference to a flowchart of FIG. 27.

Figure 27:
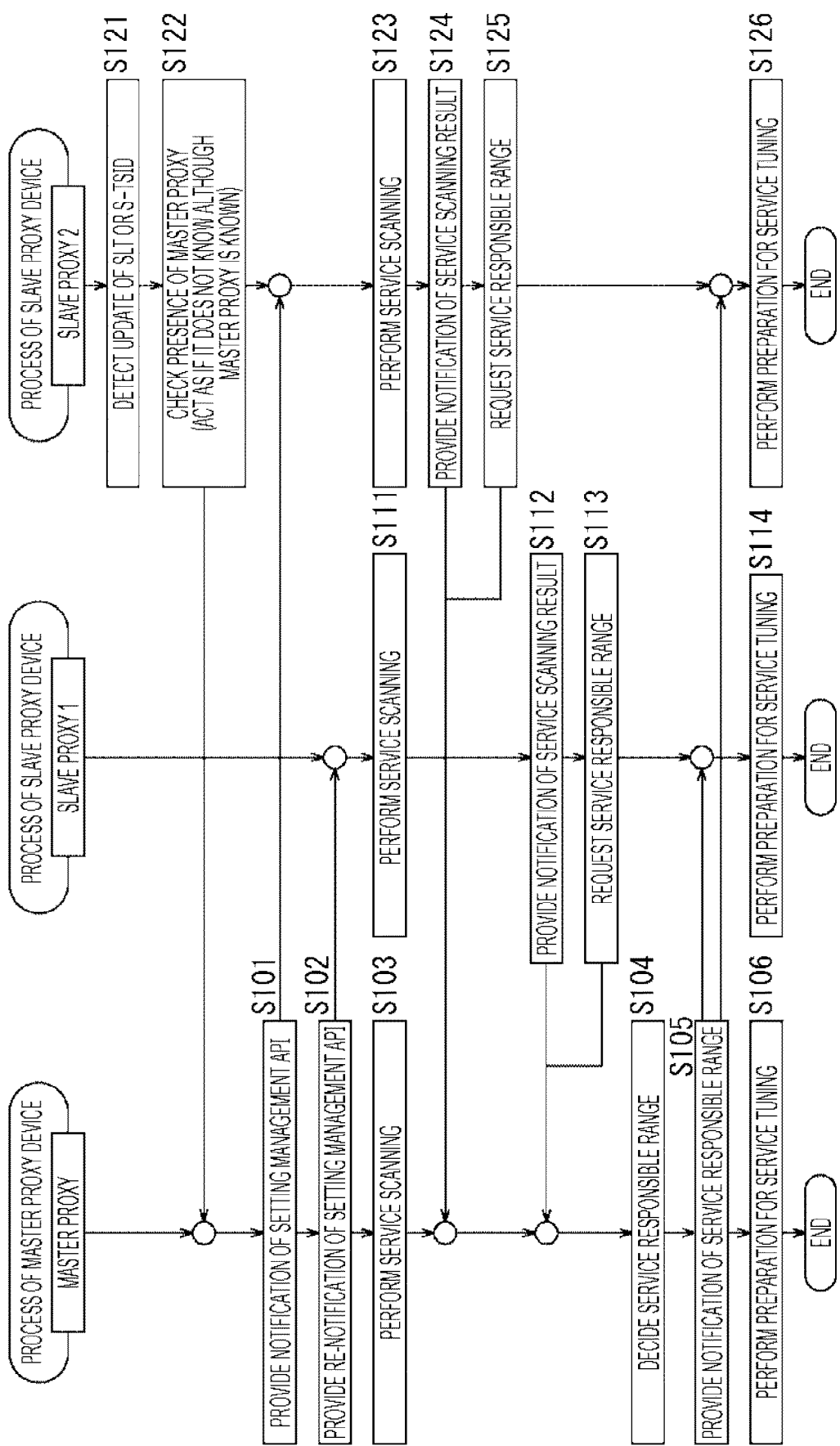
FIG. 27 is a flowchart illustrating a flow of an allocation process of a service responsible range in a case where updating of SLT metadata or S-TSID metadata is detected.

Here, in the description of FIG. 27, it is assumed that the master/slave relation is established between the master proxy device 10M and the slave proxy devices 10S-1 and 10S-2.

Further, in the following description, the slave proxy 161 operated in the slave proxy device 10S-1 is referred to as a slave proxy 161-1 (abbreviated as a "slave proxy 1" in FIG. 27), while the slave proxy 161 operated in the slave proxy device 10S-2 is referred to as a slave proxy 161-2 (abbreviated as a "slave proxy 2" in FIG. 27) for distinguishing.

Further, in FIG. 27, a process of steps S101 to S106 is executed by the master proxy device 10M. On the other hand, a process of steps S111 to S114 is executed by the slave proxy device 10S-1, and a process of steps S121 to S126 is executed by the slave proxy device 10S-2.

If the update of the SLT metadata or the S-TSID metadata is detected in the slave proxy device 10S-2 (S121), in step S122, in order to check the presence of the master proxy 111, the slave proxy 161-2 transmits a presence check message to a device connected to the network 30 through the communication I/F 152 in a multicast manner.

Further, as described above, since the master/slave relation is established between the master proxy device 10M and the slave proxy device 10S-2, the master proxy device 10M is known to the slave proxy device 10S-2, but the slave proxy device 10S-2 acts as if it does not know, and thus the same process sequence as in a case where the slave proxy device 10S-2 is newly added to the network 30 can be performed.

In steps S101 and S102, the master proxy 111 generates a setting management API in accordance with the message transmitted in the multicast manner, and gives a notification (renotification) to the slave proxy device 10S-1 and the slave proxy device 10S-2 via the network 30.

In step S123, the slave proxy 161-2 controls the tuner 151 in accordance with the notification from the master proxy device 10M such that the broadcast service is scanned. Here, for example, an initial scan process is performed by the tuner 151, so that a service scanning result indicating the broadcast service receivable by the slave proxy device 10S-2 is obtained from the SLT metadata or the like transmitted as the LLS.

At this time, in the slave proxy device 10S-1 in which the slave proxy 161-1 operates, rescanning of the broadcast service is performed in accordance with a notification from the master proxy device 10M, and the service scanning result is obtained (S111). Further, in the master proxy device 10M in which the master proxy 111 operates, rescanning of the broadcast service is performed, and the service scanning result is obtained (S103).

Here, it is arbitrary whether or not the service scan is performed by the master proxy device 10M and the slave proxy device 10S-1 at a timing at which the slave proxy device 10S-2 performs the service scan.

When the scanning of the broadcast service (S123) ends, the slave proxy 161-2 transmits a notification of the service scanning result and a request for the service responsible range to the master proxy 111 (S124 and S125).

Similarly, when the scanning of the broadcast service (S111) ends, the slave proxy 161-1 transmits a notification of the service scanning result and a request for the service responsible range to the master proxy 111 (S112 and S113).

The service scanning result and the service responsible range request transmitted by the slave proxy devices 10S-1 and 10S-2 are received by the master proxy device 10M.

In step S104, the master proxy 111 decides the service responsible range on the basis of the service scanning result.

Here, as the service scanning result, the service scanning result of the master proxy device 10M itself, the existing service scanning result of the slave proxy device 10S-1, and the new service scanning result of the slave proxy device 10S-2 are obtained. Then, the master proxy 111 decides the service responsible range of each FW proxy device 10 in accordance with the delivery configuration information or the priority information using the service scanning results.

Here, for example, the delivery configuration information is information indicating that a single broadcast service (broadband service or the like) obtained as a result of parsing the latest SLT metadata and the latest S-TSID metadata is delivered across a plurality of broadcast streams. Further, for example, the priority information is information indicating the priority between the ROUTE sessions obtained as a result of parsing the latest S-TSID metadata.

Here, for example, in a case where the broadcast service such as the broadband service is delivered across a plurality of broadcast streams, the proxy-service responsible range database in which each FW proxy device 10 (the master proxy 111 or the slave proxies 161-1 and 161-2) is associated with the service responsible range is generated and stored in the storage unit 103 so that a plurality of broadcast streams that need to be received simultaneously are distributed to different FW proxy devices 10 (the tuners).

Further, when the proxy-service responsible range database is generated, the master proxy device 10M may allocate the service responsible range to the FW proxy device 10 in view of various kinds of predetermined policies (rules) in addition to the delivery configuration information or the priority information obtained from the S-TSID metadata or the like.

As such policies, for example, all receivable broadcast services within a target area may be mechanically allocated to a plurality of FW proxy devices 10, or a group of broadcast services with a high access frequency may be preferentially allocated so that a load is distributed in consideration of viewing history of the end user. Further, in order to increase the speed of the zapping of the broadcast service (channel), various rules such as grouping broadcast services which can be received at the same time may be selected.

In step S105, the master proxy 111 notifies the slave proxy 161-1 and the slave proxy 161-2 of the service responsible range obtained in the process of step S104.

The slave proxy device 10S-2 in which the slave proxy 161-2 operates controls the tuner 151 on the basis of the service responsible range information from the master proxy device 10M such that preparation for tuning of the broadcast service of its own responsible range is performed (S126).

Similarly, the slave proxy device 10S-1 in which the slave proxy 161-2 operates also performs preparation for tuning of the broadcast service of its own responsible range corresponding to the service responsible range information from the master proxy device 10M (S114). Further, the master proxy device 10M also performs preparation for tuning of the broadcast service of its own responsible range (S106).

As described above, in each FW proxy device 10 connected to the network 30, the preparation for the tuning of the broadcast service of its own responsible range is completed, and an appropriate FW proxy device 10 in the network 30 deals with the request for the DASH segment from the client device 20.

Here, FIG. 28 to FIG. 31 illustrate more specific examples of the allocation of the service responsible range.

Further, in the following example, similarly to the use case described above, the delivery configurations in the time zone T1-T2 and the time zone T2-T3 in a case where times T1, T2, and T3 sequentially elapse on a certain time axis will be described as an example. In other words, in the time zone T1-T2, the delivery configuration illustrated in FIG. 11 is applied, and in the time zone T2-T3, the delivery configuration illustrated in FIG. 15 is applied.

(Allocation of Service Responsible Range in Time Zone T1-T2)

Figure 28:
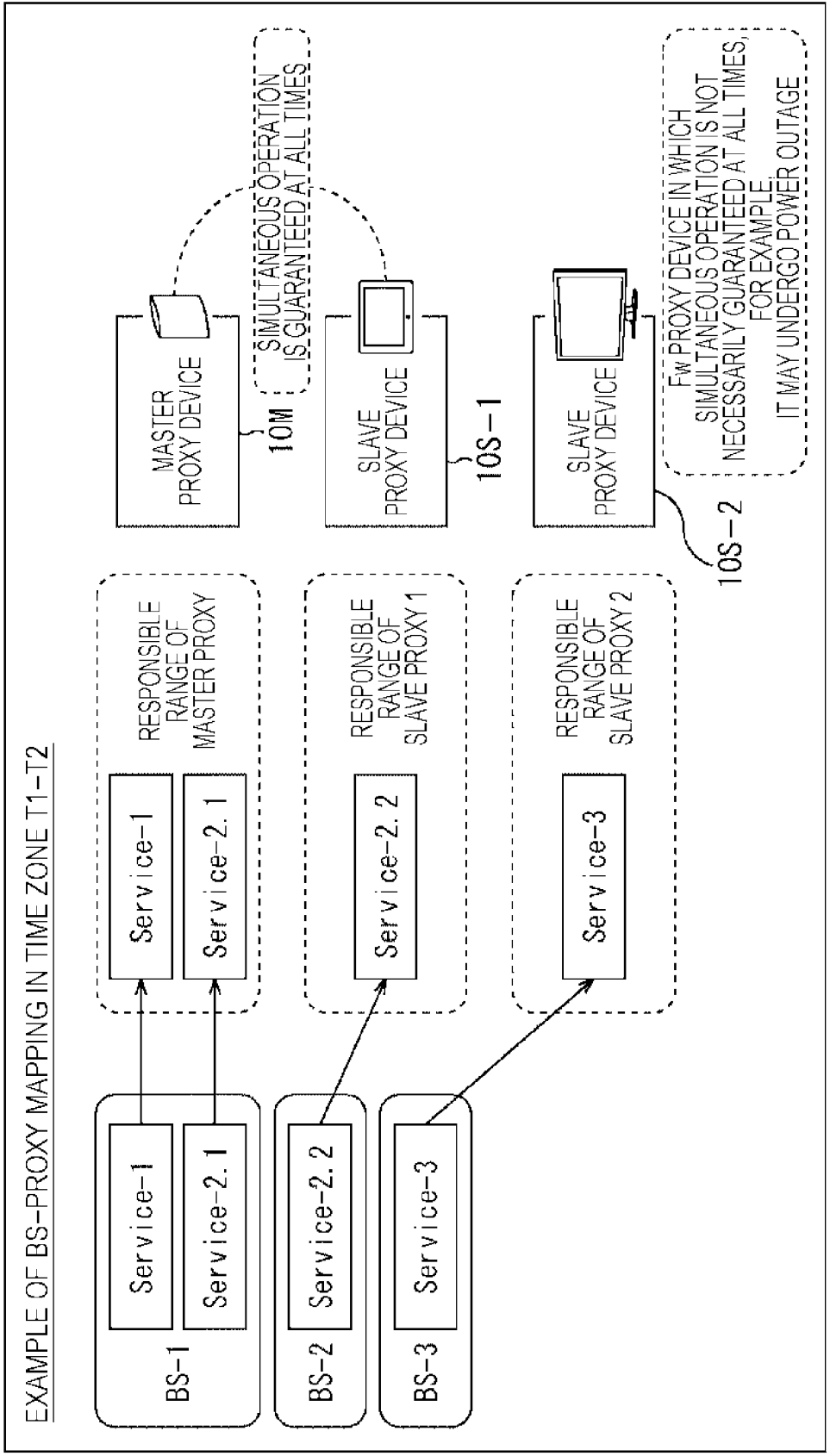
FIG. 28 is a diagram illustrating an example of mapping in a delivery configuration of FIG. 11.

FIG. 28 is a diagram illustrating an example of mapping between the broadcast streams (bsid-1, bsid-2, and bsid-3) and the FW proxy device 10 in the delivery configuration illustrated in FIG. 11 in the time zone T1-T2.

Since FIG. 28 illustrates the service scanning result of the delivery configuration illustrated in FIG. 11, as the broadcast service receivable by the FW proxy device 10 connected to the network 30, a service 1 (svc-1) and a service 2.1 (svc-2) of the broadcast stream 1 (bsid-1), a service 2.2 (svc-2) of the broadcast stream 2 (bsid-2), and a service 3 (svc-3) of the broadcast stream 3 (bsid-3) are scanned.

Further, the service 2.1 and the service 2.2 are the same service 2 (svc-2) which is delivered across a plurality of broadcast streams (bsid-1 and bsid-2).

The master proxy 111 operating in the master proxy device 10M decides the responsible range of the broadcast service responsible by the master proxy 111 and the slave proxy 161 on the basis of these service scanning results.

Here, in the example of FIG. 28, among the scanned broadcast services, the service 1 and the service 2.1 are allocated to the service responsible range of the master proxy 111, the service 2.2 is allocated to the service responsible range of the slave proxy 161-1, and the service 3 is allocated to the service responsible range of slave proxy 161-2.

In other words, in the example of FIG. 28, the service 2 (svc-2) is delivered across the broadcast stream 1 (bsid-1) and the broadcast stream 2 (bsid-2), and a simultaneous operation of the master proxy device 10M and the slave proxy device 10S-1 is guaranteed at all times. Therefore, among the services 2 (svc-2), the service 2.1 is allocated to the master proxy 111 operating in the master proxy device 10M, and the service 2.2 is allocated to the slave proxy 161-1 operating in the slave proxy device 10S-1.

Further, for example, since the slave proxy device 10S-2 is the FW proxy device 10 which may undergo a power outage, that is, the FW proxy device 10 in which a simultaneous operation is not guaranteed at all times, the service 3 which is provided as a single broadcast service is allocated to the slave proxy 161-2 operating in the slave proxy device 10S-2.

(Allocation of Service Responsible Range in Time Zone T2-T3)

Figure 29:
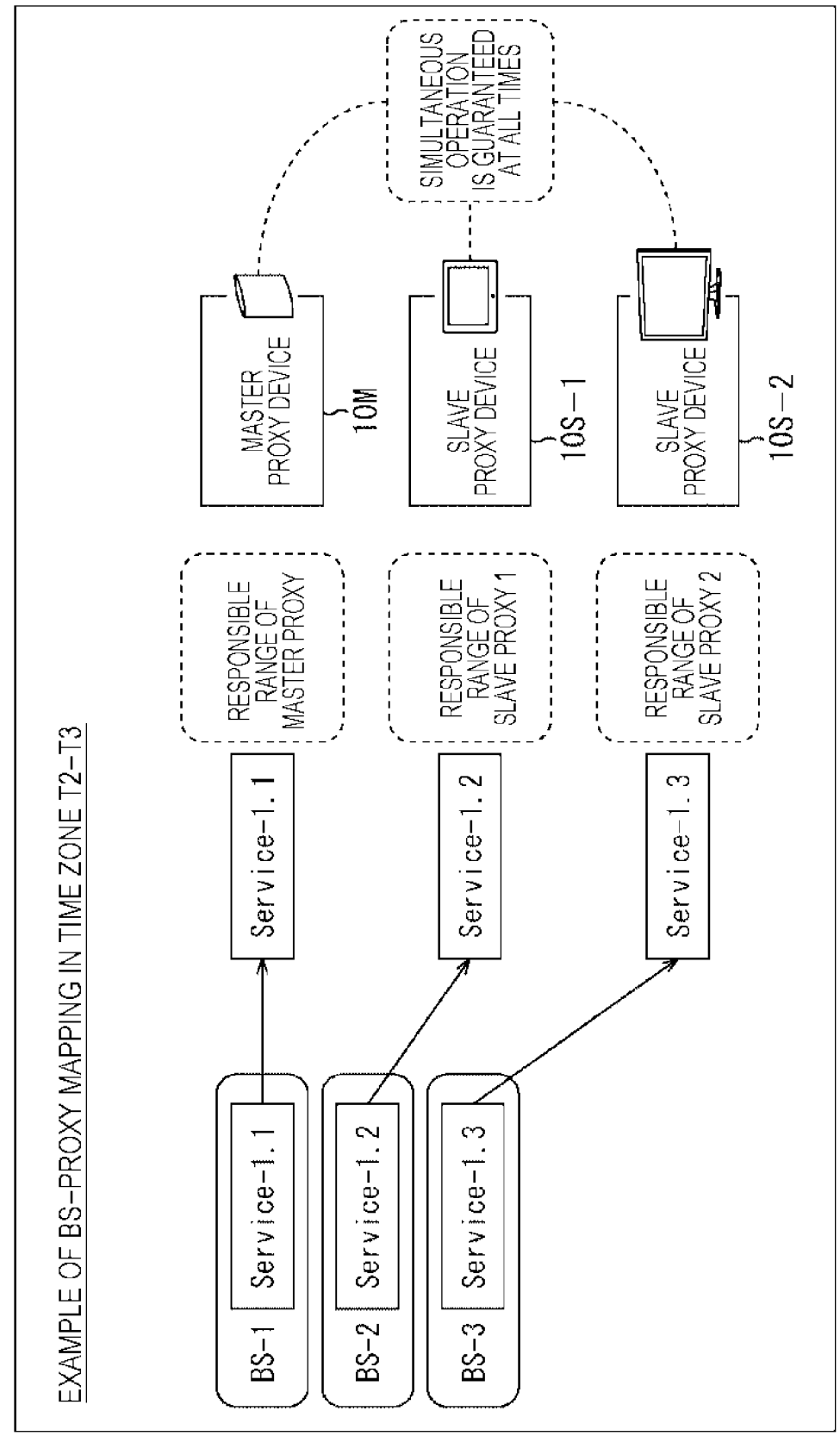
FIG. 29 is a diagram illustrating an example of mapping in a delivery configuration of FIG. 15.

FIG. 29 is a diagram illustrating an example of mapping between the broadcast streams (bsid-1, bsid-2, and bsid-3) and the FW proxy device 10 in the delivery configuration illustrated in FIG. 15 in the time zone T2-T3.

Since FIG. 29 illustrates the service scanning result of the delivery configuration illustrated in FIG. 15, as the broadcast service receivable by the FW proxy device 10 connected to the network 30, a service 1.1 (svc-1) of the broadcast stream 1 (bsid-1), a service 1.2 (svc-1) of the broadcast stream 2 (bsid-2), and a service 1.3 (svc-1) of the broadcast stream 3 (bsid-3) are scanned.

Further, the service 1.1, the service 1.2, and the service 1.3 are the same service 1 (svc-1) which is delivered across a plurality of broadcast streams (bsid-1, bsid-2, and bsid-3).

The master proxy 111 operating in the master proxy device 10M decides the responsible range of the broadcast service responsible by the master proxy 111 and the slave proxy 161 on the basis of these service scanning results.

In the example of FIG. 29, among the scanned broadcast services, the service 1.1 is allocated to the service responsible range of master proxy 111, the service 1.2 is allocated to the service responsible range of slave proxy 161-1, and the service 1.3 is allocated to the service responsible range of slave proxy 161-2.

In other words, in the example of FIG. 29, the service 1 (svc-1) is delivered across the three broadcast streams (bsid-1, bsid-2, and bsid-3), and a simultaneous operation of the master proxy device 10M and the slave proxy devices 10S-1 and 10S-2 is guaranteed at all times.

Therefore, among the services 1 (svc-1), the service 1.1 is allocated to the master proxy 111 operating in master proxy device 10M, the service 1.2 is allocated to the slave proxy 161-1 operating in the slave proxy device 10S-1, and the service 1.3 is allocated to the slave proxy 161-2 operating in the slave proxy device 10S-2.

(Allocation of Service Responsible Range in Time Zone T2-T3 in Case where there are Limitation to Number of Proxies and Priority Designation)

Figure 30:
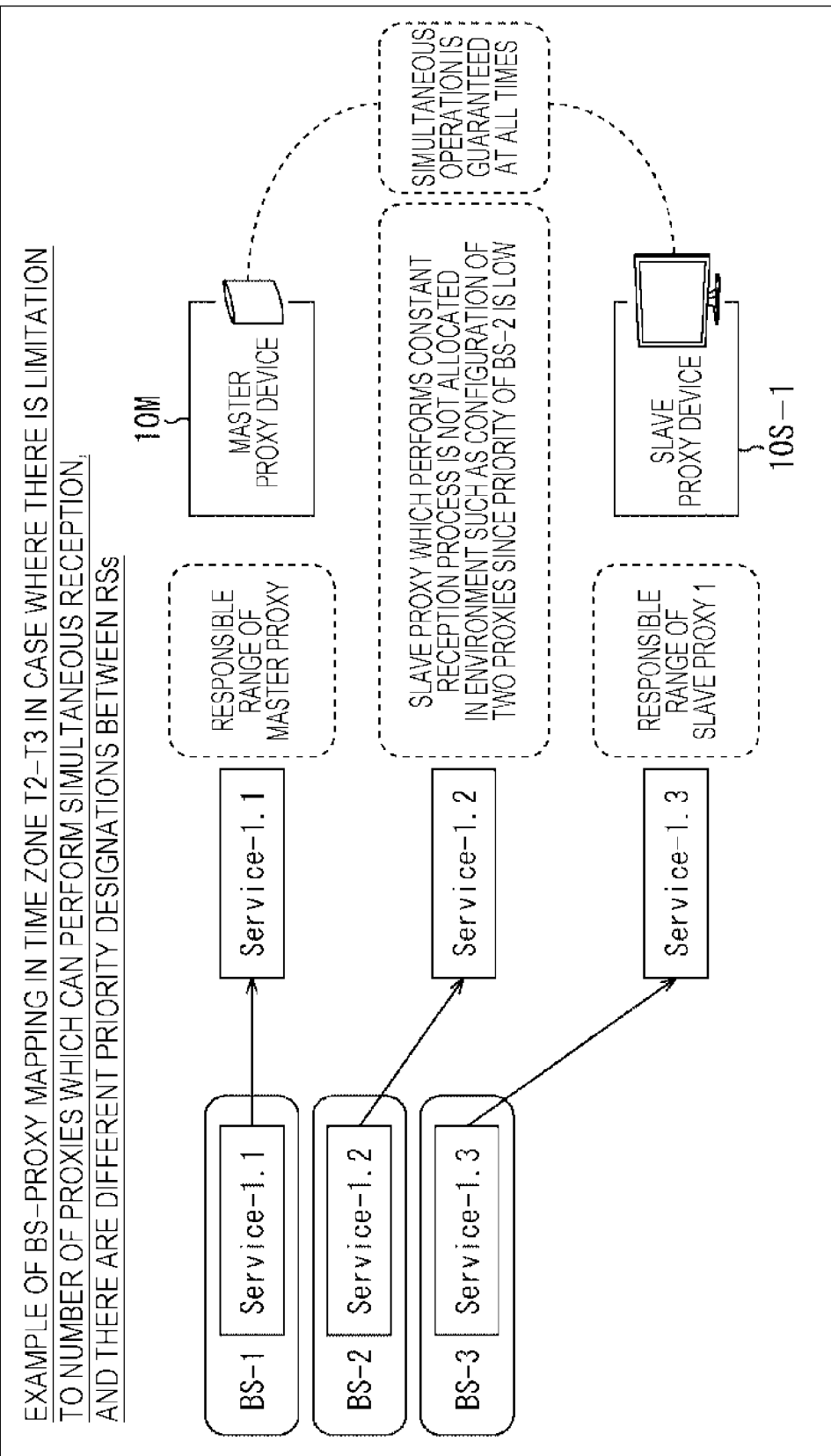
FIG. 30 is a diagram illustrating an example of mapping in a delivery configuration of FIG. 15.

FIG. 30 is a diagram illustrating an example of mapping between the broadcast streams (bsid-1, bsid-2, and bsid-3) and the FW proxy device 10 in the delivery configuration illustrated in FIG. 15 in the time zone T2-T3 in a case where there is a limitation to the number of FW proxy devices 10 capable of performing simultaneous reception, and there are different priority designations between ROUTE sessions.

Since FIG. 30 illustrates the service scanning result of the delivery configuration illustrated in FIG. 15, as the broadcast service receivable by the FW proxy device 10 connected to the network 30, similarly to FIG. 29, a service 1.1 (svc-1) of the broadcast stream 1 (bsid-1), a service 1.2 (svc-1) of the broadcast stream 2 (bsid-2), and a service 1.3 (svc-1) of the broadcast stream 3 (bsid-3) are scanned.

Further, the service 1.1, the service 1.2, and the service 1.3 are the same service 1 (svc-1) which is delivered across a plurality of broadcast streams (bsid-1, bsid-2, and bsid-3), and for example, the service 1.1 includes the ROUTE session for transferring the stream of the base layer, and the service 1.2 and the service 1.3 include the ROUTE session for transferring the stream of the enhancement layer.

The master proxy 111 operating in the master proxy device 10M decides the responsible range of the broadcast service responsible by the master proxy 111 and the slave proxy 161 on the basis of these service scanning results.

Here, in the example of FIG. 30, only the master proxy device 10M and the slave proxy device 10S-1 are connected to the network 30, and there is a limitation to the number of FW proxy devices 10 capable of performing simultaneous reception, and thus the responsible range of the broadcast service responsible by the master proxy 111 and the slave proxy 161 is decided in accordance with the priority between the ROUTE sessions.

In other words, in the example of FIG. 30, although the service 1 (svc-1) is delivered across the three broadcast streams (bsid-1, bsid-2, and bsid-3), it is a configuration of one master proxy device 10M and one slave proxy device 10S-1, and thus it is difficult to receive all the broadcast streams.

Figure 31:
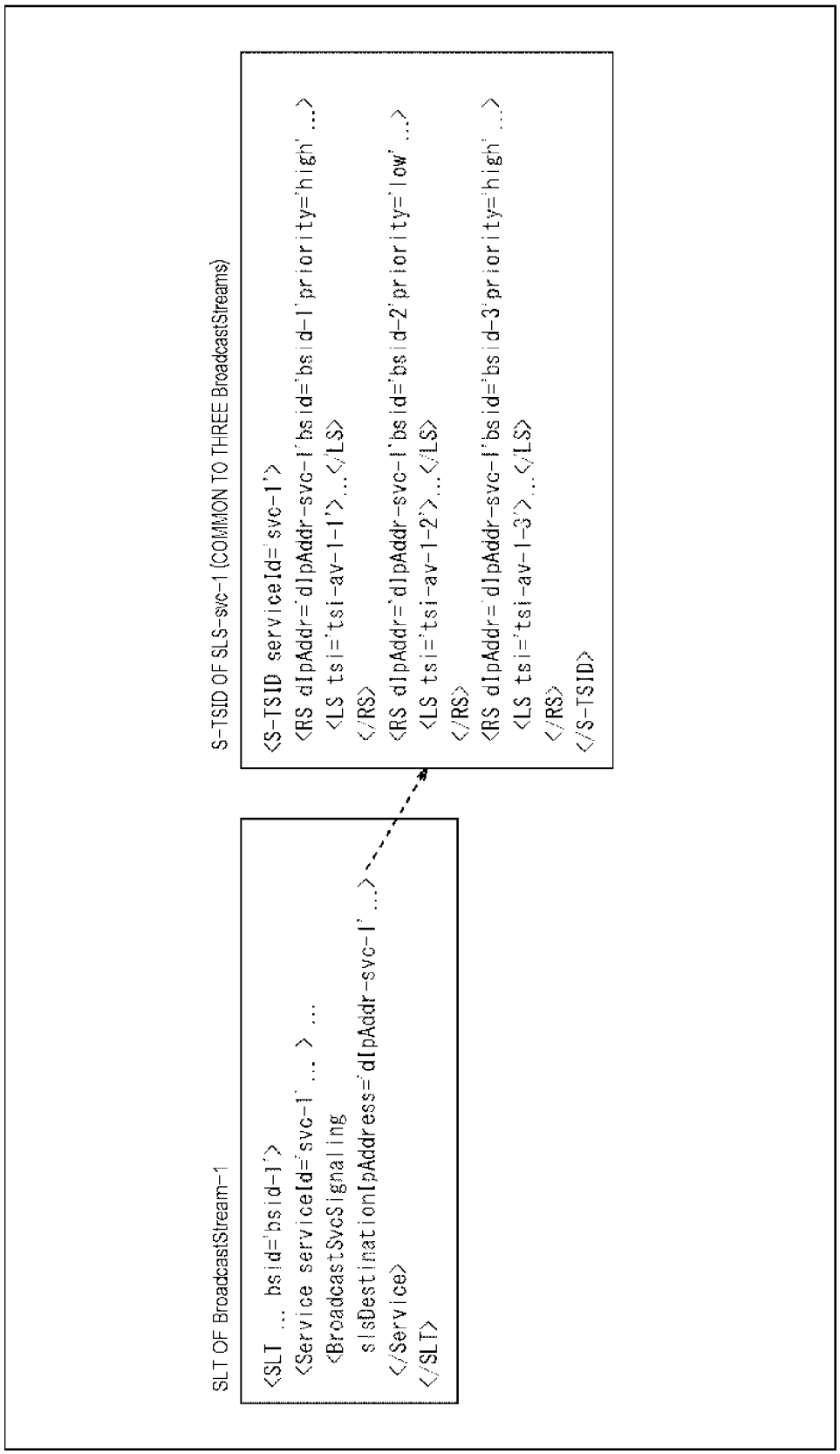
FIG. 31 is a diagram illustrating an example of SLT metadata and S-TSID metadata in a delivery configuration of FIG. 30.

On the other hand, the simultaneous operation of the master proxy device 10M and the slave proxy device 10S-1 is guaranteed at all times. Further, at this time, as illustrated in FIG. 31, in the S-TSID metadata, a priority of priority=high is designated in the ROUTE session of the broadcast stream 1 (bsid-1) and the broadcast stream 3 (bsid-3), whereas a priority of priority=low priority is designated in the ROUTE session of the broadcast stream 2 (bsid-2).

In this case, since the priority of the ROUTE session of the broadcast stream 2 (bsid-2) is lower than that of the broadcast streams 1 and 3, in the configuration with the two FW proxy devices 10, the master proxy 111 preferentially allocates (the service 1.1 and the service 1.3 of) the broadcast streams 1 and 3 to the master proxy 111 operating in master proxy device 10M and the slave proxy 161 operating in the slave proxy device 10S-1. In other words, the slave proxy 161 that performs the simultaneous reception process is not allocated to the broadcast stream 2 in which a priority between the ROUTE sessions is relatively low.

Figure 50:
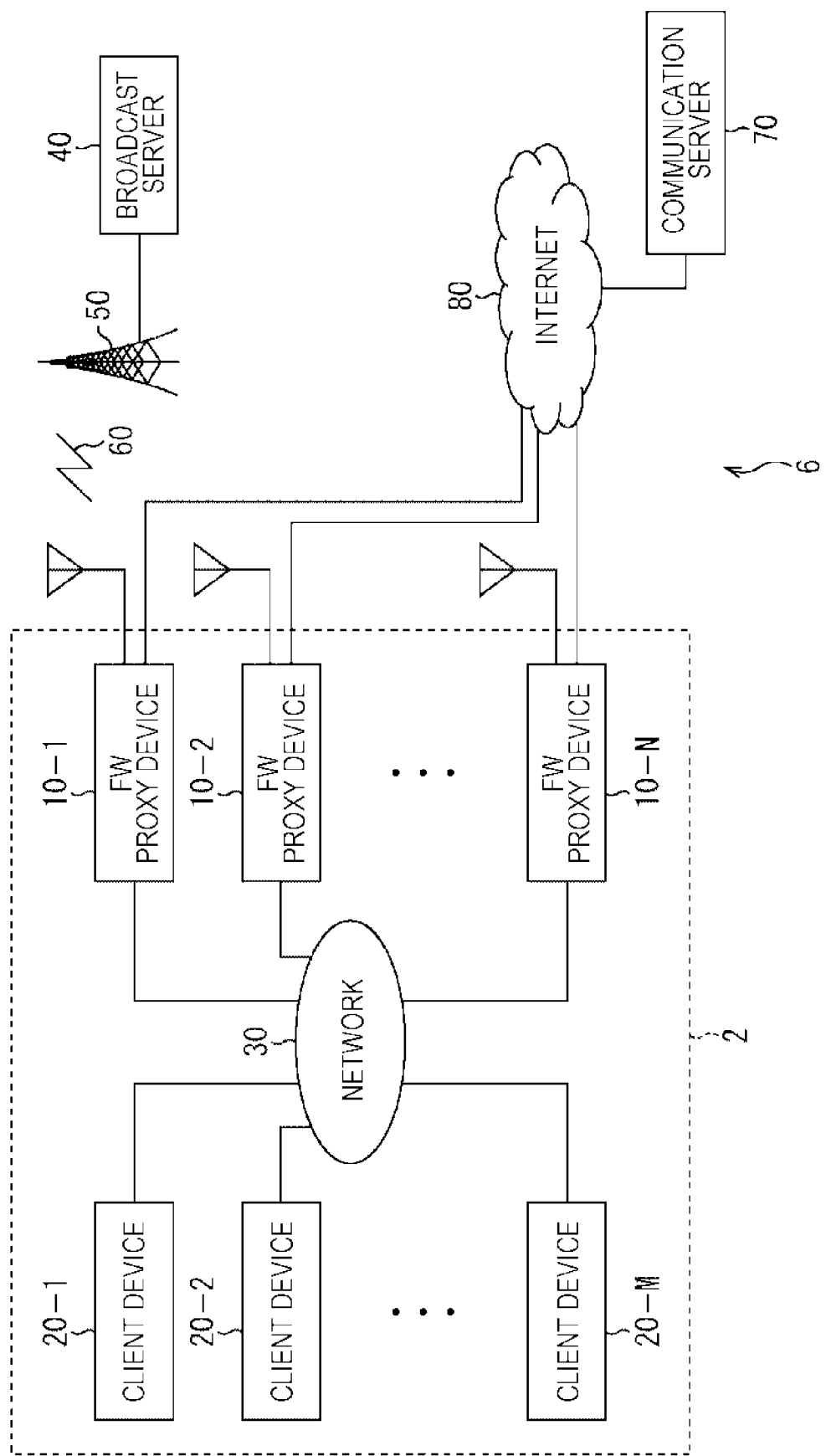
FIG. 50 is a diagram illustrating another configuration example of a transmission system.

Further, in a case where the master proxy 111 receives a segment request of the service 1.2 from the client device 20 connected to the network 30, since the reception processing of the service 1.2 is not necessarily guaranteed, for example, the segment is acquired via communication. A configuration corresponding to the delivery via the communication is illustrated in FIG. 50. Further, the reception of the delivery via the communication is not limited to being performed by the master proxy device 10M in which the master proxy 111 operates and may be performed by, for example, the slave proxy device 10S or the client device 20 itself.

The flow of the allocation process of the service responsible range in the case where the update of the SLT metadata or the S-TSID metadata is detected has been described above.

(Segment Request Redirection Process)

Next, a flow of a segment request redirection process will be described with reference to a flowchart of FIG. 32.

Figure 32:
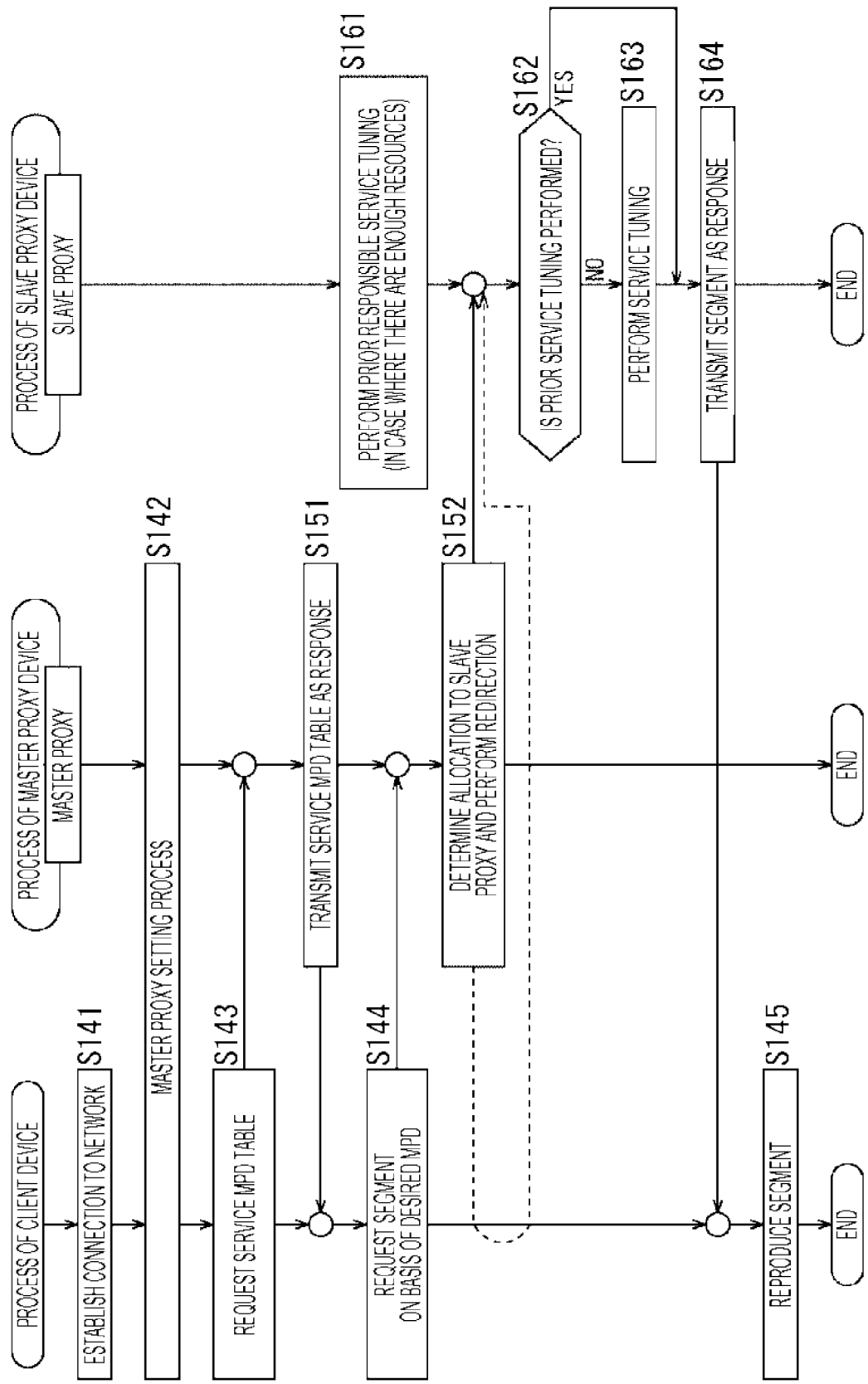
FIG. 32 is a flowchart for describing a flow of a segment request redirection process.

The description of FIG. 32 will proceed with an example in which the client device 20 is connected to the network 30 in which the master proxy device 10M and one slave proxy device 10S are located, and the client device 20 gives an instruction to reproduce content delivered via broadcasting.

In other words, the segment request redirection process of FIG. 32 is a process performed after the allocation process of the service responsible range described with reference to FIG. 27. Here, for the sake of simplicity of description, in the description of FIG. 32, an example in which only one slave proxy device 10S is connected will be described.

Further, in FIG. 32, a process of steps S141 to S145 is executed by the client device 20. On the other hand, a process of steps S142 and S151 to S152 is executed by the master proxy device 10M, and a process of steps S161 to S164 is executed by the slave proxy device 10S.

In FIG. 32, if the client device 20 establishes a connection with the network 30 (S141), a master proxy setting process is performed between the client device 20 and the master proxy device 10M (S142). In the master proxy setting process, a connection between the client device 20 and the master proxy 111 operating in the master proxy device 10M is established.

Further, as a method in which the client device 20 discovers the master proxy 111 operating in the master proxy device 10M and establishing a connection, several methods, for example, a method using a dynamic host configuration protocol (DHCP) server, a method using web proxy auto discovery (WPAD), or the like are considered, but a connection is established using one of these methods.

In step S143, the application 211 transmits a request for a service-MPD table to the master proxy 111.

In the process of step S143, the request for the service-MPD table transmitted by the client device 20 is received by the master proxy device 10M via the network 30.

In step S151, the master proxy 111 generates the service-MPD table in response to the request of the table received from the client device 20, and transmits a response to the client device 20 via the network 30.

Here, the service-MPD table is a table in which the broadcast service and the MPD metadata are associated with each other. The service-MPD table is generated from the SLS. Further, here, for the sake of simplicity of description, the service-MPD table is described as being generated by the master proxy 111, but the service-MPD table may be generated by the SLS processing system 113.

In the process of step S151, the service-MPD table transmitted by the master proxy device 10M is received by the client device 20 via the network 30.

In step S144, the application 211 transmits a request for the DASH segment to the master proxy 111 on the basis of the MPD metadata corresponding to a desired broadcast service with reference to the service-MPD table received from the master proxy device 10M.

In the process of step S144, the request for the DASH segment transmitted by the client device 20 is received by the master proxy device 10M via the network 30.

In step S152, the master proxy 111 determines an allocation of the request for the DASH segment received from the client device 20 to the slave proxy 161 with reference to the proxy-service responsible range database, and performs the redirection in accordance with a determination result.

Accordingly, the request for the DASH segment from (the application 211 of) the client device 20 is redirected to an appropriate slave proxy 161 by the master proxy 111.

Further, here, for the sake of simplicity of description, the notification of the request for the DASH segment to be redirected is described as being directly given from the master proxy 111 to the slave proxy 161, but in practice, the notification is indirectly given from the master proxy 111 to the slave proxy 161 via the client device 20 as indicated by a dotted line in FIG. 32.

In the process of step S152, the request for the DASH segment redirected by the master proxy device 10M is received by the slave proxy device 10S in which the slave proxy 161 determined to be appropriate operates.

In step S162, the slave proxy 161 determines whether or not prior service tuning is performed. Further, in the slave proxy device 10S, the service tuning can be performed in advance for the broadcast service of the responsible range in a case where resources are enough (S161).

Here, in a case where resources are not enough, and the prior service tuning is not performed in the process of step S161, "NO" is determined in the determination process of step S162, and the process proceeds to step S163.

In step S163, the slave proxy 161 controls the tuner 151 on the basis of the request for the DASH segment received from the master proxy device 10M such that the broadcast service is tuned. Accordingly, a DASH segment file corresponding to the request for the DASH segment is acquired from the broadcast server 40 via broadcasting.

On the other hand, in a case where resources are enough, and the prior service tuning is performed in the process of step S161, since the stream of the broadcast service of the responsible range obtained from the broadcast server 40 via broadcasting has already been developed, the process of step S163 is skipped. In this case, the DASH segment file corresponding to the request for the DASH segment is acquired from the developed stream.

If the DASH segment file is acquired, the process proceeds to step S164. In step S164, the slave proxy 161 transmits the DASH segment file received from the broadcast server 40 to the client device 20 connected to the network 30 through the communication I/F 102.

In the process of step S164, the DASH segment file transmitted (transferred) by the slave proxy device 10S is received by the client device 20 via the network 30.

In the client device 20, the browser 212 reproduces the DASH segment file received from the slave proxy device 10S (S145). Accordingly, in the client device 20, content such as a program delivered via broadcasting is reproduced.

The flow of the segment request redirection process has been described above.

(Transmission Side Process)

Figure 33:
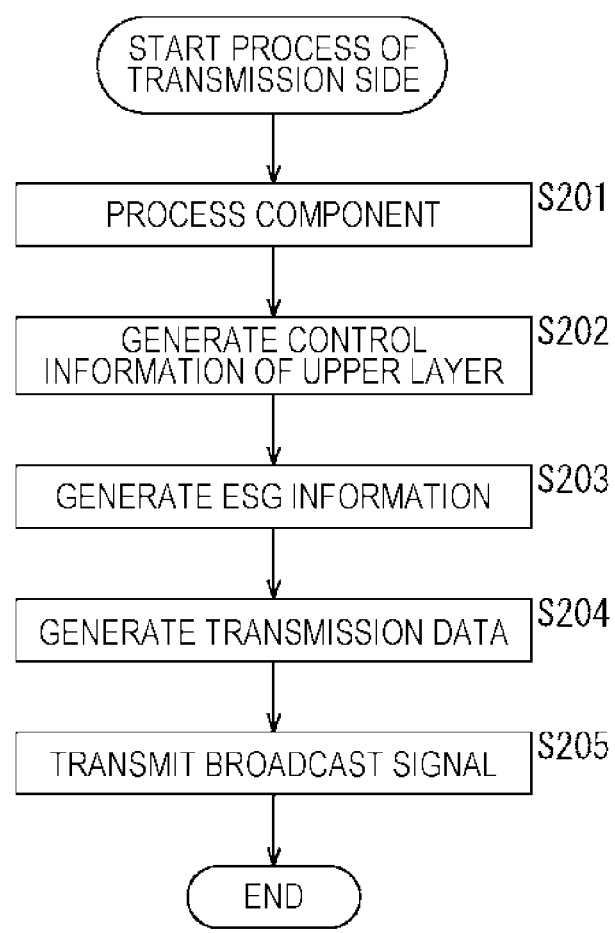
FIG. 33 is a flowchart for describing a flow of a transmission side process.

Next, a flow of a transmission side process will be described with reference to the flowchart of FIG. 33.

In step S201, the component processing unit 401 processes data of a component constituting content such as a program. Here, for example, an encoding process or the like such as the scalable video coding is performed on data such as a video, an audio, and a subtitle.

In step S202, the control information generating unit 402 generates control information of an upper layer. In this case, the LLS, the SLS, and the like are generated as the control information of the upper layer. For example, in a case where the broadcast service is delivered across a plurality of broadcast streams, information such as the delivery configuration information or the priority information is included in the S-TSID metadata of the SLS.

In step S203, the ESG generating unit 403 generates the ESG information. Here, for example, in a case where the broadcast service is delivered across a plurality of broadcast streams, the delivery configuration information is included in a schedule fragment of the ESG information. Further, the ESG information will be described later in detail with reference to FIGS. 34 to 49.

In step S204, the multiplexer 404 multiplexes a stream of the component obtained in the process of step S201, a stream of the control information of the upper layer obtained in the process of step S202, and a stream of the ESG information obtained in the process of step S203. Further, in step S204, the data processing unit 405 processes a multiplexed stream obtained as a result of multiplexing, and generates transmission data having a predetermined format.

In step S205, the transmitting unit 406 transmits the transmission data obtained in the process of step S204 to the transmitting facility of the transmitting station 50 via a dedicated line. Then, the transmission facility in the transmitting station 50 executes a necessary processing (a modulation process or the like) on the transmission data from the broadcast server 40, and transmits a broadcast signal obtained as a result.

The flow of the transmission side process has been described above.

6. Notification to End User by ESG

By the way, the presence of a single broadcast service across a plurality of broadcast streams is given in notification (signaled) by the SLS, but since the SLS is delivered just before a relevant service is started, for example, the reception side is unable to know the presence of such a broadcast service a few minutes ago or a few hours ago, or a few hours ago. For this preliminary announcement, an electronic service guide (ESG) can be used.

For example, the ESG in ATSC 3.0 is provided as one service, and in order to acquire the ESG service, it is acquired by searching for one in which a service category is set as the ESG service in a service entry of the SLT metadata. Further, the SLT metadata are described in detail in "Table 6.2 SLT XML Format" of Non-Patent Document 2 below.
Non-Patent Document 2: ATSC Candidate Standard: Signaling, Delivery, Synchronization, and Error Protection (A/331)
(1) Configuration of ESG Service in Case of First Delivery Configuration First, a configuration example of the ESG service in the case of a first delivery configuration will be described. In the first delivery configuration, the ROUTE sessions (RouteSession-1-1 and RouteSession-1-2) of two independent broadcast services (Service-1 and Service-2) are transferred through the broadcast stream 1 (bsid-1).
(Configuration Example of ESG Service of First Delivery Configuration)

Figure 34:
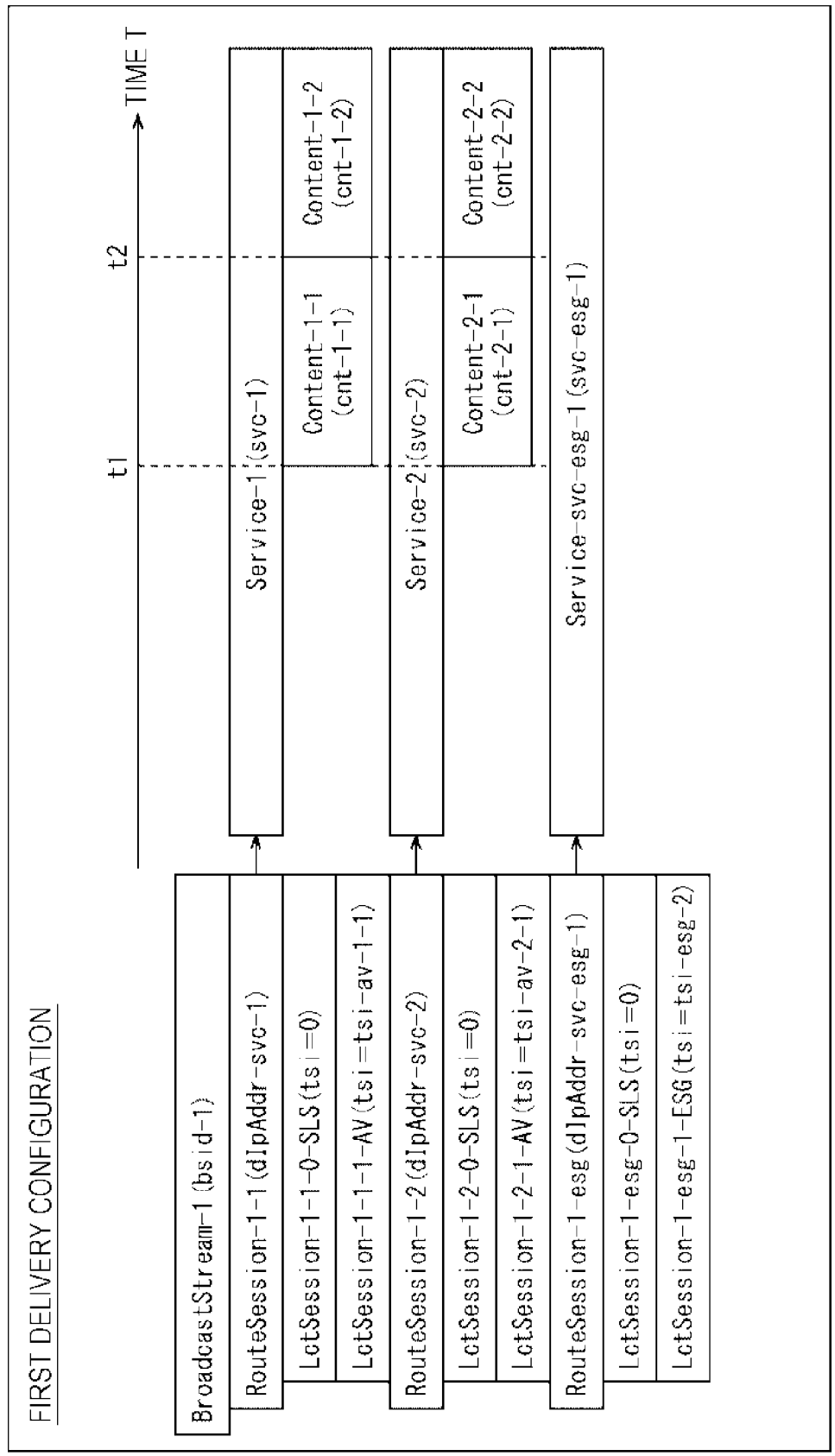
FIG. 34 is a diagram illustrating a configuration example of an ESG service in the case of a first delivery configuration.

FIG. 34 is a diagram illustrating a configuration example of the ESG service in the case of the first delivery configuration.

A broadcast stream 1 having bsid=bsid-1 as a broadcast stream ID is constituted by three ROUTE sessions (RouteSession-1-1, RouteSession-1-2, and RouteSession-1-esg). Two broadcast services (Service-1 and Service-2) are respectively carried through the ROUTE session 1-1 (dIpAddr-svc-1) and the ROUTE session 1-2 (dIpAddr-svc-2), and each of the broadcast services (svc-1 and svc-2) includes a plurality of programs (Content) in a time direction.

In FIG. 34, when a direction from a left side to a right side in the drawing is a direction of time, in the service 1 (svc-1), content 1-1 (cnt-1-1) is delivered from a time t1 to a time t2, and after the time t2, content 1-2 (cnt-1-2) is delivered. Further, in the service 2 (svc-2), content 2-1 (cnt-2-1) is delivered from the time t1 to the time t2, and after the time t2, content 2-2 (cnt-2-2) is delivered.

A notification of program scheduling of each broadcast service is given to the reception side through an ESG service (svc-esg-1) transferred through the ROUTE session 1-esg (dIpAddr-svc-esg-1) of the same broadcast stream 1 (bsid-1) as each of the broadcast services. In the ESG service, a plurality of ESG XML fragment files are transferred as in transmission by Carousel.

Here, each XML fragment of the ESG service has a data structure corresponding to content of an object to be described such as a service, content, a schedule, or the like. In the LCT session of the ROUTE session 1-esg (dIpAddr-svc-esg-1) of the ESG service, the XML fragments of the service, the content, and the schedule are delivered as the ESG information several days to several weeks before a corresponding service (program) is delivered.

Here, the following XML fragment is included in the ESG information. In other words, in the case of the first delivery configuration, XML fragments of a service 1 (Service-1), a service 2 (Service-2), content 1-1 (Content-1-1), content 1-2 (Content-1-2), content 2-1 (Content-2-1), content 2-2 (Content-2-2), a schedule 1-1 (Schedule-1-1), a schedule 1-2 (Schedule-1-2), a schedule 2-1 (Schedule-2-1), and a schedule 2-2 (Schedule-2-2) are delivered as the ESG information.
(Relation of XML Fragments)

Figure 35:
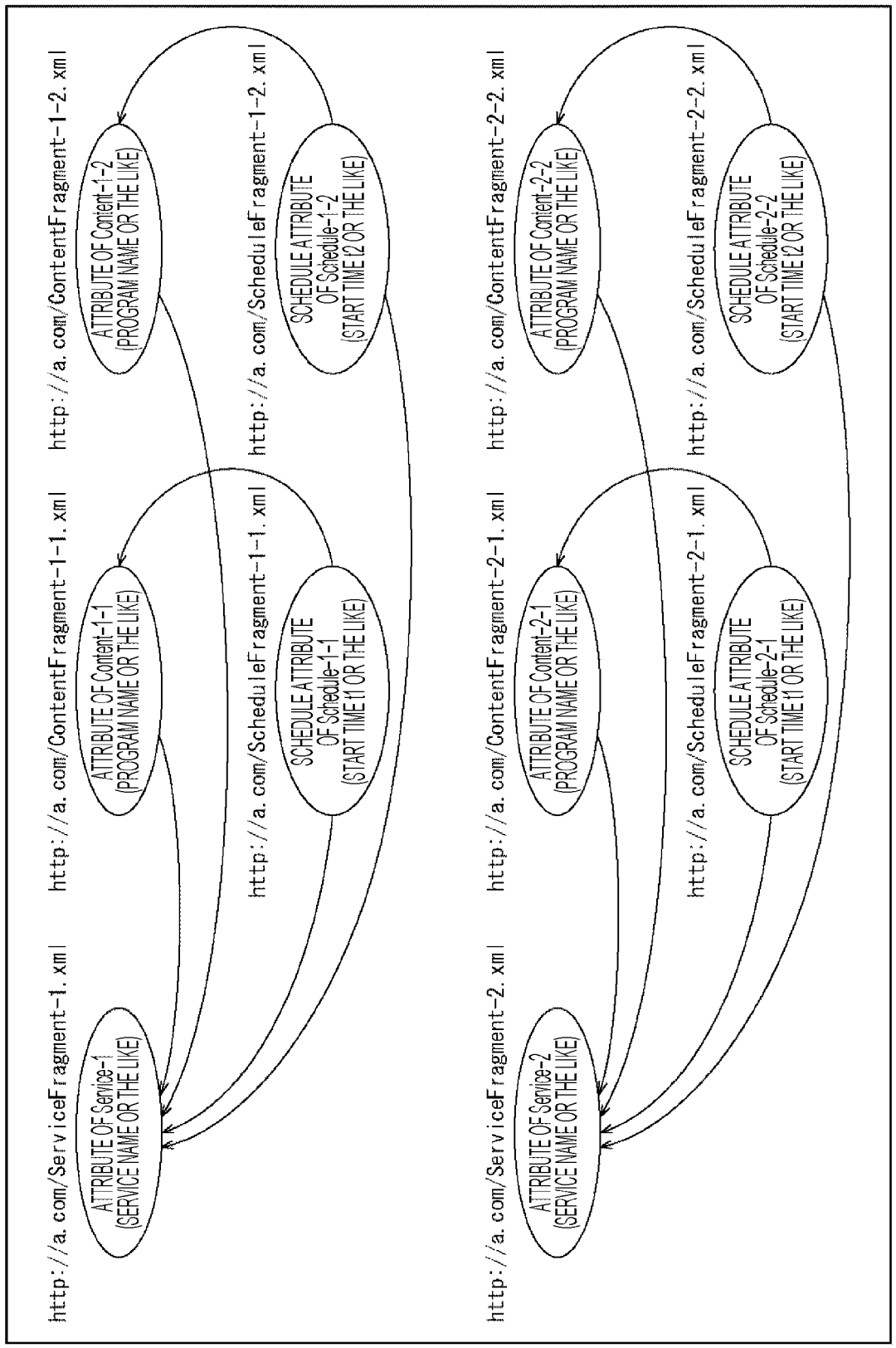
FIG. 35 is a diagram illustrating a relation of XML fragments in the case of a first delivery configuration.

FIG. 35 is a diagram illustrating the relation between the XML fragments of the service, the content, and the schedule in the case of the first delivery configuration.

As illustrated in an upper part of FIG. 35, an attribute of Service-1 such as a service name is described in ServiceFragment-1.xml.

An attribute of Content-1-1 such as a program name is described in ContentFragment-1-1.xml. Further, an attribute of Content-1-2 such as a program name is described in ContentFragment-1-2.xml. Further, the XML fragments of Content-1-1 and Content-1-2 are associated with the XML fragment of Service-1.

A schedule attribute of Schedule-1-1 such as a start time t1 of Content-1-1 is described in ScheduleFragment-1-1.xml. Further, a schedule attribute of Schedule-1-2 such as a start time t2 of Content-1-2 is described in ScheduleFragment-1-2.xml.

Further, the XML fragments of Schedule-1-1 and Schedule-1-2 are associated with the XML fragment of Service-1. Further, the XML fragment of Schedule-1-1 is associated with the XML fragment of Content-1-1, and the XML fragment of Schedule-1-2 is associated with the XML fragment of Content-1-2.

Figure 36:
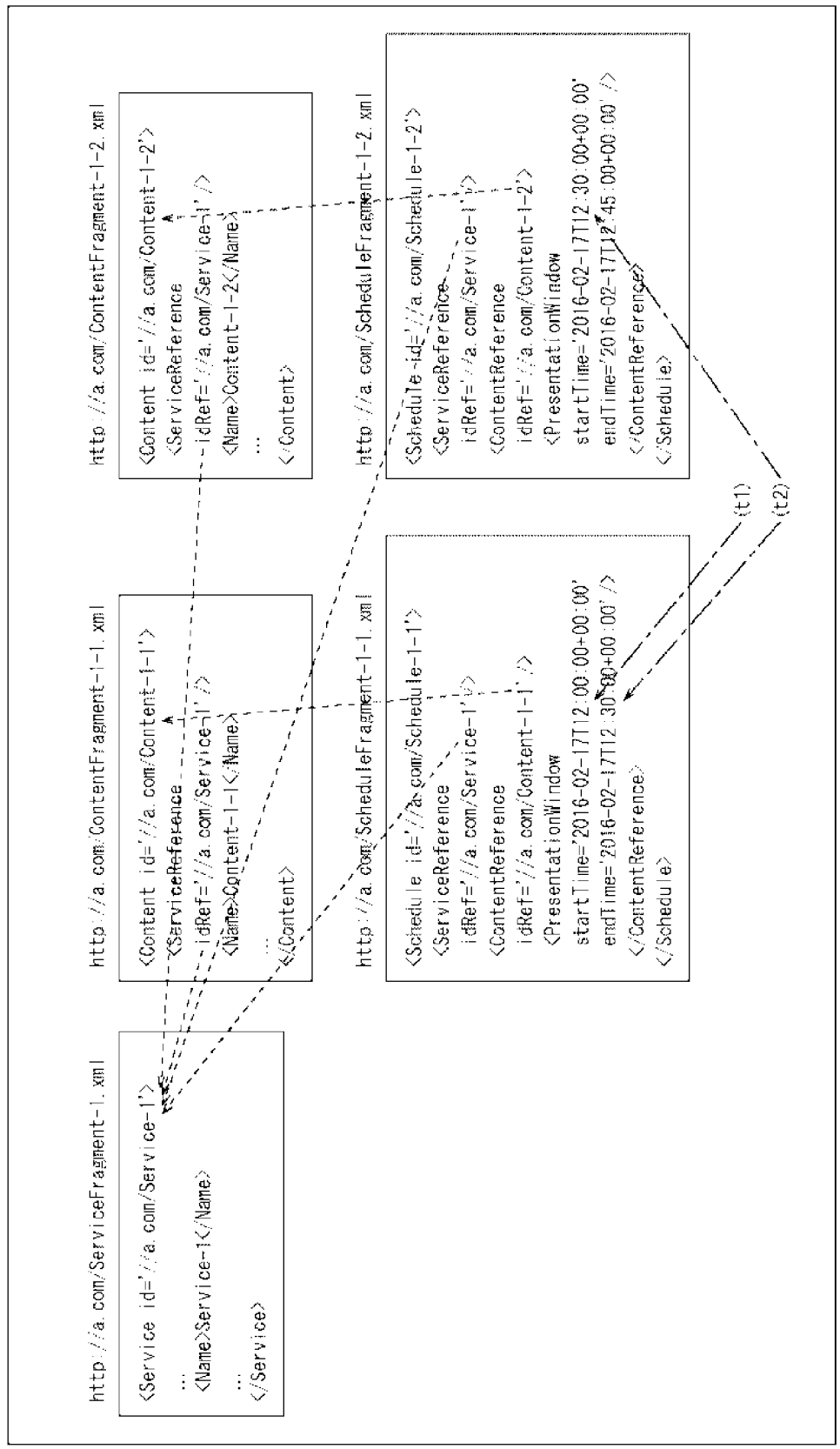
FIG. 36 is a diagram illustrating an example of an XML instance in the case of a first delivery configuration.

Here, FIG. 36 illustrates an example of XML instances of ServiceFragment-1, ContentFragment-1-1/-1-2, and ScheduleFragment-1-1/-1-2.

In ServiceFragment-1.xml, Service-1 is designated as a service name by a Name element of a Service element.

In ContentFragment-1-1.xml, Content-1-1 is designated as a program name by a Name element of a Content element.

Further, in ContentFragment-1-2.xml, Content-1-2 is designated as a program name by a Name element of a Content element.

Further, in ContentFragment-1-1.xml and ContentFragment-1-2.xml, a value of an idRef attribute of a ServiceReference element is associated with a value of an id attribute of a Service element of ServiceFragment-1.xml.

In ScheduleFragment-1-1.xml, a start time and an end time of Content-1-1 are designated by a startTime attribute and an endTime attribute of a PresentationWindow element. In this example, '2016-02-17T12:00:00+00:00' is designated as the start time t1 of Content-1-1 by the startTime attribute, and '2016-02-17T12:30:00+00:00' is designated as the end time t2 of Content-1-1 by the endTime attribute.

In ScheduleFragment-1-2.xml, a start time and an end time of Content-1-2 are designated by the startTime attribute and endTime attribute of the PresentationWindow element. In this example, '2016-02-17T12:30:00+00:00' is designated as the start time t2 of Content-1-2 by the startTime attribute, and '2016-02-17T12:45:00+00:00' is designated as the end time of Content-1-2 by the endTime attribute.

Further, in ScheduleFragment-1-1.xml and ScheduleFragment-1-2.xml, the value of the idRef attribute of the ServiceReference element is associated with the value of the id attribute of the Service element of ServiceFragment-1.xml. Further, in ScheduleFragment-1-1.xml, a value of an idRef attribute of a ContentReference element is associated with a value of an id attribute of a Content element of ContentFragment-1-1.xml. Further, in ScheduleFragment-1-2.xml, a value of an idRef attribute of a ContentReference element is associated with a value of an id attribute of a Content element of ContentFragment-1-2.xml.

Returning to the description of FIG. 35, an attribute of Service-2 such as a service name is described in ServiceFragment-2.xml as illustrated in a lower part of FIG. 35.

In ContentFragment-2-1.xml, an attribute of Content-2-1 such as a program name is described. Further, in ContentFragment-2-2.xml, an attribute of Content-2-2 such as a program name is described. Further, the XML fragments of Content-2-1 and Content-2-2 are associated with the XML fragment of Service-2.

In ScheduleFragment-2-1.xml, a schedule attribute of Schedule-2-1 such as a start time t1 of Content-2-1 is described. Further, in ScheduleFragment-2-2.xml, a schedule attribute of Schedule-2-2 such as a start time t2 of Content-2-2 is described.

Further, the XML fragments of Schedule-2-1 and Schedule-2-2 are associated with the XML fragment of Service-2. Further, the XML fragment of Schedule-2-1 is associated with the XML fragment of Content-2-1, and the XML fragment of Schedule-2-2 is associated with the XML fragment of Content-2-2.

The configuration of the ESG service in the case of the first delivery configuration has been described above.

(2) Configuration of ESG Service in Case of Second Delivery Configuration

Next, a configuration example of the ESG service in the case of a second delivery configuration will be described. In the second delivery configuration, one broadcast service (Service-3) is transferred in the broadcast stream 2 (bsid-2) in parallel with the first delivery configuration described above.

(Configuration Example of ESG Service of Second Delivery Configuration)

Figure 37:
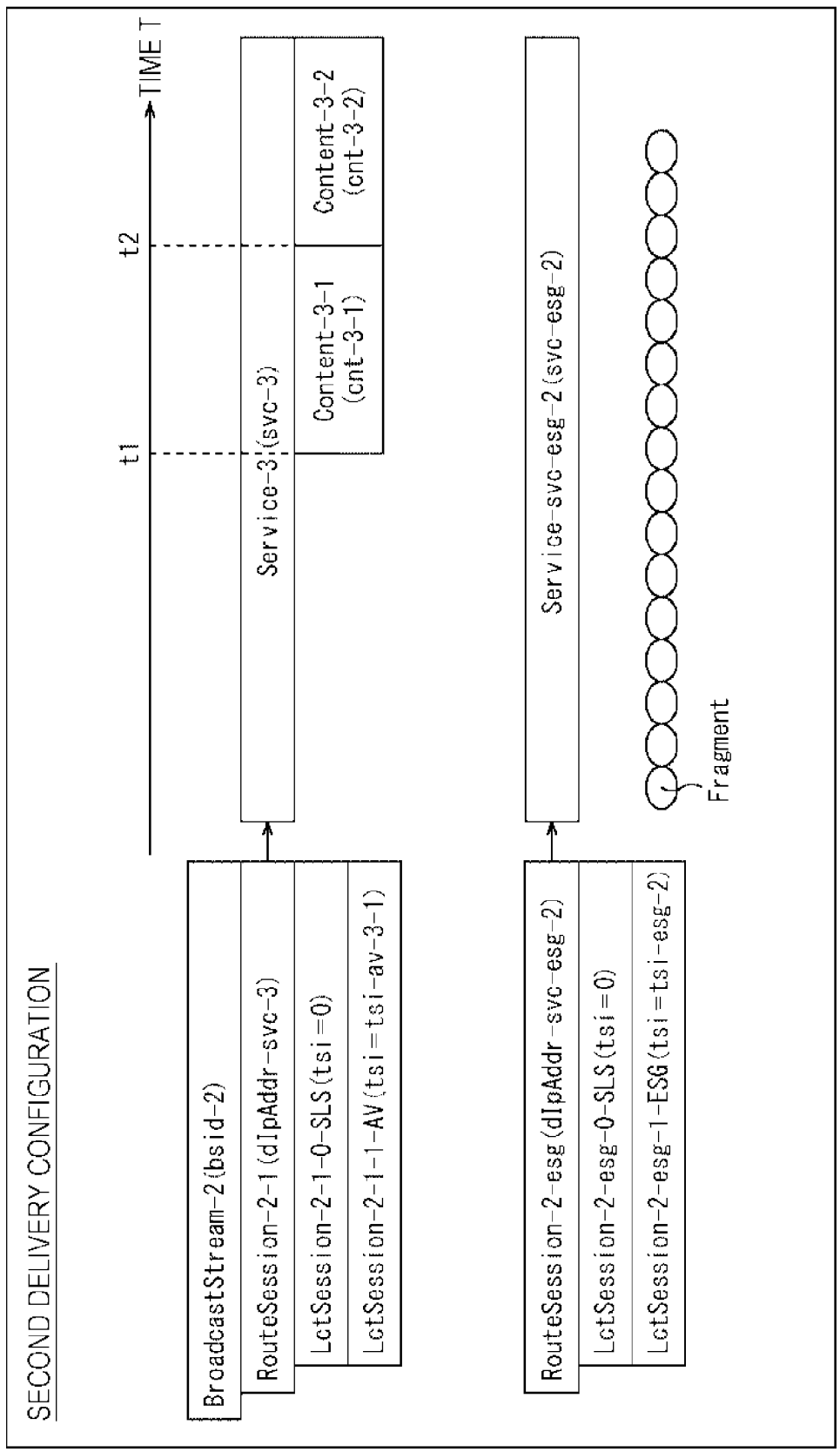
FIG. 37 is a diagram illustrating a configuration example of an ESG service in the case of a second delivery configuration.

FIG. 37 is a diagram illustrating a configuration example of the ESG service in the case of the second delivery configuration.

A broadcast stream 2 having bsid=bsid-2 as the broadcast stream ID includes two ROUTE sessions (RouteSession-2-1 and RouteSession-2-esg). A single broadcast service (Service-3) is carried in the ROUTE session 2-1 (dIpAddr-svc-3), and the service 3 (svc-3) includes a plurality of programs (Content) in a direction of time.

In FIG. 37, when a direction from a left side to a right side in the drawing is a direction of time, in the service 3 (svc-3), content 3-1 (cnt-3-1) is delivered from a time t1 to a time t2, and after the time t2, content 3-2 (cnt-3-2) is delivered. Similarly to the services 1 and 2 (svc-1, 2), a notification of program scheduling of the service 3 (svc-3) is given to the reception side through an ESG service (svc-esg-2) transferred through the ROUTE session 2-esg (dIpAddr-svc-esg-2) of the same broadcast stream 2 (bsid-2) as the service 3.

In the LCT session of the ROUTE session 2-esg (dIpAddr-svc-esg-2) of the ESG service, the XML fragments of the service, the content, and the schedule are delivered as the ESG information several days to several weeks before a corresponding service (program) is delivered.

Here, the following XML fragment is included in the ESG information. In other words, in the case of the second delivery configuration, XML fragments of a service 3 (Service-3), content 3-1 (Content-3-1), content 3-2 (Content-3-2), a schedule 3-1 (Schedule-3-1), and a schedule 3-2 (Schedule-3-2) are delivered as the ESG information.

(Relation of XML Fragments)

Figure 38:
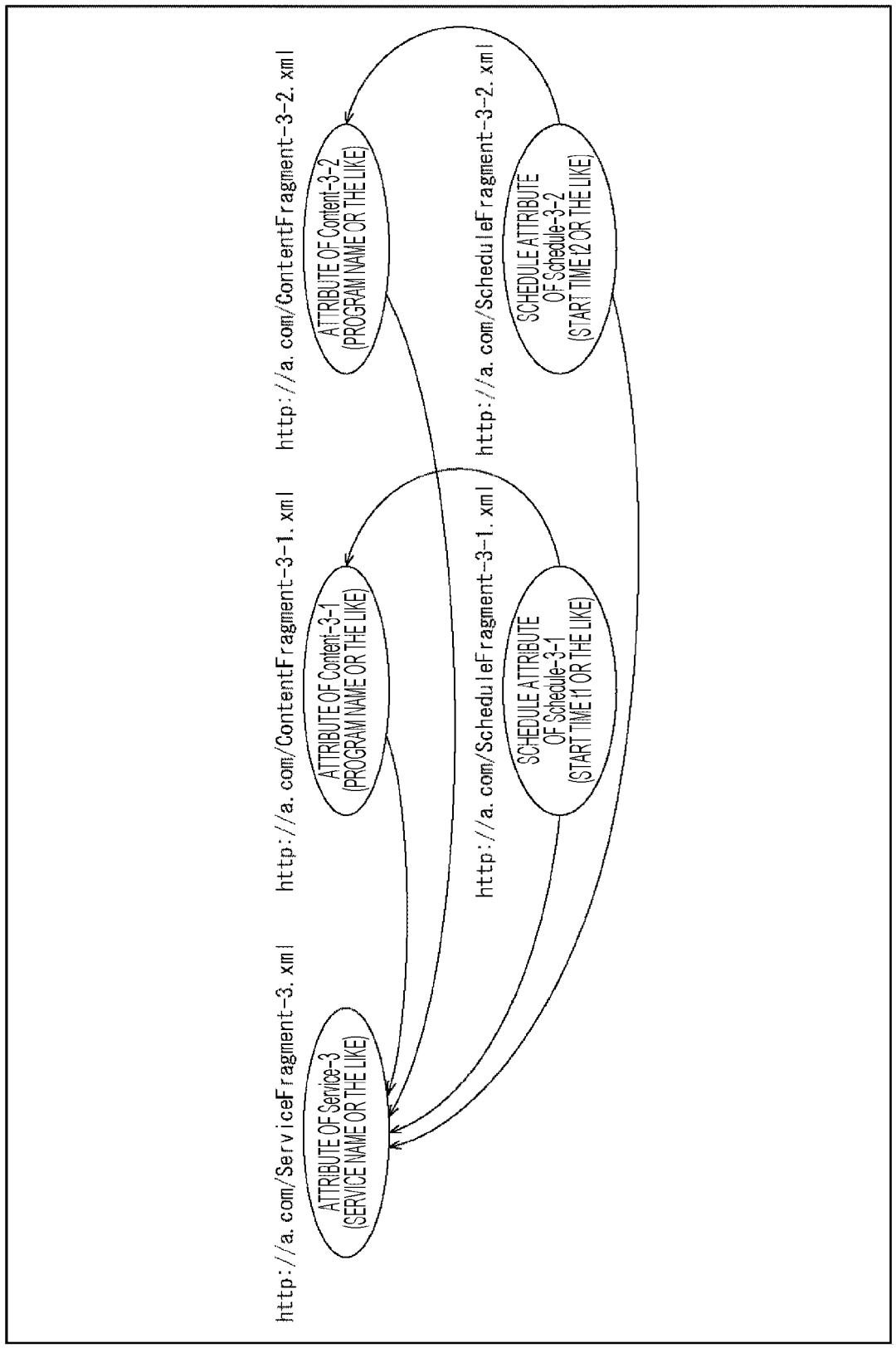
FIG. 38 is a diagram illustrating a relation of XML fragments in the case of a second delivery configuration.

FIG. 38 is a diagram illustrating a relation between the XML fragments of the service, the content, and the schedule in the case of the second delivery configuration.

An attribute of Service-3 such as a service name is described in ServiceFragment-3.xml.

An attribute of Content-3-1 such as a program name is described in ContentFragment-3-1.xml. Further, an attribute of Content-3-2 such as a program name is described in ContentFragment-3-2.xml. Further, the XML fragments of Content-3-1 and Content-3-2 are associated with the XML fragment of Service-3.

A schedule attribute of Schedule-3-1 such as a start time t1 of Content-3-1 is described in ScheduleFragment-3-1.xml. Further, a schedule attribute of Schedule-3-2 such as a start time t2 of Content-3-2 is described in ScheduleFragment-3-2.xml.

Further, the XML fragments of Schedule-3-1 and Schedule-3-2 are associated with the XML fragment of Service-3. Further, the XML fragment of Schedule-3-1 is associated with the XML fragment of Content-3-1, and the XML fragment of Schedule-3-2 is associated with the XML fragment of Content-3-2.

(Screen Example of ESG Service)

Figure 39:
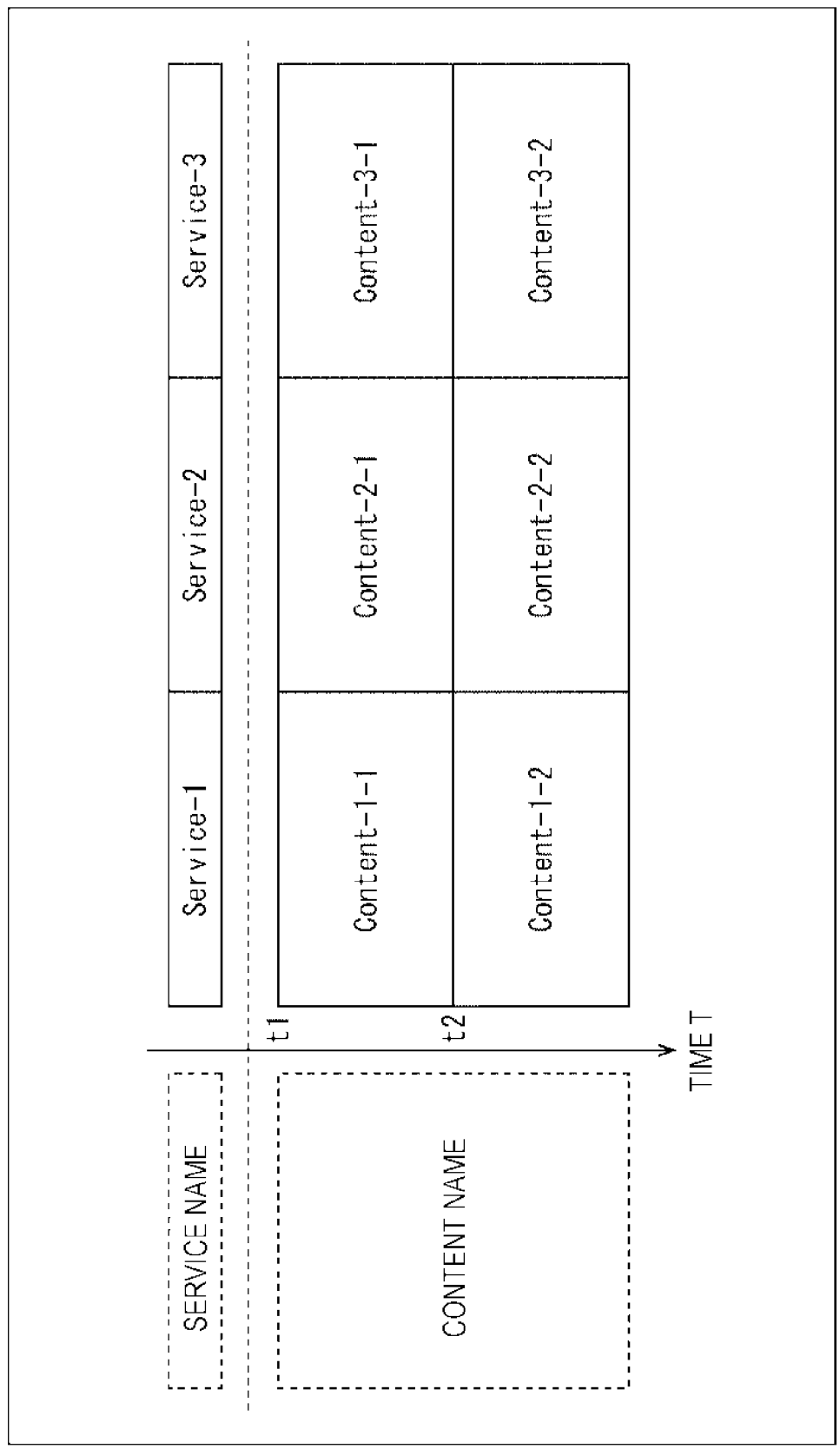
FIG. 39 is a diagram illustrating a display example of a screen of an ESG service in the case of a second delivery configuration.

FIG. 39 is a diagram illustrating a display example of a screen of the ESG service in the case of the second delivery configuration.

The screen of the ESG service illustrated in FIG. 39 is, for example, a screen displayed by the client device 20 connected to the same network 30 as the FW proxy device 10 capable of receiving the broadcast streams 1 and 2 (bsid-1 and bsid-2).

In other words, in the second delivery configuration, similarly to the first delivery configuration, the services 1 and 2 (svc-1 and svc-2) are delivered through the broadcast stream 1 (bsid-1), and further the service 3 (svc-3) is delivered through the broadcast stream 2 (bsid-2). Therefore, on the reception side, if it is possible to receive the two broadcast streams (bsid-1 and bsid-2), information related to the program scheduling of the three broadcast services (svc-1, svc-2, and svc-3) is displayed in a chronological order.

In FIG. 39, the programs delivered through the respective broadcast services are displayed for each time zone in association with service names of the service 1 (svc-1), the service 2 (svc-2), and the service 3 (svc-3).

In the service 1, the content 1-1 (cnt-1-1) is delivered in the time zone t1-t2, and the content 1-2 (cnt-1-2) is delivered after the time zone t2. Further, in the service 2, the content 2-1 (cnt-2-1) is delivered in the time zone t1-t2, and the content 2-2 (cnt-2-2) is delivered after the time zone t2. Further, in the service 3, the content 3-1 (cnt-3-1) is delivered in the time zone t1-t2, and the content 3-2 (cnt-3-2) is delivered after the time zone t2.

Further, the display example of the screen of the ESG service illustrated in FIG. 39 is merely an example, and the screen of the ESG service may be displayed in another display form. For example, in addition to the display of the content name of each content, various attributes such as a service type and an overview may be displayed.

The configuration of the ESG service in the case of the second delivery configuration has been described above.

(3) Configuration of ESG Service in Case of Third Delivery Configuration

Next, a configuration example of the ESG service in the case of a third delivery configuration will be described. In the third delivery configuration, when the content 2-2 (cnt-2-2) of the service 2 (svc-2) of the broadcast stream 1 (bsid-1) started from the time t2 is delivered in the second delivery configuration described above, the delivery is performed using the band allocated to the content 3-2 (cnt-3-2) of the service 3 (svc-3) of the broadcast stream 2 (bsid-2) simultaneously. Further, in the broadcast stream 2 (bsid-2), only an additional stream is delivered as the content 2-2 (cnt-2-2) of the service 2 (svc-2).

(Configuration Example of BS-1 in Case of Third Delivery Configuration)

Figure 40:
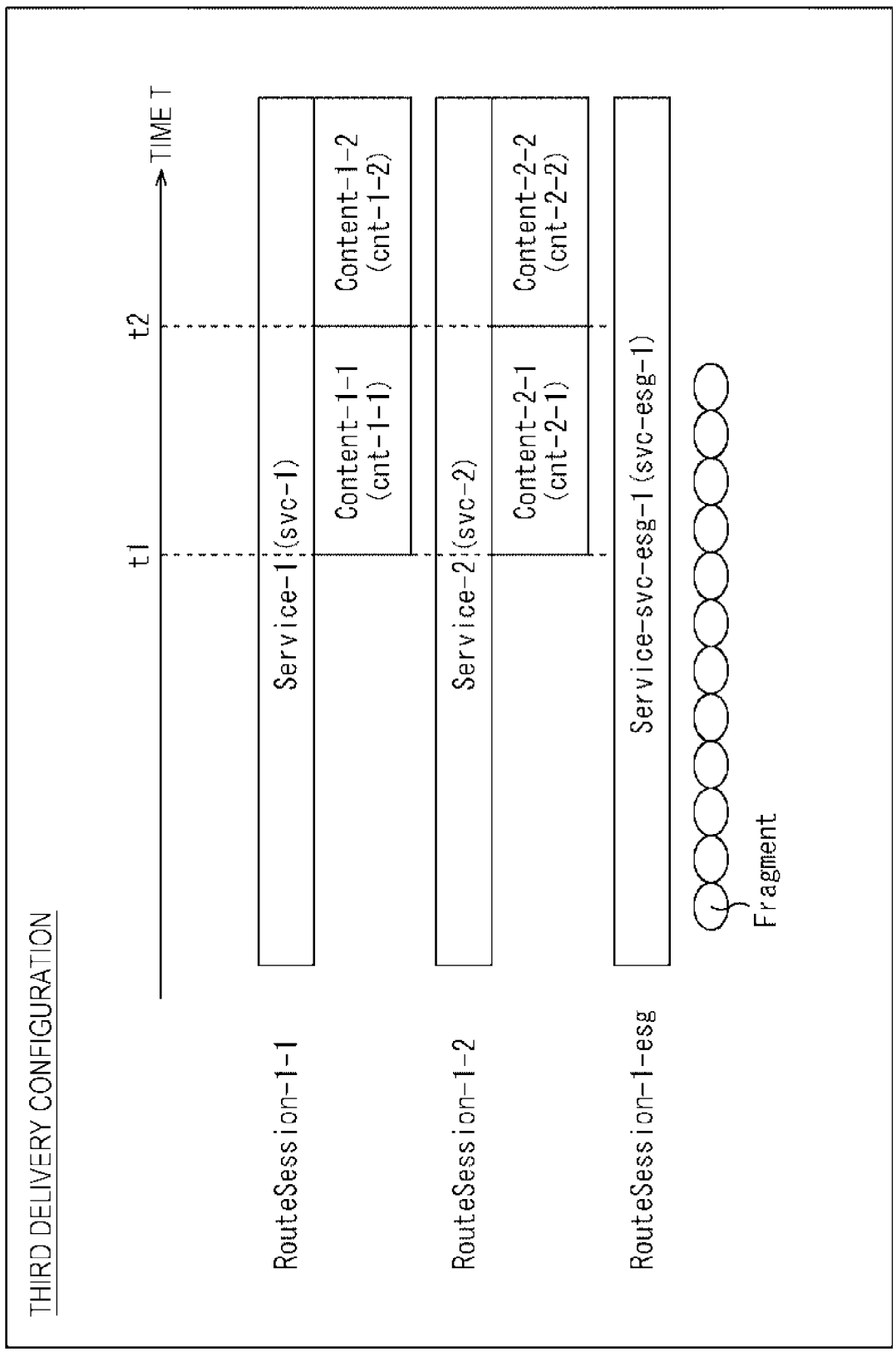
FIG. 40 is a diagram illustrating a configuration example of a broadcast stream 1 in the case of a third delivery configuration.

FIG. 40 is a diagram illustrating a configuration example of the broadcast stream 1 (bsid-1) in the case of the third delivery configuration.

In FIG. 40, the broadcast stream 1 (bsid-1) is constituted by the three ROUTE sessions (RouteSession-1-1, RouteSession-1-2, and RouteSession-1-esg), and the service 1 (svc-1), the service 2 (svc-2), and the ESG service (svc-esg-1) are delivered.

In FIG. 40, when a direction from a left side to a right side in the drawing is a direction of time, in the service 1 (svc-1), content 1-1 (cnt-1-1) and content 1-2 (cnt-1-2) are sequentially delivered. Further, in the service 2 (svc-2), content 2-1 (cnt-2-1) and content 2-2 (cnt-2-2) are sequentially delivered. Further, in the ESG service (svc-esg-1), the XML fragments of the service, the content, and the schedule for services 1 and 2 are delivered several days to several weeks before a corresponding service (program) is delivered.

(Relation of XML Fragments)

Figure 41:
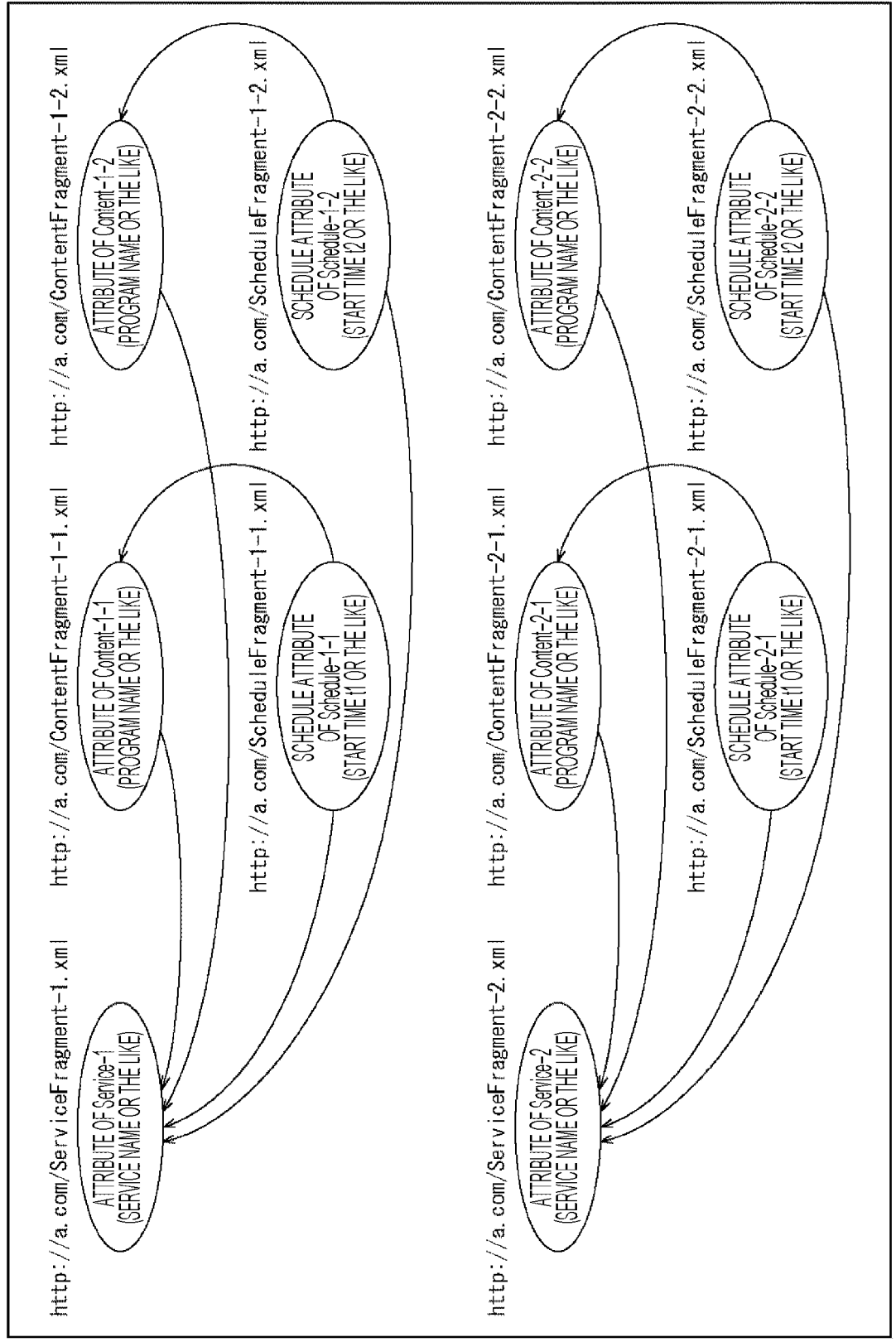
FIG. 41 is a diagram illustrating a relation of XML fragments in the case of a third delivery configuration.

FIG. 41 is a diagram illustrating a relation between the XML fragments of the service, the content, and the schedule in the case of the third delivery configuration.

As illustrated in an upper part of FIG. 41, ServiceFragment-1, ContentFragment-1-1, ContentFragment-1-2, ScheduleFragment-1-1, and ScheduleFragment-1-2 for the service 1 (svc-1) are associated to constitute program scheduling of the service 1.

On the other hand, as illustrated in the lower part of FIG. 41, ServiceFragment-2, ContentFragment-2-1, ContentFragment-2-2, ScheduleFragment-2-1, and ScheduleFragment-2-2 for the service 2 (svc-2) are associated to constitute program scheduling of the service 2.

(Configuration Example of BS-2 in Case of Third Delivery Configuration)

Figure 42:
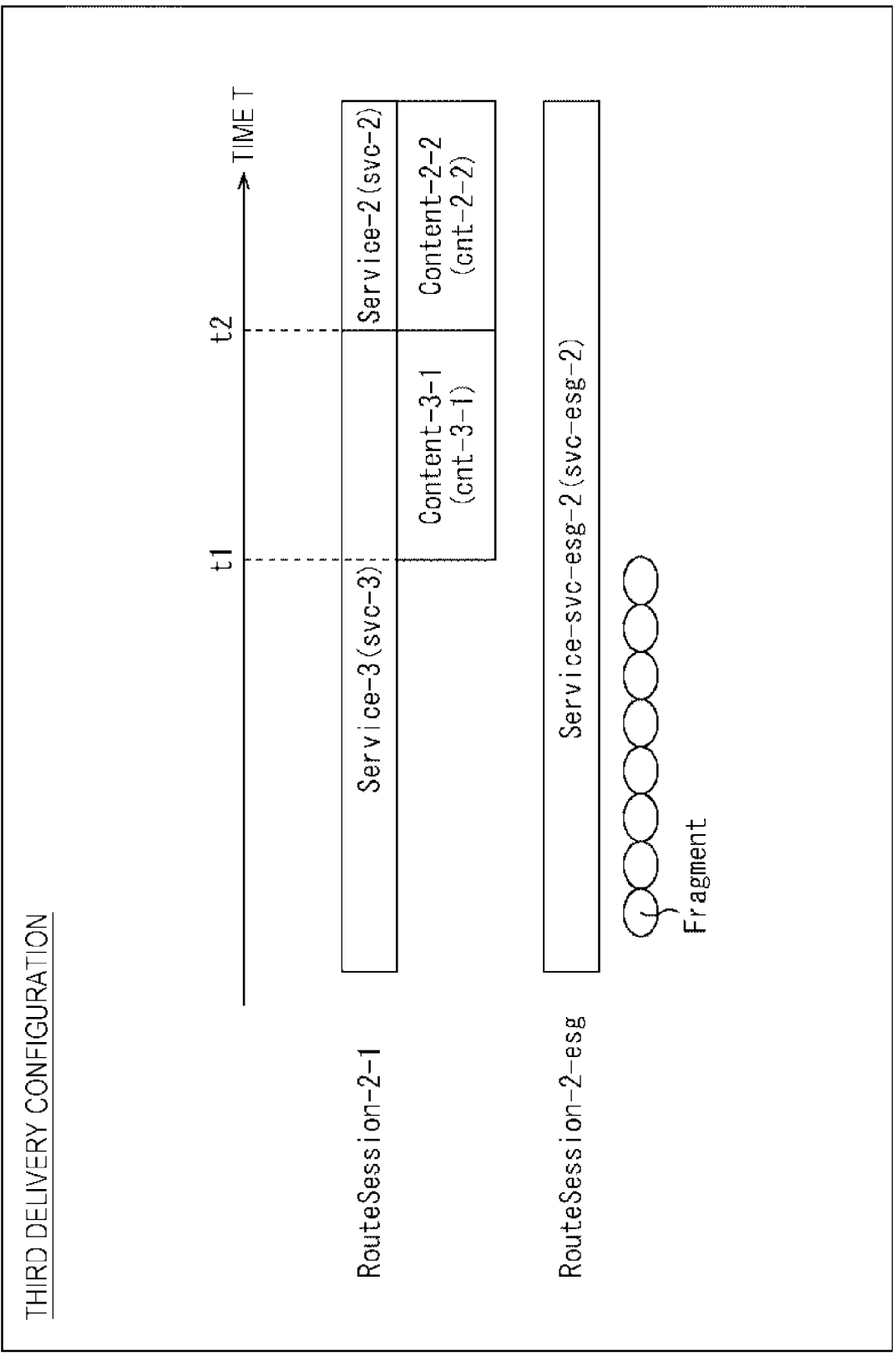
FIG. 42 is a diagram illustrating a configuration example of a broadcast stream 2 in the case of a third delivery configuration.

FIG. 42 is a diagram illustrating a configuration example of the broadcast stream 2 (bsid-2) in the case of the third delivery configuration.

In FIG. 42, a broadcast stream 2 (bsid-2) is constituted by two ROUTE sessions (RouteSession-2-1 and RouteSession-2-esg), and a service 3 (svc-3) or a service 2 (svc-2) and an ESG service (svc-esg-2) are delivered.

In FIG. 42, when a direction from a left side to a right side in the drawing is a direction of time, in the service 3 (svc-3) or the service 2 (svc-2), content 3-1(cnt-3-1) and content 2-2(cnt-2-2) are sequentially delivered. Further, in the ESG service (svc-esg-2), the XML fragments of the service, the content, and the schedule for the service 3 or the service 2 are delivered several days to several weeks before a corresponding service (program) is delivered.

(Relation of XML Fragments)

Figure 43:
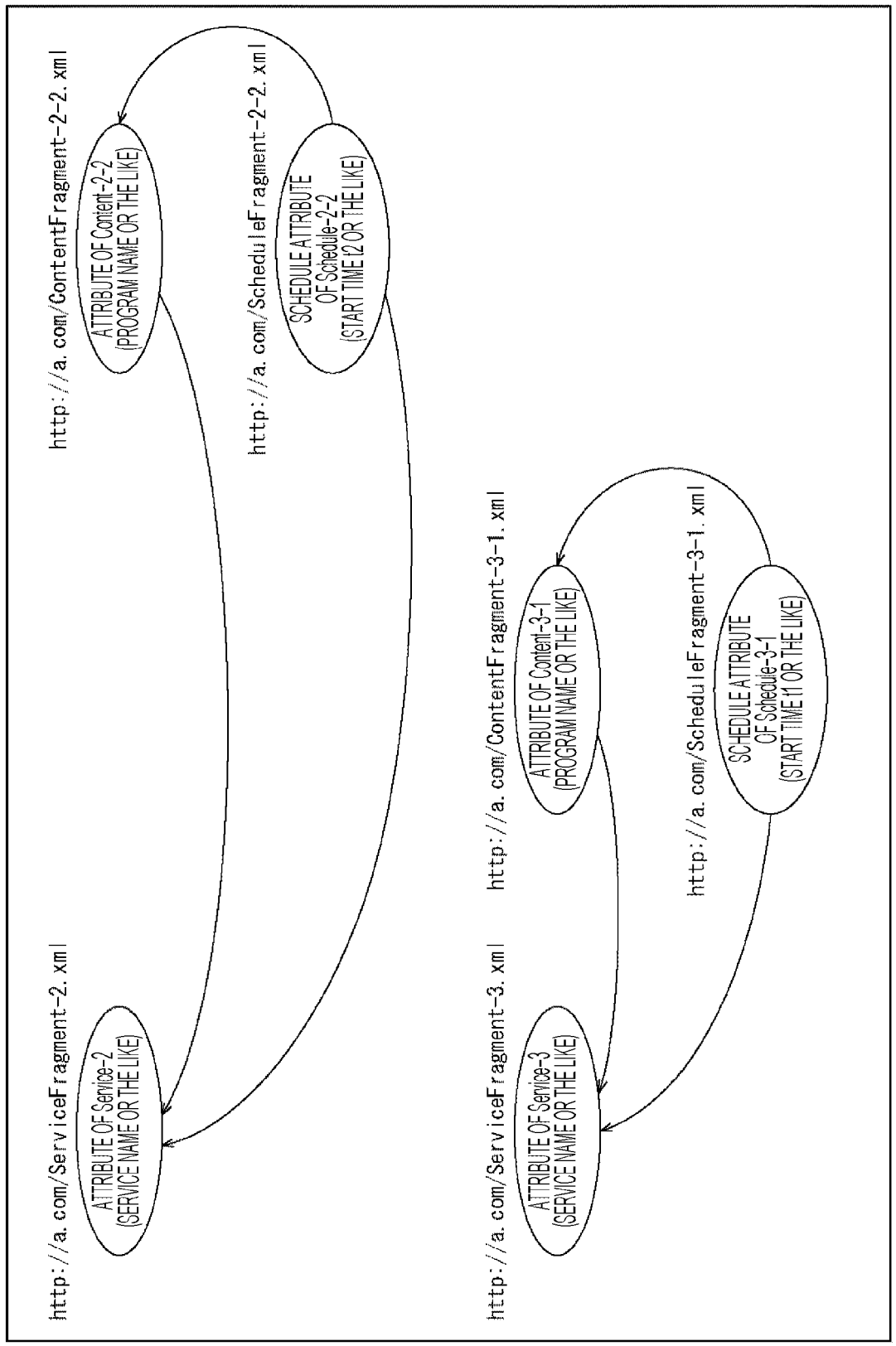
FIG. 43 is a diagram illustrating a relation of XML fragments in the case of a third delivery configuration.

FIG. 43 is a diagram illustrating a relation between the XML fragments of the service, the content, and the schedule in the case of the third delivery configuration.

As illustrated in an upper part of FIG. 43, ServiceFragment-2, ContentFragment-2-2, and ScheduleFragment-2-2 for the service 2 (svc-2) are associated to constitute program scheduling of the service 2 delivered after the time t2.

On the other hand, as illustrated in a lower part of FIG. 43, ServiceFragment-3, ContentFragment-3-1, and ScheduleFragment-3-1 for the service 3 (svc-3) are associated to constitute program scheduling of the service 3 delivered before the time t2.

(Screen Example of ESG Service)

Figure 44:
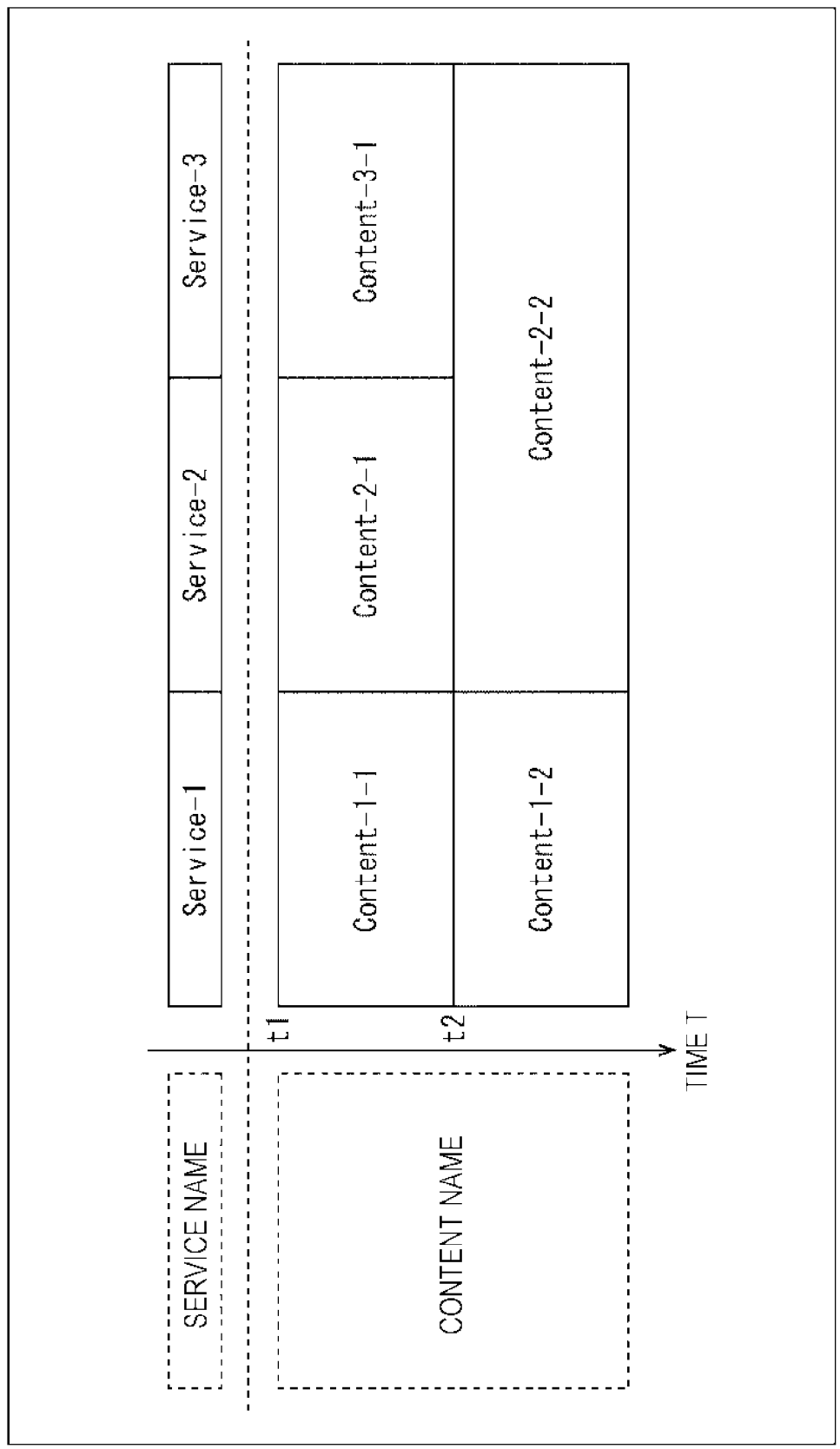
FIG. 44 is a diagram illustrating a display example of a screen of an ESG service in the case of a third delivery configuration.

FIG. 44 is a diagram illustrating a display example of a screen of the ESG service in the case of the third delivery configuration.

The screen of the ESG service illustrated in FIG. 44 is, for example, a screen displayed by the client device 20 connected to the same network 30 as the FW proxy device 10 capable of receiving the broadcast streams 1 and 2 (bsid-1 and bsid-2).

In other words, in the third delivery configuration, the services 1 and 2 (svc-1 and svc-2) are delivered through the broadcast stream 1 (bsid-1), and further the service 3 (svc-3) or the service 2 (svc-2) is delivered through the broadcast stream 2 (bsid-2). Therefore, on the reception side, if it is possible to receive the two broadcast streams (bsid-1 and bsid-2), information related to the program scheduling of the three broadcast services (svc-1, svc-2, and svc-3) is displayed in a chronological order.

In FIG. 44, similarly to the screen example of FIG. 39, the programs delivered through the respective services are displayed for each time zone in association with service names of the service 1 (svc-1), the service 2 (svc-2), and the service 3 (svc-3).

In the service 1, the content 1-1 (cnt-1-1) is delivered in the time zone t1-t2, and the content 1-2 (cnt-1-2) is delivered after the time zone t2. In the service 2, the content 2-1 (cnt-2-1) is delivered in the time zone t1-t2, and the content 2-2 (cnt-2-2) is delivered after the time zone t2.

In the service 3, the content 3-1 (cnt-3-1) is delivered in the time zone t1-t2, but the content is not delivered after the time zone t2. In other words, in the third delivery configuration, since the additional stream of the content 2-2 (cnt-2-2) of the service 2 (svc-2) is delivered using the band allocated to the content 3-2 (cnt-3-2) of the service 3 (svc-3) of the broadcast stream 2 (bsid-2), after the time zone t2, the delivery of the service 3 is stopped, and only the service 1 and the service 2 are delivered.

Here, for example, in the third delivery configuration, it is possible to apply the scalable video coding to the content 2-2 (cnt-2-2) of the service 2 (svc-2), transfer the stream of the base layer through the ROUTE session (RouteSession-1-1) of the broadcast stream 1 (bsid-1), and transfer the stream of the enhancement layer through the ROUTE session (RouteSession-2-1) of the broadcast stream 2 (bsid-2). Accordingly, it is possible to dynamically schedule and deliver even the broadband services such as the broadcast service using the scalable video coding.

(Extension of ESG Information)

Here, there is a possibility that a proposal in which, in a case where a plurality of tuners can be prepared in the FW proxy device 10 of the reception side, if a plurality of tuners are operated to deliver the content 2-2 (cnt-2-2) before the content 2-2 (cnt-2-2) of the service 2 (svc-2) is delivered, the FW proxy device 10 desires to simultaneously receive the broadcast streams 1 and 2 (bsid-1 and bsid-2) immediately and reproduce (desires to record) the content 2-2 (cnt-2-2) without losing packets will be requested.

However, in the current technology, there is no scheme for giving a notification indicating that it is a program across a plurality of broadcast streams, and establishment of such a technical scheme is required. For example, in the current ESG specification, since such a notification is unable to be performed (see Non-Patent Document 3 below), in the present technology, the current ESG is extended so that it is possible to perform a notification indicating that there is a program across a plurality of broadcast streams, and the FW proxy device 10 can perform prior operation preparation.

Non-Patent Document 3: ATSC Candidate Standard: Service Announcement (A/332)

In other words, in the present technology, the notification indicating the presence of a broadcast service across a plurality of broadcast streams can be given through the ESG information in addition to the SLS (S-TSID metadata), so that the FW proxy device 10 can reserve a plurality of tuners to operate at a broadcasting time of a program reserved for viewing.

For example, in an environment in which only two broadcast streams can be received at a time, in a case where the content 2-2 (cnt-2-2) of the service 2 (svc-2) delivered across the broadcast streams 1 and 2 (bsid-1 and bsid-2) is reserved for viewing (recording), the following problem occurs when content of another broadcast service delivered at the same time is reserved for viewing (recording) in parallel with it. In other words, in order to receive the former broadcast service, two tuners are required at the same time, and thus it is necessary to encourage prioritization of which one of the former broadcast service and the latter broadcast service is given priority.

In this regard, in the present technology, in order to cause the notification indicating a broadcast service (program) across a plurality of broadcast streams to be given, an element (delivery configuration information) referring to the broadcast stream ID (bsid) of the broadcast stream in which a target service or content described by a schedule fragment (ScheduleFragment) of the ESG is delivered is allowed to be arranged in the schedule fragment of the ESG.

(Configuration of ESG Information)

As described above, the electronic service guide (ESG) has been developed by the Open Mobile Alliance (OMA), and the ESG information of the present technology also has a configuration according to OMA-ESG.

The ESG is constituted by fragments having respective purposes and is divided into four groups including Administrative, Provisioning, Core, and Access depending on an application to be used.

The core is a group that provides information related to a service itself. The core group includes a service, a schedule, and content. The service provides metadata including content of a channel service and relevant control information. The schedule provides metadata including content delivery schedule and relevant control information. The content provides metadata including content of content constituting a service and relevant control information.

FIG. 45 illustrates a configuration example of the schedule fragment (ScheduleFragment) of the ESG. Further, FIG. 46 illustrates an example of a schema of the ESG schedule fragment.

Figure 46:
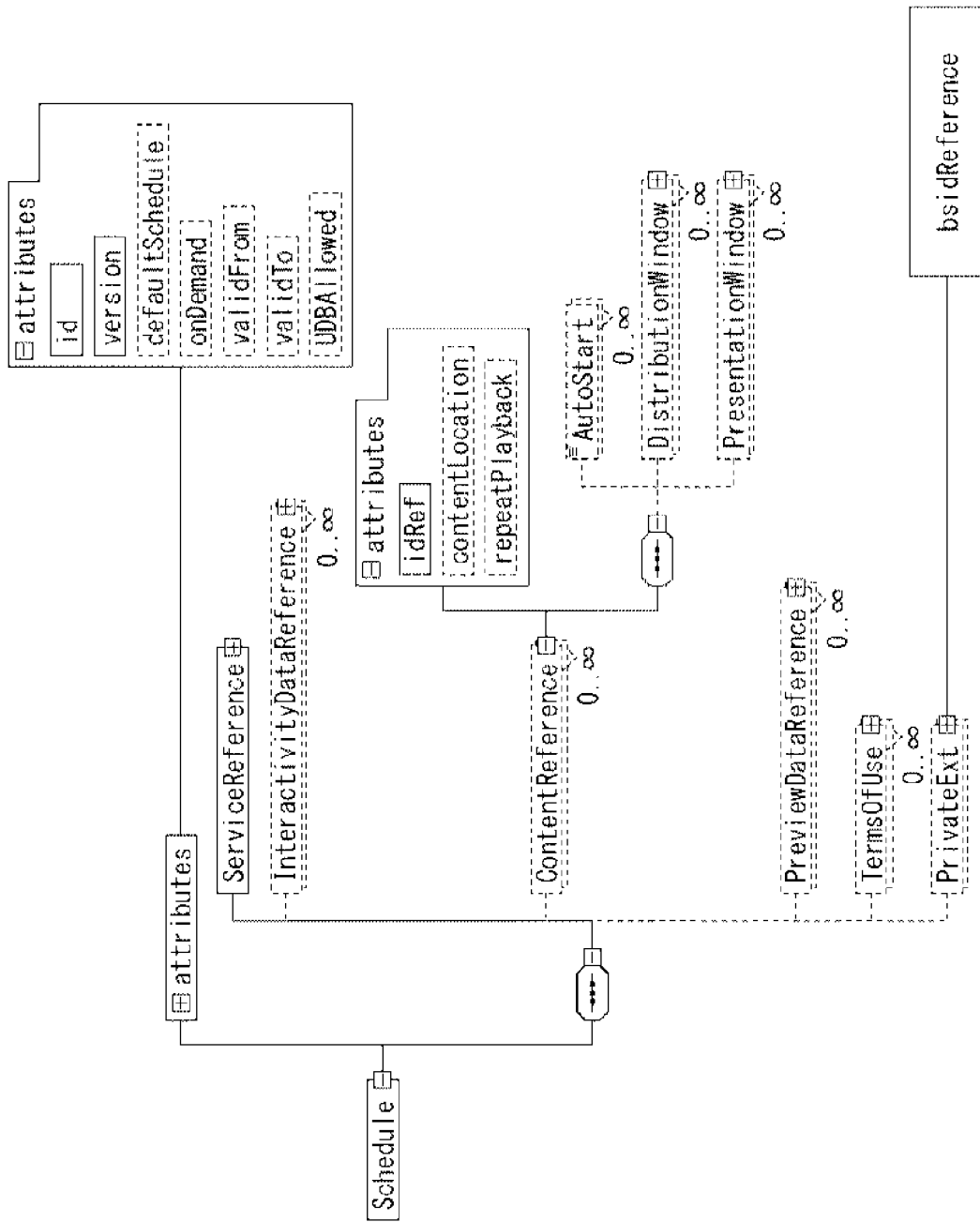
FIG. 46 is a diagram illustrating an example of a schema of a schedule 7 fragment of an ESG.

As illustrated in FIG. 46, in the ESG information of the present technology, the schedule of the ESG is extended, a bsidReference element is added to a PrivateExt element. In the bsidReference element, in a case where the broadcast service is delivered across a plurality of broadcast streams, the broadcast stream ID of the target broadcast stream can be designated.

FIG. 47 is a diagram illustrating an example of an XML instance of the schedule fragment of the ESG. In FIG. 47, two broadcast stream IDs (bsid) of "xxxx" and "yyyy" are described in the bsidReference element of the PrivateExt element of the schedule, and these broadcast stream IDs (bsid) can be referred to by the fragment of the service or the content.

Figure 48:
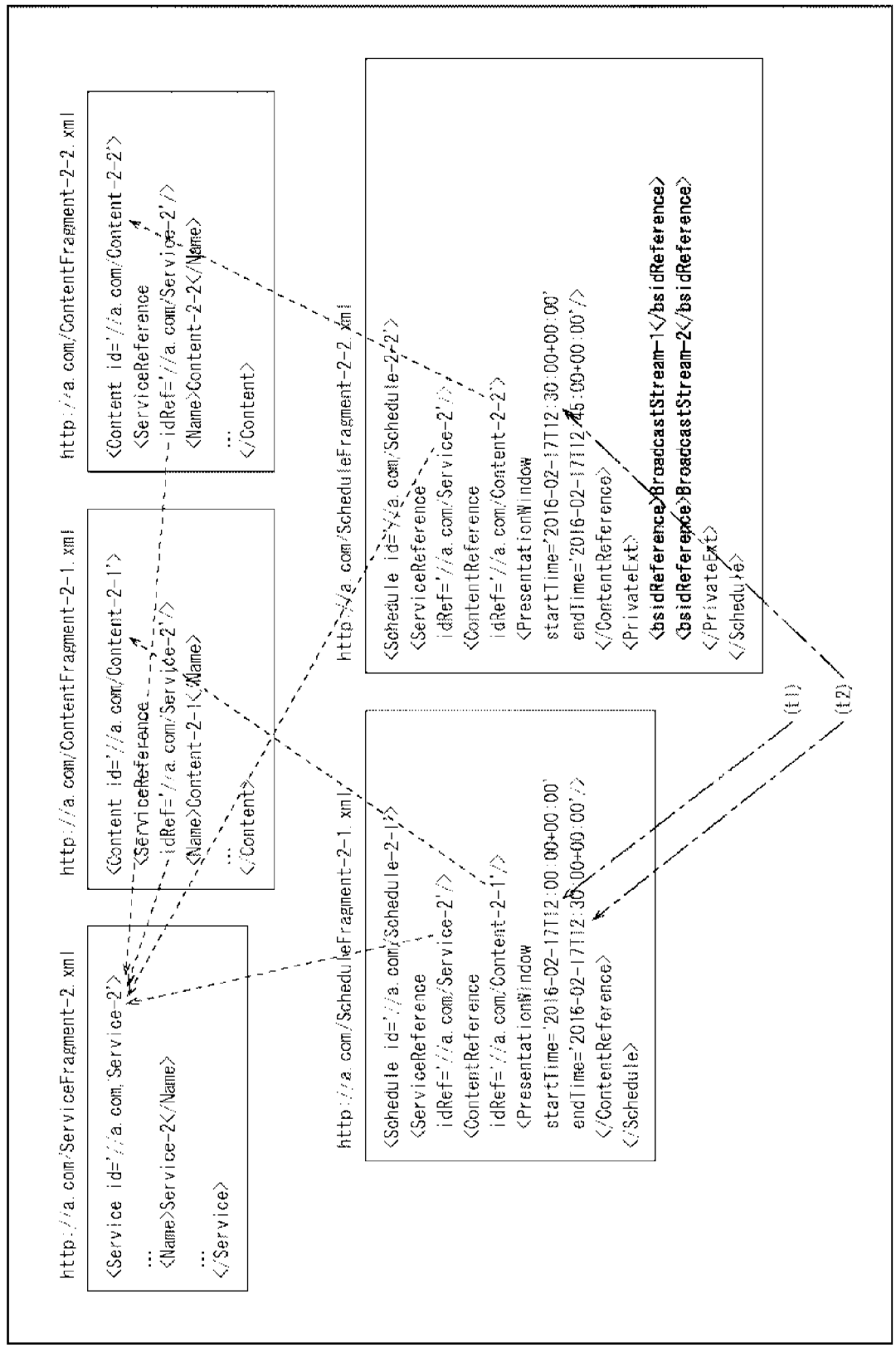
FIG. 48 is a diagram illustrating an example of an XML instance in the case of a third delivery configuration.

More specifically, the fragment of the ESG related to the service 2 (svc-2) in the case of the third delivery configuration is illustrated in FIG. 48. In other words, FIG. 48 illustrates an example of the XML instances of ServiceFragment-2, ContentFragment-2-1/-2-2, and ScheduleFragment-2-1/-2-2.

In ServiceFragment-2.xml, Service-2 is designated as a service name by a Name element of a Service element.

In ContentFragment-2-1.xml, Content-2-1 is designated as a program name by a Name element of a Content element. Further, in ContentFragment-2-2.xml, Content-2-2 is designated as the program name by the Name element of the Content element.

Further, in ContentFragment-2-1.xml and ContentFragment-2-2.xml, a value of an idRef attribute of a ServiceReference element is associated with a value of an id attribute of a Service element of ServiceFragment-2.xml.

In ScheduleFragment-2-1.xml, a start time and an end time of Content-2-1 are designated by a startTime attribute and an endTime attribute of a PresentationWindow element. In this example, '2016-02-17T12:00:00+00:00' is designated as a start time t1 of Content-2-1 by the startTime attribute, and '2016-02-17T12:30:00+00:00' is designated as an end time t2 of Content-2-1 by the endTime attribute.

In ScheduleFragment-2-2.xml, a start time and an end time of Content-2-2 are designated by the startTime attribute and the endTime attribute of the PresentationWindow element. In this example, '2016-02-17T12:30:00+00:00' is designated as a start time t2 of the Content-2-2 by the startTime attribute, and '2016-02-17T12:45:00+00:00' is designated as an end time of Content-2-2 by the endTime attribute.

Here, in ScheduleFragment-2-2.xml, the broadcast stream IDs (bsid) which are "BroadcastStream-1" and "BroadcastStream-2" are designated as a bsidReference element of a PrivateExt element. Accordingly, it indicates that the content 2-2 (cnt-2-2) of the service 2 (svc-2) is delivered across the broadcast stream 1 (bsid-1) and the broadcast stream 2 (bsid-2).

Further, in ScheduleFragment-2-1.xml and ScheduleFragment-2-2.xml, a value of an idRef attribute of a ServiceReference element is associated with a value of an id attribute of a Service element of ServiceFragment-2.xml. Further, in ScheduleFragment-2-1.xml, a value of an idRef attribute of a ContentReference element is associated with a value of an id attribute of a Content element of ContentFragment-2-1.xml. Further, in ScheduleFragment-2-2.xml, the value of the idRef attribute of the ContentReference element is associated with the value of the id attribute of the Content element of ContentFragment-2-2.xml.

(Screen Example of ESG Service)

Figure 49:
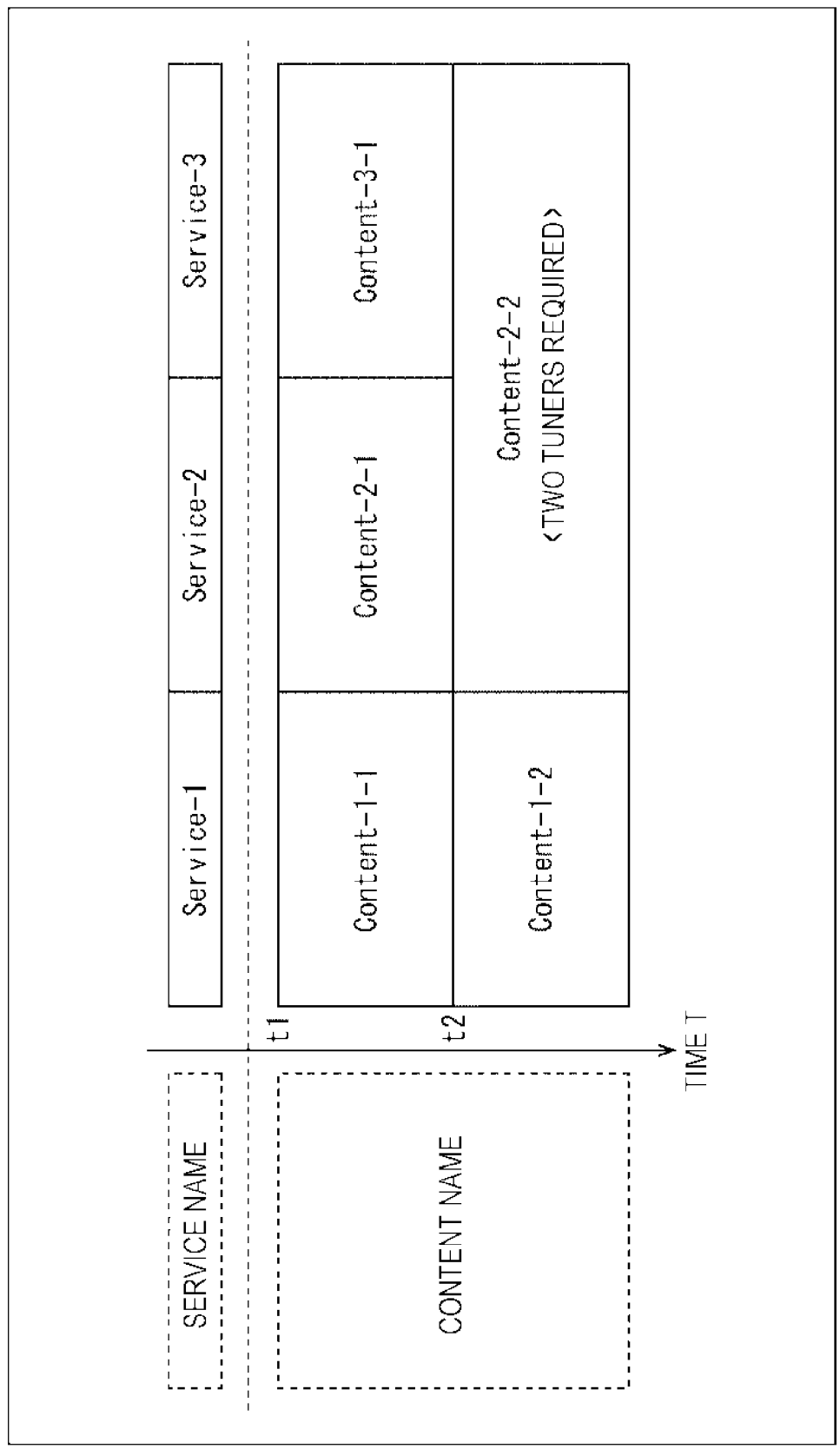
FIG. 49 is a diagram illustrating a display example of a screen of an ESG service in the case of a third delivery configuration.

FIG. 49 is a diagram illustrating a display example of the screen of the ESG service in the case of the third delivery configuration.

The screen of the ESG service of FIG. 49 differs from the screen of the ESG service of FIG. 44 in that since the content 2-2 (cnt-2-2) of the service 2 (svc-2) delivered in a time zone after time t2 is delivered across the broadcast streams 1 and 2 (bsid-1 and bsid-2), for example, a message calling attention such as "two tuners required" is displayed using the value of bsidReference element of the schedule fragment (ScheduleFragment-2-2).

By performing such a display, it is possible to give a notification indicating that a plurality of tuners which can be operated at the same time are necessary for viewing the content 2-2 (cnt-2-2) to the end user in advance. Thus, for example, in an environment in which there is a limitation to the number of tuners that can be operated at the same time, in a case where the end user makes an attempt to make a reservation for viewing of a program in which a plurality of tuners are premises or the like, it is possible to encourage the user to perform prioritization using the ESG information of the present technology.

7. Modified Example (Delivery Via Communication)

The transmission system 1 of FIG. 1 has been described in connection with the example in which the stream of the content is delivered via the broadcast transmission path 60 via broadcasting, but the stream of the content may be delivered via a communication transmission path such as the Internet via communication.

FIG. 50 illustrates another configuration example of the transmission system. A transmission system 6 of FIG. 50 differs from the transmission system 1 of FIG. 1 in that, in addition to the broadcasting system broadcast server 40, a communication server 70 of communication system is installed on the transmission side.

The FW proxy device 10 also has a communication function (a communication I/F (not illustrated)) connectable to the Internet 80 together with a reception function of receiving a broadcast wave transmitted via the broadcast transmission path 60. Accordingly, the FW proxy device 10 is connected to the communication server 70 via the Internet 80 and can perform communication with each other.

The FW proxy device 10 transmits a request from the client device 20 connected to the network 30 to the communication server 70 connected to the Internet 80. Further, the FW proxy device 10 receives a stream of content transmitted from the communication server 70 via the Internet 80, and transmits (transfers) the stream to the client device 20 connected to the network 30.

As described above, the FW proxy devices 10-1 to 10-N connected to the network 30 have the master/slave relation in which one of the FW proxy devices 10 functions as the master proxy, and the other FW proxy devices 10 function as the slave proxy. Further, since the FW proxy devices 10-1 to 10-N have the master/slave relation, the broadcast service responsible range is allocated to each FW proxy device 10 by the master proxy device 10M in which the master proxy 111 operates as described above.

Accordingly, the client device 20 connected to the network 30 reproduces the content delivered via broadcasting or communication via the FW proxy device 10 (the master proxy device 10M or the slave proxy device 10S) in accordance with a manipulation of the end user and the like.

The communication server 70 is, for example, a server provided by a broadcasting company such as a broadcasting station or another broadcasting company and is connected to the Internet 80.

In response to the request from the FW proxy device 10, the communication server 70 processes a file of content such as a program or a CM or the control information, and transmits (streaming-delivers) data obtained as a result via the Internet 80.

Further, the broadcast server 40 and the communication server 70 may deliver, for example, an application or the like in addition to the content such as the program. In other words, in the transmission system 6, an application is delivered via broadcasting or communication and is received by the client device 20 via the FW proxy device 10.

Further, in the transmission system 1 (FIG. 1) and the transmission system 6 (FIG. 50), the configuration in which at least the stream of the content delivered via the broadcasting is processed by the FW proxy device 10 has been described, but only the communication server 70 of the communication system may be installed on the transmission side, and only the stream of the content delivered via communication may be processed in the FW proxy device 10. In this case, the client device 20 reproduces only the content delivered via communication.

Further, in the above description, one FW proxy device 10 among the FW proxy devices 10 connected to the network 30 functions as the master proxy device 10M, but a plurality of FW proxy devices 10 may function as the master proxy device 10M. Further, the master proxy device 10M and the slave proxy device 10S do not have a function of reproducing the content in the configuration illustrated in FIG. 2 or FIG. 3, but similarly to the client device 20, the master proxy device 10M and the slave proxy device 10S may reproduce or record the content delivered via broadcasting or communication.

(Application to Other Broadcasting Standards)

In the above description, ATSC (in particular, ATSC 3.0) which is a scheme adopted in the United States or the like has been described as the digital broadcasting standard, but the present technology is applicable to Integrated Services Digital Broadcasting (ISDB) which is a scheme employed in Japan or the like, Digital Video Broadcasting (DVB) which is a scheme employed in countries in Europe or the like, for example. Further, in the above description, ATSC 3.0 employing the IP transmission scheme has been described as an example, but the present invention is not limited to the IP transmission scheme but is applicable to other schemes such as the MPEG2-Transport Stream (TS) scheme or the like.

Further, as the digital broadcasting standard, in addition to terrestrial broadcasting, a standard of satellite broadcasting using a broadcasting satellite (BS), a communication satellite (CS), or the like, cable broadcasting such as a cable television (Common Antenna TeleVision (CATV)) or the like may be employed.

Other Modified Examples

The names such as the control information (signaling) described above are examples, and other names may be used. Here, a difference between these names is a formal difference, and there is no difference in substantial content of target control information, a packet, or the like. For example, user service bundle description (USBD) is also referred to as user service description (USD). Further, for example, non real time (NRT) is also referred to as locally cached content (LCC) or the like.

Further, for a DASH player, for example, in addition to an application developed in a markup language such as Hyper-Text Markup Language 5 (HTML 5) or a script language such as JavaScript (registered trademark), for example, an application developed in a programming language such as Java (registered trademark) may be used. Further, the application is not limited to an application executed by the browser and may be executed in an operating system (OS) environment or the like as a so-called native application.

Further, the application may explicitly display certain information or may be operated in a non-displayed state (in the background) (may be activated without being recognized by the end user). Further, the content can include any content such as e-books, games, advertisements, and the like in addition to moving images and music.

8. Configuration of Computer

Figure 51:
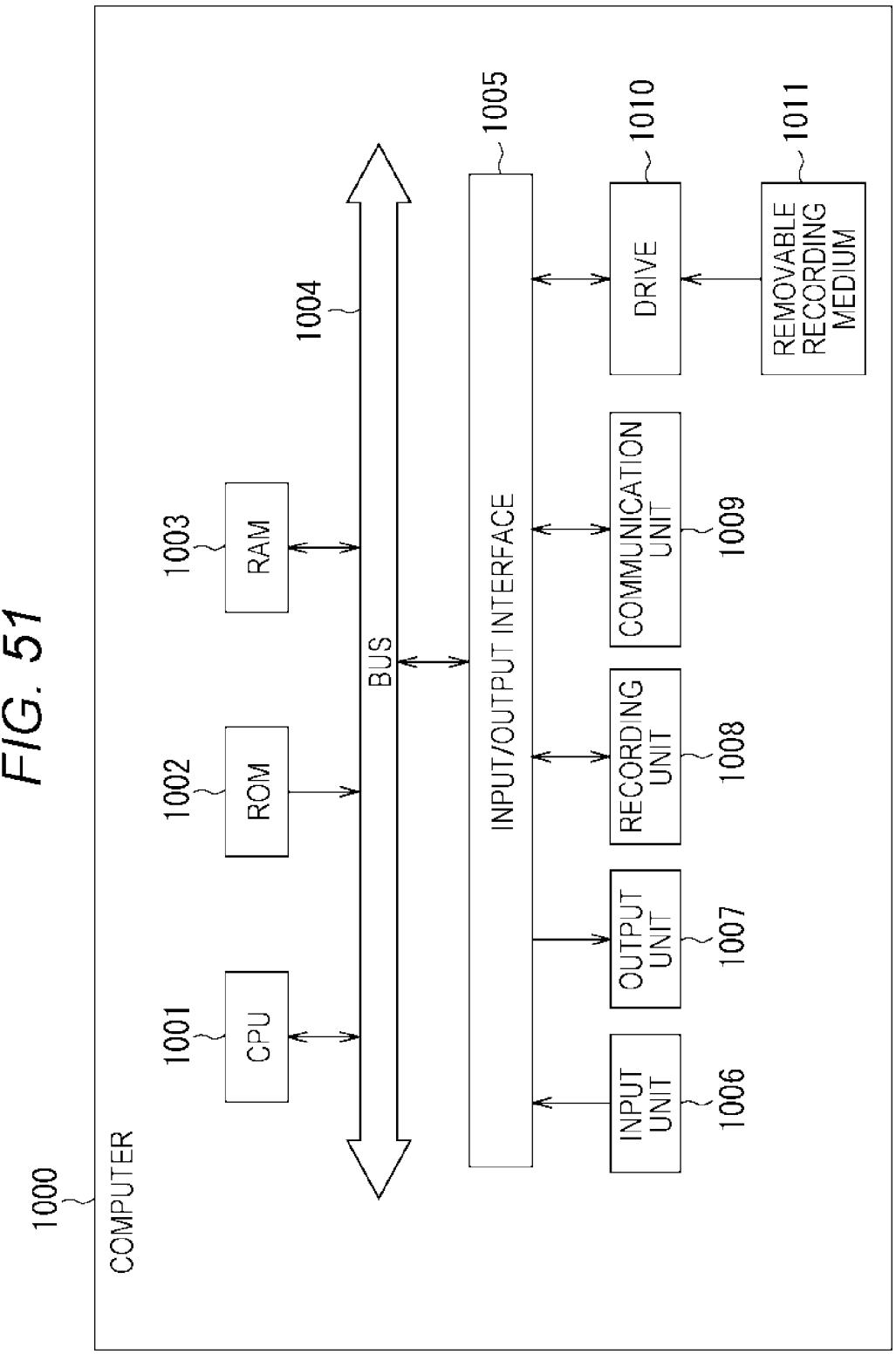
FIG. 51 is a diagram illustrating a configuration example of a computer.

A series of processes described above can be executed by hardware or software. In a case where a series of processes is executed by software, a program constituting the software is installed in a computer. FIG. 51 is a diagram illustrating a configuration example of hardware of a computer that executes a series of processes described above in accordance with a program.

In a computer 1000, a central processing unit (CPU) 1001, a read only memory (ROM) 1002, and a random access memory (RAM) 1003 are connected to one another via a bus 1004. Further, an input/output interface 1005 is connected to the bus 1004. An input unit 1006, an output unit 1007, a recording unit 1008, a communication unit 1009, and a drive 1010 are connected to the input/output interface 1005.

The input unit 1006 includes a keyboard, a mouse, a microphone, or the like. The output unit 1007 includes a display, a speaker, or the like. The recording unit 1008 includes a hard disk, a non-volatile memory, or the like. The communication unit 1009 includes a network interface or the like. The drive 1010 drives a removable recording medium 1011 such as a magnetic disk, an optical disk, a magneto-optical disk, or a semiconductor memory.

In the computer 1000 configured as described above, the CPU 1001 loads the program recorded in the ROM 1002 or the recording unit 1008 onto the RAM 1003 via the input/output interface 1005 and the bus 1004 and executes the program, so that a series of processes is performed.

The program executed by the computer 1000 (the CPU 1001) can be provided in a form in which it is recorded in, for example, the removable recording medium 1011 serving as a package medium or the like. Further, the program can be provided via a wired or wireless transmission medium such as a local area network, the Internet, digital satellite broadcasting, or the like.

In the computer 1000, the removable recording medium 1011 is loaded into the drive 1010, and then the program can be installed in the recording unit 1008 via the input/output interface 1005. Further, the program can be received by the communication unit 1009 via a wired or wireless transmission medium and installed in the recording unit 1008. In addition, the program can be installed in the ROM 1002 or the recording unit 1008 in advance.

Here, in this specification, the process performed by the computer in accordance with the program need not be necessarily performed chronologically in accordance with the order described as the flowchart. In other words, the process performed by the computer in accordance with the program includes processes executed in parallel or individually (for example, a parallel process or an object-based process) as well. Further, the program may be processed by one computer (processor) or may be distributed to and processed by a plurality of computers.

Further, the embodiment of the present technology is not limited to the above-described embodiment, and various modifications can be made without departing from the gist of the present technology.

Further, the present technology can have the following configuration.

(1)

A receiving device, including:

a receiving unit that receives a stream of a broadcast service; and a processing unit that processes the stream, in which in the stream, delivery configuration information indicating that the stream of the broadcast service is delivered across a predetermined frequency band is included in transmission information which is transmitted through an upper layer higher than a physical layer, and the processing unit processes the stream having a delivery configuration corresponding to the delivery configuration information.

(2)

The receiving device according to (1), in which the processing unit is a proxy that receives the stream of the broadcast service and transmits the stream of the broadcast service to a client device connected to a network, functions as a master proxy for a slave proxy, and decides a broadcast service responsible range corresponding to the delivery configuration information for each proxy.

(3)

The receiving device according to (2), in which the processing unit allocates the broadcast service delivered across the predetermined frequency band to a proxy in which a simultaneous operation is guaranteed at all times as the broadcast service responsible range on the basis of the delivery configuration information.

(4)

The receiving device according to (2) or (3), in which the transmission information is control information of an upper layer, and the processing unit decides the broadcast service responsible range corresponding to the delivery configuration information included in the control information of the upper layer for each proxy.

(5)

The receiving device according to (4), in which the control information of the upper layer further includes priority information indicating a priority between sessions, and the processing unit decides the broadcast service responsible range corresponding to the delivery configuration information and the priority information included in the control information of the upper layer for each proxy.

(6)

The receiving device according to (5), in which the delivery configuration indicated by the delivery configuration information includes a first session for transmitting a minimum necessary stream when the broadcast service delivered across the predetermined frequency band is delivered and a second session for transmitting an additional stream when the broadcast service is delivered, and in the priority information, a priority of the first session is higher than a priority of the second session.

(7)

The receiving device according to any one of (4) to (6), in which the processing unit decides the broadcast service responsible range corresponding to the delivery configuration information for each proxy each time information indicating the delivery configuration of the control information of the upper layer is updated.

(8)

The receiving device according to (2), in which the transmission information is delivered ahead of the stream of the broadcast service corresponding to the transmission information by a predetermined period.

(9)

The receiving device according to (8), in which the transmission information is information related to an electronic program guide.

(10)

The receiving device according to (8) or (9), in which the processing unit provides notification of delivery of the broadcast service delivered across the predetermined frequency band on the basis of the transmission information.

(11)

The receiving device according to (2) or (3), in which one or more other receiving devices in which the slave proxy operates are installed on the network, and the processing unit generates a database in which each proxy is associated with the broadcast service responsible range, and causes a request for the broadcast service to be redirected to a proxy which is in charge of the broadcast service with reference to the database in a case where the request for the broadcast service is received from the client device.

(12)

The receiving device according to any one of (4) to (7), in which the control information of the upper layer is control information delivered for each broadcast service, and the delivery configuration information is included in control information of a file transfer protocol.

(13)

The receiving device according to any one of (1) to (12), in which the predetermined frequency band is a bandwidth allocated for each RF channel.

(14)

A data processing method of a receiving device, including:

a step of processing, by the receiving device, a stream in which delivery configuration information indicating that a stream of a broadcast service is delivered across a predetermined frequency band is included in transmission information transmitted through an upper layer higher than a physical layer, the stream having a delivery configuration corresponding to the delivery configuration information.

(15)

A transmitting device, including:

a generating unit that generates transmission information which is transmitted through an upper layer higher than a physical layer and includes delivery configuration information indicating that a stream of a broadcast service is delivered across a predetermined frequency band; and a transmitting unit that transmits a stream including the transmission information.

(16)

The transmitting device according to (15), in which the transmission information is control information of the upper layer.

(17)

The transmitting device according to (16), in which the control information of the upper layer further includes priority information indicating a priority between sessions.

(18)

The transmitting device according to (16) or (17), in which the control information of the upper layer is control information delivered for each broadcast service, and the delivery configuration information is included in control information of a file transfer protocol.

(19)

The transmitting device according to (15), in which the transmission information is information related to an electronic program guide.

(20)

A data processing method of a transmitting device, including steps of:

generating, by the transmitting device, transmission information which is transmitted through an upper layer higher than a physical layer and includes delivery configuration information indicating that a stream of a broadcast service is delivered across a predetermined frequency band; and transmitting, by the transmitting device, a stream including the transmission information.

REFERENCE SIGNS LIST 1, 6 Transmission system
10-1 to 10-M, 10 FW proxy device
10M Master proxy device
10S Slave proxy device
20-1 to 20-M, 20 Client device
30 Network
40 Broadcast server
50 Transmitting station
60 Broadcast transmission path
70 Communication server
80 Internet
100 Processing unit
101 Tuner
102 Communication I/F
103 Storage unit
111 Master proxy
112 UPnP/SSDP server
113 SLS processing system
150 Processing unit
151 Tuner
152 Communication I/F
153 Storage unit
161 Slave proxy
162 SLS processing system
200 Processing unit
201 Communication I/F
202 Display unit 203 Speaker
211 Application
212 Browser
401 Component processing unit
402 Control information generating unit
403 ESG generating unit
404 Multiplexer
405 Data processing unit
406 Transmitting unit
1000 Computer
1001 CPU

The invention claimed is:

1. A receiving device, comprising:
a tuner configured to receive a first broadcast stream of a broadcast service; and
processing circuitry configured to process the first broadcast stream based on transmission information, the transmission information including information of a second broadcast stream that delivers a portion of the broadcast service, wherein
the transmission information includes an attribute indicating importance for the broadcast service, the attribute corresponding to at least one of the first broadcast stream or the second broadcast stream, and wherein
the broadcast service corresponding to the first broadcast stream and the second broadcast stream is selected by a user based on an electronic program guide.

2. The receiving device according to claim 1, wherein the transmission information includes a broadcast stream ID (BSID) of the first broadcast stream and a BSID of the second broadcast stream.

3. The receiving device according to claim 2, wherein the transmission information is transmitted through an upper layer that is higher than a physical layer in the first broadcast stream.

4. The receiving device according to claim 1, wherein the attribute indicating importance for the broadcast service indicates that the portion of the broadcast service delivered in the second broadcast stream is essential for the broadcast service.

5. The receiving device according to claim 4, wherein the attribute indicating importance for the broadcast service is priority information indicating a priority between sessions.

6. The receiving device according to claim 5, wherein a delivery configuration indicated by the transmission information includes a first session for transmitting a minimum necessary stream and a second session for transmitting an additional stream.

7. The receiving device according to claim 6, wherein a priority of the first session is higher than a priority of the second session in the priority information.

8. The receiving device according to claim 1, wherein the transmission information is delivered ahead of the first broadcast stream of the broadcast service corresponding to the transmission information by a predetermined period.

9. The receiving device according to claim 1, wherein the transmission information includes information related to the electronic program guide.

10. The receiving device according to claim 1, wherein the processing circuitry is configured to provide notification of delivery of the broadcast service based on the transmission information.

11. The receiving device according to claim 1, wherein the first broadcast stream and the second broadcast stream are delivered in different predetermined frequency bands which are bandwidths allocated for each RF channel.

12. The receiving device according to claim 1, further comprising:
at least one of another tuner or a communication interface, the another tuner and the communication interface being configured to receive the second broadcast stream.

13. A data processing method of a receiving device, comprising:
receiving a first broadcast stream of a broadcast service, and
processing, by processing circuitry of the receiving device, the first broadcast stream based on transmission information, the transmission information including information of a second broadcast stream that delivers a portion of the broadcast service, wherein
the transmission information includes an attribute indicating importance for the broadcast service, the attribute corresponding to at least one of the first broadcast stream or the second broadcast stream, and wherein
the broadcast service corresponding to the first broadcast stream and the second broadcast stream is selected by a user based on an electronic program guide.

14. The data processing method according to claim 13, wherein the transmission information includes a broadcast stream ID (BSID) of the first broadcast stream and a BSID of the second broadcast stream.

15. The data processing method according to claim 14, wherein the transmission information is transmitted through an upper layer that is higher than a physical layer in the first broadcast stream.

16. The data processing method according to claim 13, wherein the attribute indicating importance for the broadcast service indicates that the portion of the broadcast service delivered in the second broadcast stream is essential for the broadcast service.

* * * * *